United States Patent

[11] 3,593,299

[72] Inventors Graham C. Driscoll
Yorktown Heights, N.Y.;
Edward H. Sussenguth, Los Altos, Calif.

[21] Appl. No. 653,499
[22] Filed July 14, 1967
[45] Patented July 13, 1971
[73] Assignee International Business Machine Corporation Armonk, N.Y.

[54] INPUT-OUTPUT CONTROL SYSTEM FOR DATA PROCESSING APPARATUS
4 Claims, 72 Drawing Figs.

[52] U.S. Cl. .......... 340/172.5
[51] Int. Cl. .......... G06f 15/00
[50] Field of Search .......... 340/172.5; 235/157

[56] References Cited

UNITED STATES PATENTS

| | | | |
|---|---|---|---|
| 3,283,308 | 11/1966 | Klein et al. | 340/172.5 |
| 3,344,410 | 10/1967 | Collins et al. | 340/172.5 |
| 3,406,380 | 10/1968 | Bradley et al. | 340/172.5 |
| 3,061,192 | 10/1962 | Terzian | 340/172.5 |
| 3,245,045 | 4/1966 | Randlev | 340/172.5 |
| 3,266,023 | 8/1966 | Werme | 340/172.5 |
| 3,462,741 | 8/1969 | Bush et al. | 340/172.5 |

*Primary Examiner*—Paul J. Henon
*Assistant Examiner*—Harvey E. Springborn
*Attorneys*—Hanifin and Jancin and Isidore Match

ABSTRACT: An input-output system which is effectively a satellite computer that performs normal input-output functions for other data processing apparatus components, i.e., the central processing unit and peripheral input and output devices; that exercises supervisory control over the aforesaid apparatus components such as by arranging processing task queues and allocating storage space; that buffers transmissions between remote terminals and devices and the central computing units; and that controls periodic diagnostic analyses of the entire data processing apparatus.

INPUT-OUTPUT SYSTEM

INVENTORS
GRAHAM C. DRISCOLL
EDWARD H. SUSSENGUTH, JR.
BY Isidore Match
ATTORNEY

| | INPUT-OUTPUT SYSTEM | | | | | STORAGE UNITS | | | |
|---|---|---|---|---|---|---|---|---|---|
| | MAIN COMPUTING UNIT 4 | SUBSIDIARY COMPUTING UNIT 6 | INPUT-OUTPUT CONTROL 28 | SUPERVISORY CONTROL 26 | REMOTE TERMINAL CONTROL 30 | MAIN STORAGE I | MAIN STORAGE II | BULK STORAGE 22 | AUXILIARY STORAGE 24 |
| MAIN COMPUTING UNIT 4 | | | REGISTER FI | REGISTER FS | | BUS | | | |
| SUBSIDIARY COMPUTING UNIT 6 | | | REGISTER CI | REGISTER CS | | | BUS | | |
| INPUT-OUTPUT CONTROL 28 | REGISTER IF | REGISTER IC | | REGISTER IS | REGISTER IR | | BUS | | |
| SUPERVISORY CONTROL 26 | REGISTER SF | REGISTER SC | REGISTER SI | | REGISTER SR | | BUS | | |
| REMOTE TERMINAL CONTROL 30 | | | REGISTER RI | REGISTER RS | | | BUS | | |
| MAIN STORAGE I | BUS | | BUS | | | | | BUS | |
| MAIN STORAGE II | | BUS | BUS | BUS | BUS | | | BUS | |
| BULK STORAGE 22 | | | | | | BUS | BUS | | BUS |
| AUXILIARY STORAGE 24 | | | | | | | | BUS | |

FIG. 2A

A UNIT

ROW B UNIT SCAN

B UNIT

B UNIT

"A" UNIT

"A" UNIT

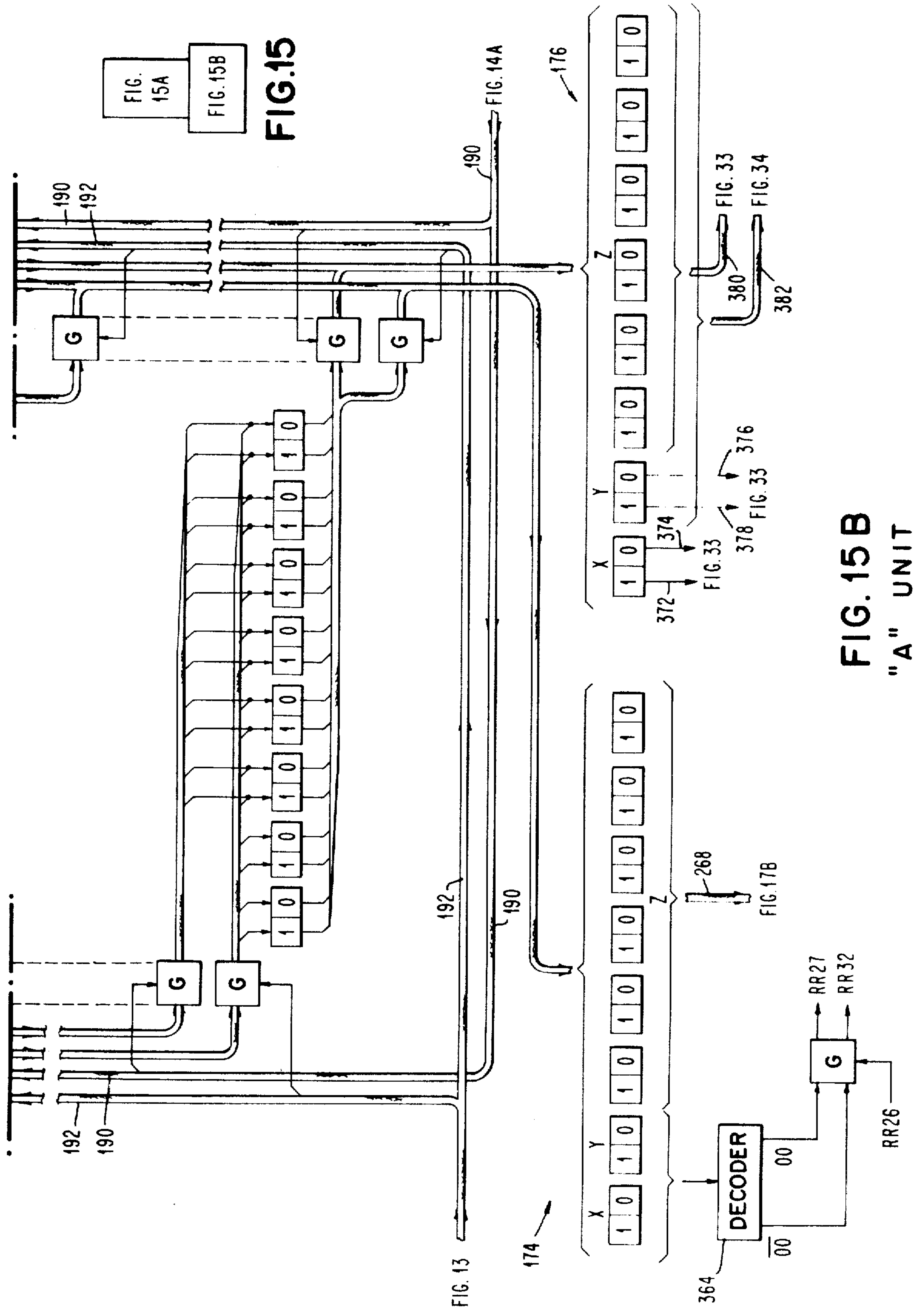
FIG. 15 FIG. 15B "A" UNIT

"B" UNIT

A UNIT

"A" UNIT

"WRITE" FLOWCHART

"WRITE" FLOWCHART

"READ" FLOWCHART SEE ALSO FIGS. 28, 29, 30 AND 31

LOAD UNTIL "LOAD" CTR = O OR CTR B = CTR A

UNLOAD UNTIL CTR B = CTR A

UNLOAD UNTIL "UNLOAD" CTR=0

"READ A RECORD" FLOWCHART

"AUT" FLOW CHART

"AUT" FLOW CHART

| OP | Q | R |
|---|---|---|
| OP CODE | ——— | ADDRESS |

FIG. 46

| | | |
|---|---|---|
| 0 | 1 | BR–(A+4) |
| 1 | 1 | END |
| 0 | 1 | STOP AUT |
| 1 | 1 | READ |
| 0 | 1 | BR–α–EOR |
| 0 | 0 | |
| 0 | 1 | BR–α–EOR |
| 0 | 0 | |
| 0 | 1 | BR–α–EOR |
| 0 | 0 | |
| 0 | 1 | SKIP |

FIG. 47

| | | |
|---|---|---|
| 0 | 1 | BR–(A+4) |
| 1 | 1 | END |
| 0 | 1 | STOP AUT |
| 1 | 1 | READ |
| 0 | 1 | BR–α–EOR |
| 0 | 0 | |
| 0 | 1 | BR–α–EOR |
| 0 | 0 | |
| 0 | 1 | BR–α–EOR |
| 0 | 1 | BR–α–EOR |
| 0 | 0 | |

FIG. 48

INPUT-OUTPUT CONTROL SYSTEM FOR DATA PROCESSING APPARATUS

BACKGROUND OF INVENTION

This invention relates to an input-output control system which effects the expeditious input into and output from the central processing units of data processing apparatus of information to be processed, and of the resulting processed information respectively.

With the progressively increasing size, complexity and speed of operation of data processing apparatus, to insure that such apparatus is availed of in a most efficient manner, multiprogramming and time sharing techniques have been utilized. To enable optimization in the use of such techniques, the control of input to and output from such apparatus has become commensurately increasingly complex. Thus, for example, general purpose data processing apparatus may be called upon to handle a variet f time-shared programs for concurrent execution for many diverse tyr es of input-output devices such as magnetic tapes and drums, high speed printers, display units, punched card translators, etc. and different pluralities of each type of such input-output devices whereby it is enabled to fulfill many different requirements.

Accordingly, it is an important object of this invention to provide for use in data processing apparatus which may include a plurality of central processing units and a multiplicity of different types of input-output devices, an input-output control system which exercises supervisory and monitoring control over the routing of information and data streams between the central processing units and the peripheral input-output devices of the apparatus.

It is another object to provide an input-output system which is capable of the setting of access priorities of peripheral input-output devices to a central processing unit in data processing apparatus, the scheduling of information processing tasks, the allocation of memory space, and the performing of all normal input-output functions for programs being currently and concurrently executed.

It is still another object to provide an input-output system in accordance with the preceding objects which is capable of the buffering of transmissions between the central processing unit and peripheral devices and remote terminals.

It is a further object to provide an input-output system in accordance with the preceding objects which also serves as a dynamic diagnostic control by continuously monitoring fault-locating circuitry and by periodically scheduling diagnostic programs for the other components of the apparatus.

SUMMARY OF THE INVENTION

In accordance with the invention, there is provided in a data processing system comprising central processing means, a plurality of storage means, and a plurality of input-output devices, an input-output control system. The system comprises an input-output control arrangement which controls data transmissions between the storage devices and the input-output devices and the selection of input-output devices for communication with the storage devices. The system further includes a supervisory control arrangement which is operative to effect the scheduling, preparing and queuing of jobs for the central processing means and assignment of storage and input-output devices to each job.

There is further included in the system, a remote terminal control arrangement for directing the transmission of data to and from remote terminals.

The foregoing and other objects, features and advantages of the invention will be apparent from the following more particular description of a preferred embodiment of the invention, as illustrated in the accompanying drawings.

BRIEF DESCRIPTION OF THE DRAWINGS

In the drawings:

FIG. 2A is a table which sets forth the interrelated operations of the input-output control system and the storage devices in the data processing system;

FIGS. 15A and 15B, taken together as in FIG. 15, is a block diagram of an arrangement suitable for use as an A unit buffer;

FIG. 46 shows the format of the "read a record" instruction;

FIG. 47 shows a first possible condition of the A unit buffer when the B unit is first called; and FIG. 48 shows a second possible condition of the A unit buffer when the B unit is first called.

DESCRIPTION OF A PREFERRED EMBODIMENT

Figure 1:
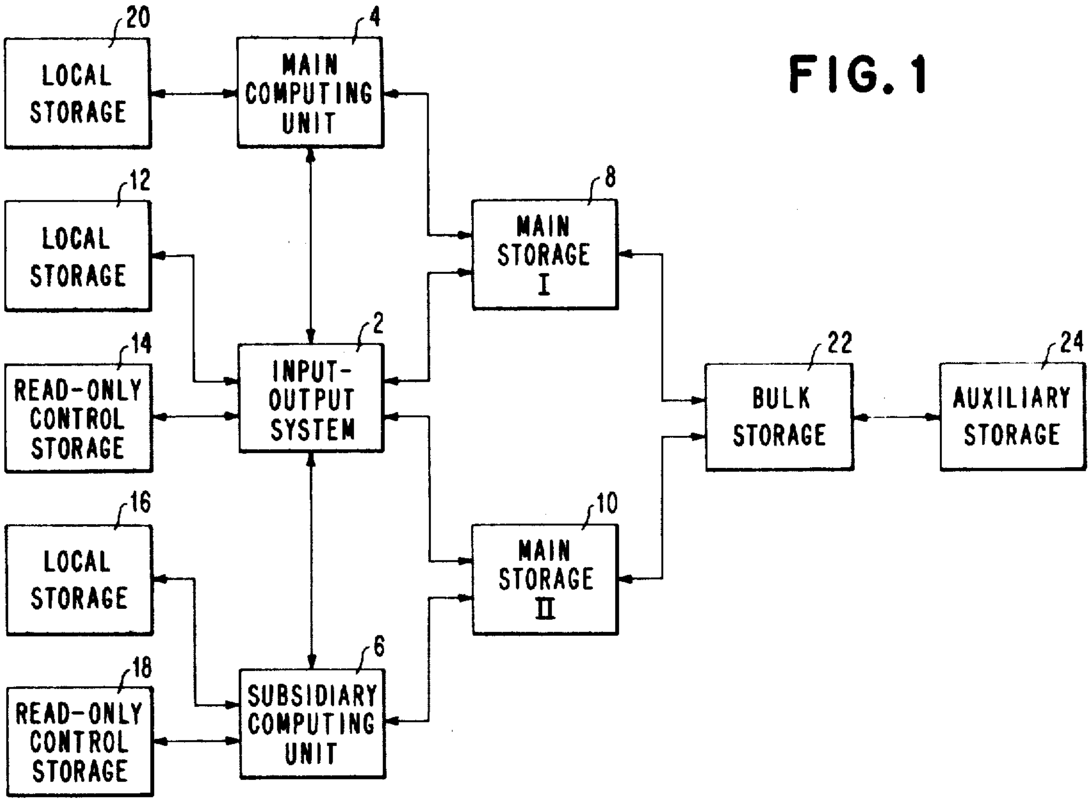
FIG. 1 is a block diagram of a data processing system wherein there is shown the relationship of the input-output control system of the invention to the other components.

Prior to the actual describing of the invention, at this point it is convenient to consider the type central processor or computer with which the input-output system according to the invention can be advantageously utilized.

Let it be assumed, for example, that the central processor essentially comprises a principal computing unit in which data processing operations are handled, a subsidiary computing unit which is in the main utilized for character handling and for compilation and interpretation of the various computer languages, and a memory system. These three essential components appear to the input-output processor as functional blocks having respective groups of distinct characteristics.

Thus, the principal computing unit appears to the input-output system as a relatively expensive functional block which is capable of extremely rapid calculating; which is scheduled in a batch processing mode, i.e., each job therein is run to completion without interruption; which by itself controls all accesses and queues to a portion of a high speed memory unit which has been assigned as exclusively belonging to it but which communicates with other memory units and auxiliary storage units only through requests to the input-output system; and which is to have no direct communication with a subsidiary computing unit such as one which performs compilation, or with remote terminals and devices.

Clearly, the expensiveness of such principal computing unit necessitates that its idle time be minimized as much as is possible. Such requirement in conjunction with its characteristics would optimally require that it is to have the highest priority for input-output requests; that it is not to be interrupted; that it is to be so scheduled that the setup times between jobs is minimized; and, preferably, that its request for input data be anticipated (suitably in the subsidiary computing unit, i.e., one which performs compilation) before such data is actually required.

The subsidiary computing unit which is preferably optimized for character-handling and for the compilation and interpretation of computer oriented languages is advantageously scheduled as a time-shared computer in which one of its programs, such as a background program, is a program compilation and the others of its programs, such as foreground programs, are compilations or interpretations of statements from users at remote terminals. Thus, the subsidiary computer or compiler preferably is to communicate only with remote terminals through the input-output system, and is to have no direct communication with the principal computing unit. Also, it is to communicate with the aforementioned other memory units and auxiliary storage units only through requests to the input-output system.

Eventually, the input-output processor has to schedule all jobs, both foreground and background, for the subsidiary computing unit, to perform all normal input-output functions therefor, to perform all input-output functions for programs running on the subsidiary computing unit, to perform all input-output functions for subsidiary computing unit programs which are not currently being processed but which have commenced input-output activity and are awaiting its completion, and to buffer transmissions between the subsidiary computing unit and remote terminals.

The memory system in the central processing unit in the data processing apparatus in which the inventive input-output system is employed may be assumed to comprise several distinct components. For example, it may comprise a main storage (the memory referred to hereinabove of which a given portion is designated as belonging only to the principal computer) whose use is in connection with programmed data, a bulk storage for storing data, a local storage for storing intermediate results, a read-only storage for microprogram control, and "fast" and "slow" auxiliary storage devices, the latter also being utilized to store data. Of the foregoing, of the devices other than the auxiliary storage devices, the local storage probably has the shortest access time and the smallest capacity whereas the bulk storage has the longest access time and the largest capacity. The main and read only storage components have relatively short access times and relatively large storage capacities.

Suitably, the auxiliary storage devices communicate only with the bulk storage which in turn communicates with the main storage, the respective communication paths being controlled by the input-output system.

Because of the need to give priority to the principal computing unit by virtue of its expensiveness as explained hereinabove, a portion of the main storage is exclusively designated therefor. Thus, the main storage is suitably divided into two portions, viz, a first portion for the principal computing unit and which is under its exclusive control except possibly for data transfers between it and the bulk storage which are suitably controlled by the input-output system and a second portion which is assigned to the subsidiary computing unit and the input-output processor. The second portion typically contains data for input-output programs, instructions and data for the background subsidiary computing unit program and instructions and data for several foreground subsidiary computing unit programs. The allocation of space in the second portion of main storage is dynamically controlled by the input-output system and the second portion is advantageously provided with both relocation and protection features, the latter features not necessarily being included in the first portion.

To fulfill its functional objectives as set forth hereinabove, the input-output system, according to the invention, may be considered, for convenience, as comprising three components, viz, an input-output unit, a remote terminal control unit, and a supervisory control unit, the units being designated with the letters I, R and S respectively.

Referring now to FIG. 1, it is seen that there is depicted therein the data flow as described hereinabove and as controlled by the input-output system according to the invention. The latter system, stage 2 in FIG. 1 communicates with a main computing unit 4, a subsidiary computing unit 6, each portion of the main storage, viz, main storage I designated with the numeral 8 and main storage II, designated with the numeral 10, local storage 12, read-only control storage 14, local storage 16 and read-only control storage 18.

Main computing unit 4 communicates with local storage 20, input-output system 2 and main storage I which is that portion of main storage assigned exclusively to it. Both of the main storage portions, viz, 8 and 10, communicate with bulk storage 22 which in turn also communicates with auxiliary storage 24.

Figure 2:
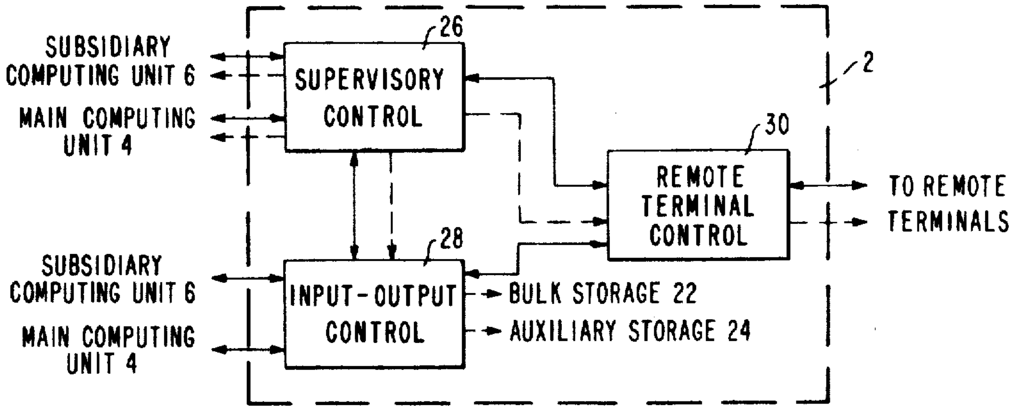
FIG. 2 is a block diagram of the input-output system in some detail.

FIG. 2 conceptually depicts the data flow and control paths in input-output system 2 shown in FIG. 1. It is seen in FIG. 2 that this system comprises a supervisory control unit 26, an input-output control unit 28 and a supervisory control unit 30. The solid communication lines are intended to depict data paths and the broken lines, control paths.

To more readily understand the operation of the arrangements shown in FIGS. 1 and 2 and the communications between the various stages therein, it is convenient to consider at this point the table shown in FIG. 2A.

In the table, the symbols have the following significance:

| | |
|---|---|
| IF | Register in main computing unit 4 communicating with input-output control 28. |
| SF | Register in main computing unit 4 communicating with supervisory control 28. |
| IC | Register in subsidiary computing unit 6 communicating with input-output control 28. |
| SC | Register in subsidiary computing unit 6 communicating with supervisory control 26. |
| FI | Register in input-output control 28 communicating with main computing unit 4. |
| CI | Register in input-output control communicating with subsidiary computing unit 8. |
| SI | Register in input-output control 28 communicating with supervisory control 26. |
| RI | Register in input-output control 28 communicating with remote terminal control 30. |
| FS | Register in supervisory control 26 communicating with main computing unit 4. |
| CS | Register in supervisory control 26 communicating with subsidiary computing unit 6. |
| IS | Register in supervisory control 26 communicating with input-output control 28. |
| RS | Register in supervisory control 26 communicating with remote terminal control 30. |
| IR | Register in remote terminal control 30 communicating with input-output control 28. |
| SR | Register in remote terminal control 30 communicating with supervisory control 26. |

As may be seen from FIGS. 1 and 2 and the table, there are three types of connections between system components, viz, buses, registers and control lines. The buses, i.e., those communication paths depicted as solid lines transmit streams of data. The control lines, i.e., those depicted as broken lines permit direct intervention of one unit by another. The registers, as set forth in the table, contain command or status information. As will be further explained hereinbelow, the control lines are activated only by supervisory control unit 26 (FIG. 2).

Main storage I and its buses are controlled by main computing unit 4. Transfers between the latter storage and bulk storage 22 are initiated by input-output control unit 28 but under the queueing control of main computing unit 4. Unit 28 also has to be capable of reading input-output control commands from main storage I. Main storage II, bulk storage 22, auxiliary storage 24 and all their respective associated buses are controlled by input-output system 2.

In considering the table set forth hereinabove, it is assumed that two directly intercommunicating computing units are designated X and Y, and that two registers are assigned, viz, one designated XY for transmitting information from component X to component Y and one designated YX for transmitting information from component Y to component X. The information in the registers is used at the convenience of the receiver and the operation of the registers may be typified by the following operations outlining an input-output request by main computing unit 4.

1. Main computing unit 4 loads a register FI (in unit 28) with an input-output command and sets bit $FI_0$ (the first bit) to one.

2. Input-output control 28 recognizes signal $FI_0$, begins to execute the command in register FI and resets bit $FI_0$ to zero thereby indicating the initiation of the execution of the command.

3. Once bit $FI_0$ is so reset, main computing unit 4 may issue another input-output command or inquire as to the status of an input-output operation in progress by reloading register FI with an appropriate command.

4. Upon the completion of an input-output command and at specified points during a sequence of input-output commands, input-output control 28 loads a register IF with status information and sets bit $IF_0$ of register IF to one.

5. Main computing unit 4 acknowledges receipt of information in register IF by setting bit $IF_0$ to zero.

INPUT-OUTPUT CONTROL SYSTEM 2

Input-Output Control 28

Input-output control 28 regulates the transmission of data between bulk storage 22 and auxiliary storage 24 and between bulk storage 22 and main storage I and II. Control 28 is a suitably microprogrammed computer controlled by a read-only memory and, generally speaking, performs routine functions of a housekeeping nature. The sequence of microprogram steps is controlled by commands issued by either main computing unit 4 or subsidiary computing unit 6 or by supervisory control 26 and remote terminal control 30 of input-output system 2. The principal functions of input-output control 28 are as follows:

1. The transforming of symbolic input-output control 28 designations to specific unit names;

2. The determining as to which channel(s) control 28 is connected;

3. The establishing of a data path from control 28 to bulk storage 22;

4. The updating of addresses and counts during data transfer;

5. The performing of data and command chaining;

6. The interpreting and transmitting of status information on the progress of input-output action;

7. The stacking of input-output requests to busy units;

8. The controlling of data transmission between bulk storage 22 and main storage I and II by performing functions analogous to the functions set forth immediately hereinabove and designated 3—6 respectively.

Remote Terminal Control 30

Remote terminal control 30 directs the transmission of data to and from the remote terminals. Users at the remote terminals time-share subsidiary computing unit 6 and input-output system 2 to debug programs and to execute short programs. Inasmuch as a terminal is an input-output device, remote terminal control unit 30 has to perform most of the functions required of input-output control 28. However, as the rate of information transfer in remote terminal control 30 is several orders of magnitude slower than that in input-output control 28, controls 28 and 30 are considered separately. Thus, input-output devices such as printers, punches, and readers are preferably connected to remote terminal control 30 whereas remote devices which require a relatively large data transfer rate to maintain displays are connected to input-output control 28. Remote terminal control 30 performs the following tasks:

1. It accepts and responds to terminals on a character by character basis;

2. It assembles characters into strings;

3. It detects when a string requires processing by subsidiary computing unit 6 or input-output system 2 and notifies supervisory control unit 26 of this condition;

4. It accepts strings from subsidiary computing unit 6 or input-output system 2 for transmission to terminals.

Supervisory Control 26

The principal functions of supervisory control 26 is to keep all of the other components of the computer working efficiently. This function essentially comprises two important tasks, viz:

1. The scheduling of jobs for main computing unit 4 and subsidiary computing unit 6.

2. The allocation of storage space in main storage I and II, and bulk storage 22.

As has been mentioned hereinabove, since main computing unit 4 is most advantageously operated in a batch processing mode, its scheduling is the relatively simple operation of minimizing the idle time between jobs by setting up the $k$th job while the $(k-1)$ th job is still in progress.

The schedule for subsidiary computing unit 6, which is suitably operated on a time-shared basis may be more complex. The list of terminals requiring attention by subsidiary computing unit 6 at any given moment is suitably maintained by remote terminal control 30 but it is supervisory control 26 which determines which terminal is actually to be serviced. Factors influencing this choice include the priorities of requestors, the period that each of the latter has been waiting for service, the expected duration of service, and the current storage allocation.

Although supervisory control 26 communicates with other system components primarily by means of special registers, interruption lines are also suitably provided to connect supervisory control 26 to main computing unit 4 and subsidiary computing unit 6 and to input-output control 28 and supervisory control 26. Whereas the special registers provide information which is utilized at the convenience of the receiver, the interruption lines exercise positive control. Thus, for example, if main computing unit 4 has exceeded its allotted time for a particular job, supervisory control first signals main computing unit 4 via a register SF (in supervisory control 26) to terminate its job at a convenient point. If at this point, supervisory control 26 fails to receive a satisfactory response, it interrupts main computing unit 4 and stops the execution of the job. Suitably, the interruption inhibits the fetching of new instructions but permits all current operations and those in any look-ahead unit to be completed, thereby providing a smooth shutdown.

In addition to its two major tasks, i.e., the scheduling of jobs and the allocation of storage, supervisory control also serves as a dynamic diagnostic control by continuously monitoring fault locating circuitry and by periodically scheduling diagnostic programs for other system components. In carrying out the diagnostic control function, faulty equipment is logically disconnected, the remaining components are arranged in a new system configuration, and error messages are sent to service personnel.

In accordance with known data processing equipment constructions, interfaces, i.e., data, parity and control lines, for example, are provide between the input-output system and the input-output devices, i.e., tape drives, disks, drums, consoles, printers, etc.

The control by the input-output system of transmissions between the several storage units is according to the invention, accomplished by components conveniently designated as A and B units in input-output control 28 (FIG. 2). As will be further explained hereinbelow, the responsibilities assigned to each type of these units are as follows:

A Units

1. The buffering of byte-by-byte data transmission across the interface.

2. The monitoring of and the responding to interface control signals.

3. The verifying, filing and recording of identification marks.

B Units

1. The initiation of A unit sequences for device selection, command, data transmission and ending.

2. The storing and fetching of data in bulk or main (central processor) storage.

3. The updating of addresses and counts.

4. The generation and verification of parity and redundancy checks.

5. The controlling of record search operations.

In a complete input-output control stage there may be as much as 10 or 12 B units and a hundred or more A units. Each B unit may be connected to 10 to 20 A units and continually scans these units in a search for an A unit which requires service. Upon the servicing of an A unit, such as the emptying or refilling of its buffer, for example, the B unit continues to scan. Each A unit can be serviced by at least two B units, the servicing ratio being determined by a particular requirement. The B units are essentially program controlled (suitably by a microprogram) whereas the A units are controlled by the system hardware. With such arrangement, the processing capacity of a unit is matched with the actual processing done by such unit a majority of the time. Thus, simple, frequently occurring operations are performed by simple equipment and the idle time of complex equipment is reduced. For example, A units are constructed so as not to include means for updating addresses, an operation which need be carried out only once for about every eight or 10 bytes, such tasks being assigned to B units whose respective facilities are available to several A units.

Figure 3:
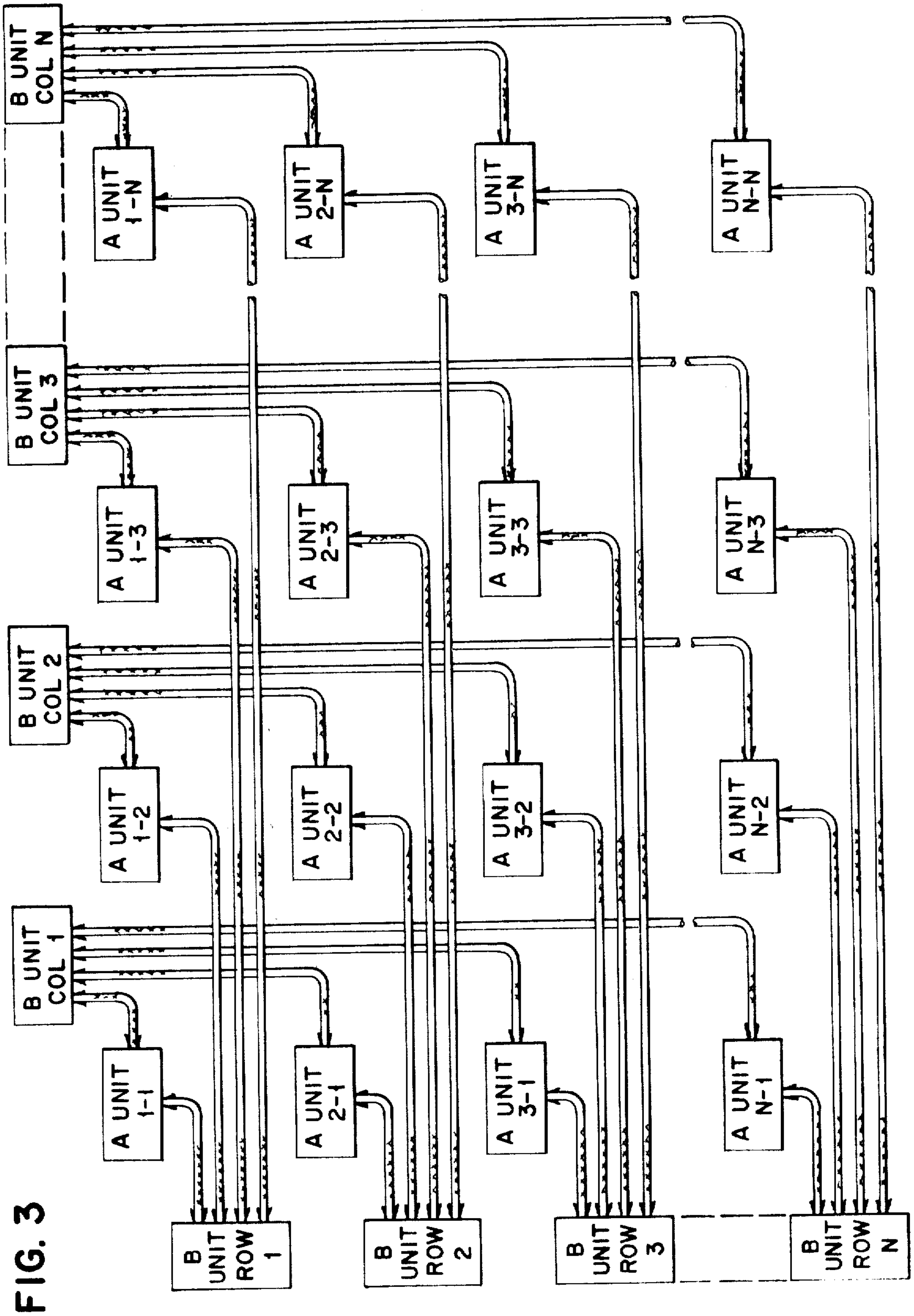
FIG. 3 is a block diagram which conceptually depicts the interrelationship of the A and B units of the input-output control stage of the input-output control system.

Reference is now made to FIG. 3 wherein there is shown a conceptual arrangement of the A units and B units in rows and columns to illustrate how each row of A units is serviced by a "row" B unit and how each column of A units is serviced by a "column" B unit. With this arrangement, it is thus seen that it is possible for each A unit to be serviced by one of two B units. Of course, consistent with any particular requirements, there could be more than two B units for each row or column A units.

In the arrangement shown in FIG. 3, it is assumed that there are a plurality of processing or computer units and a plurality of input-output devices. It is further assumed that each input-output device has "appropriate" A units with which it is arranged to operate. In the legending of the A units in FIG. 3, the first number designates the conceptual row in which the particular A unit is located and the second number designates the conceptual column.

In the table shown immediately hereinbelow, there is given an example in which the system would contain seven input-output devices and five units.

| I–O Device | Appropriate A Unit |
|---|---|
| ●1 | ●2 or ●4 |
| ●2 | ●1 or ●3 |
| ●3 | ●1 or ●2 |
| ●4 | ●4 or ●5 |
| ●5 | ●1 or ●4 |
| ●6 | ●3 or ●4 |
| ●7 | ●2 or ●3 |

The A units set forth in the above table could be scattered throughout the array of A units shown in FIG. 3. It is readily appreciated that a central processing unit can, by using tables showing current operations or by using more complicated logic involving "busy," "not busy" flip-flops, or other switching devices, choose an A unit so as to balance load or meet some other criterion.

Figure 4:
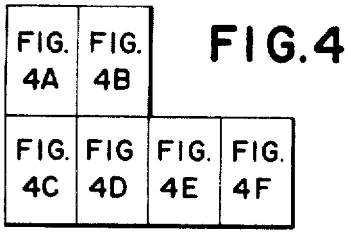
FIGS. 4A—4F, taken together as in FIG. 4, is a block diagram of an illustrative embodiment of an arrangement for effecting a "processor seek" operation according to the invention.
Figure 4A:
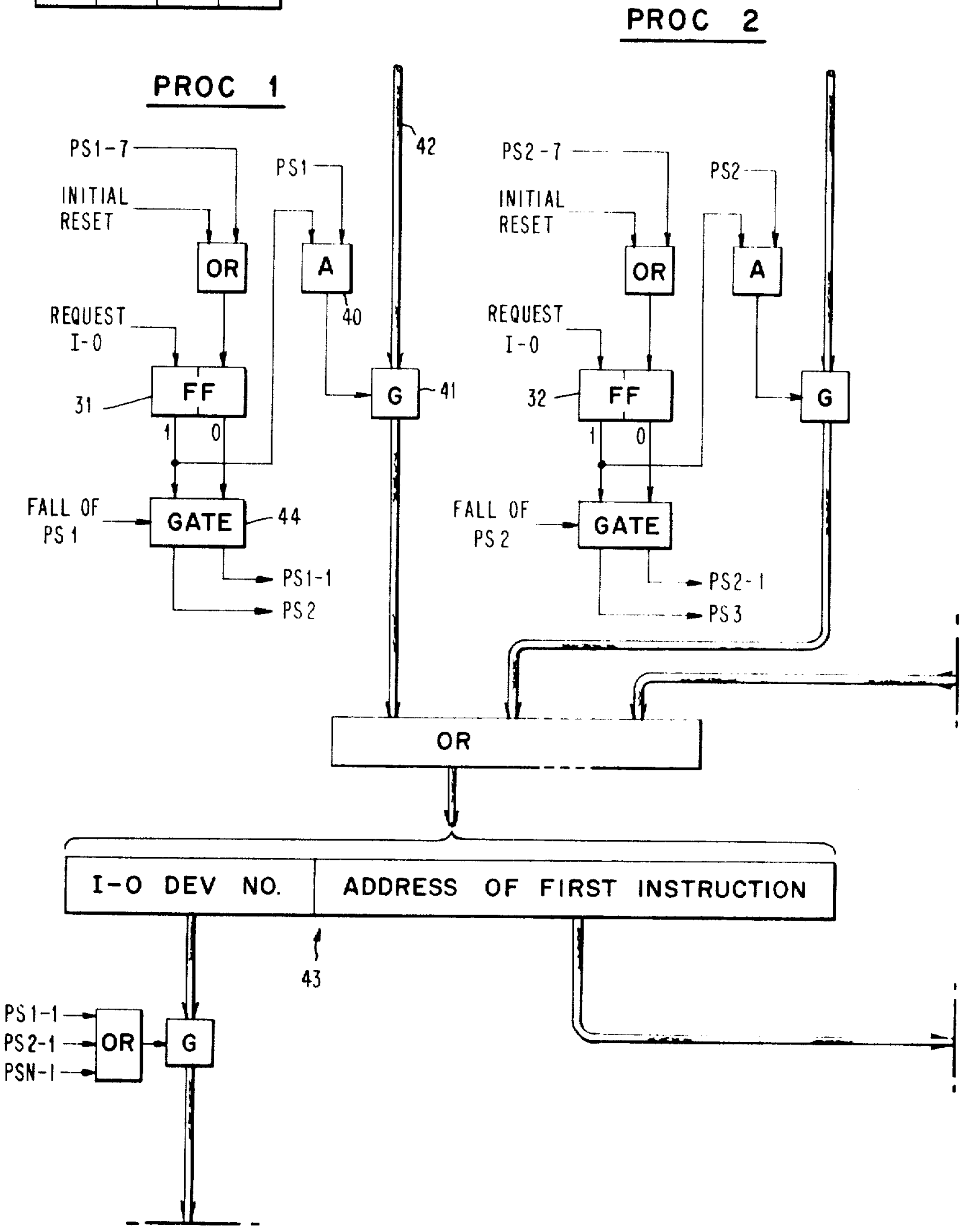
Figure 4B:
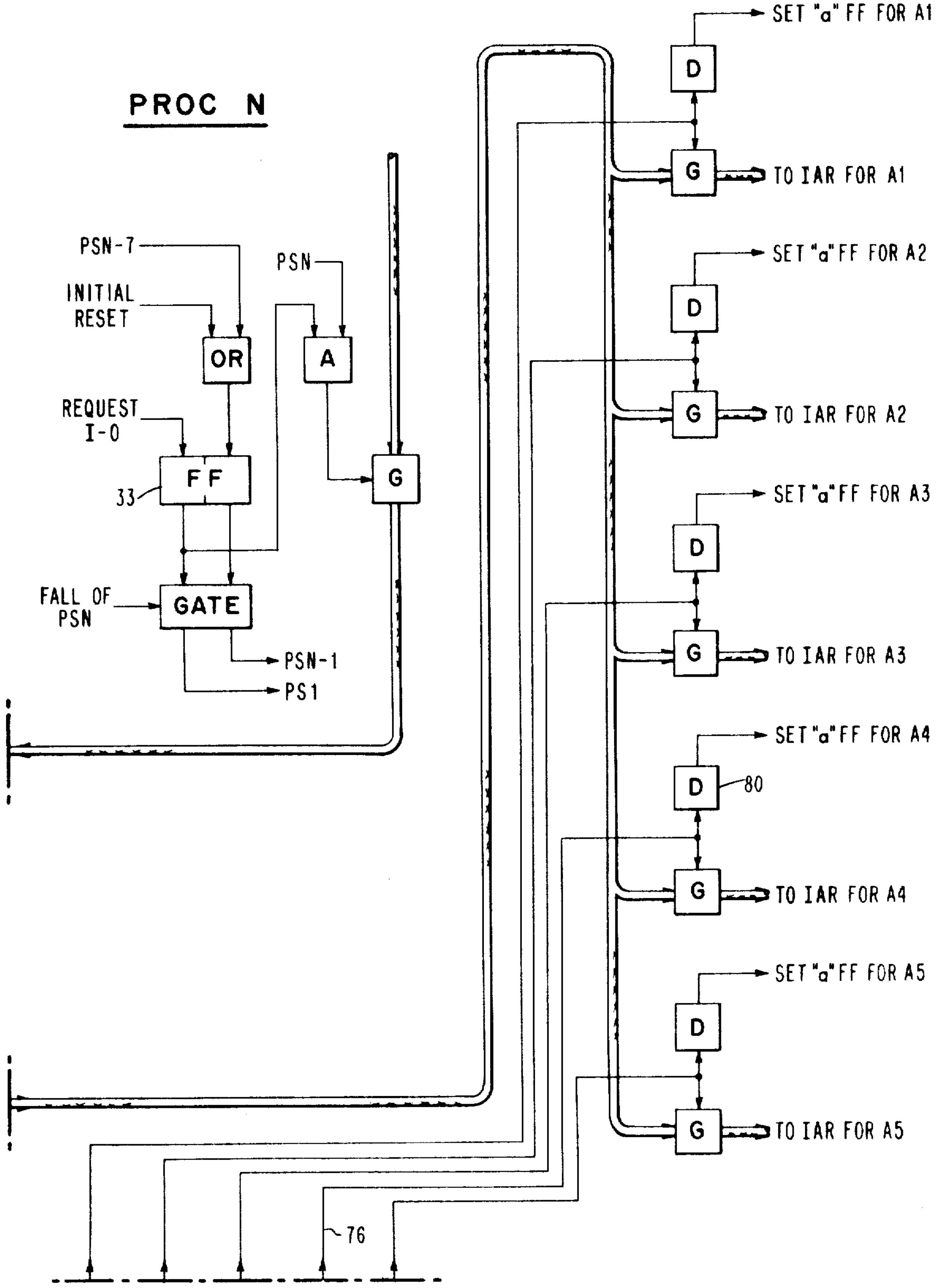
Figure 4C:
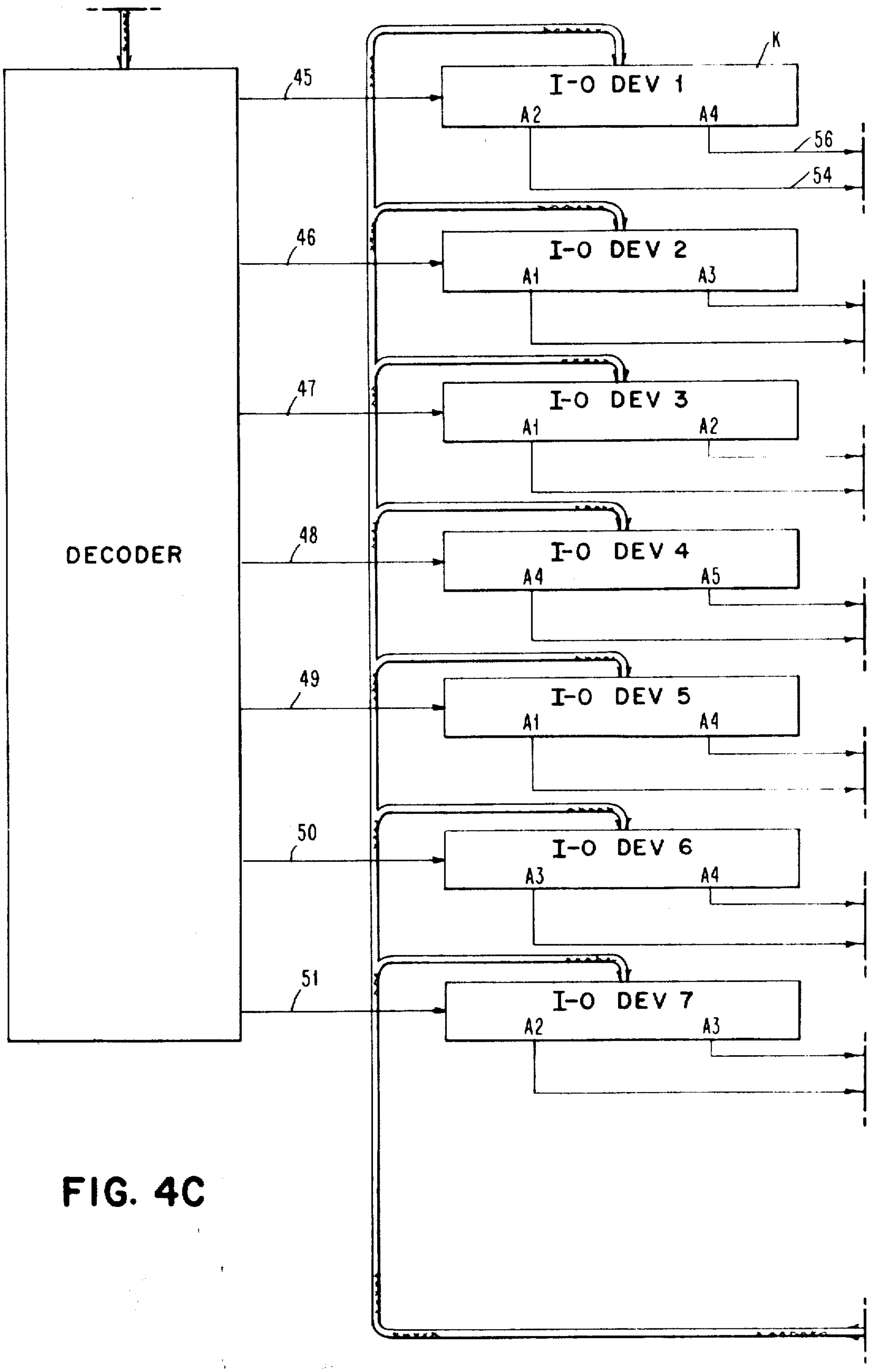
Figure 4D:
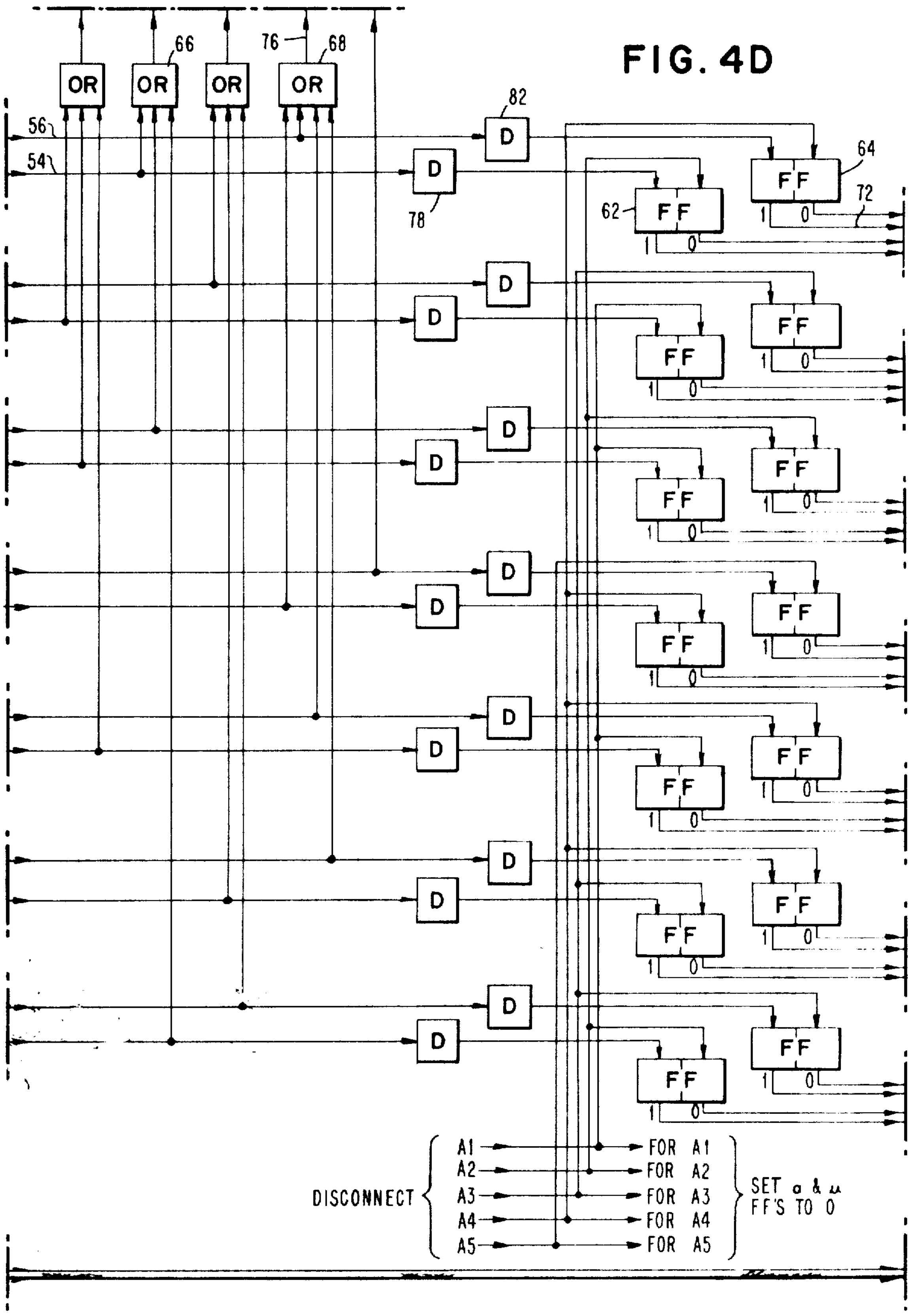
Figure 4E:
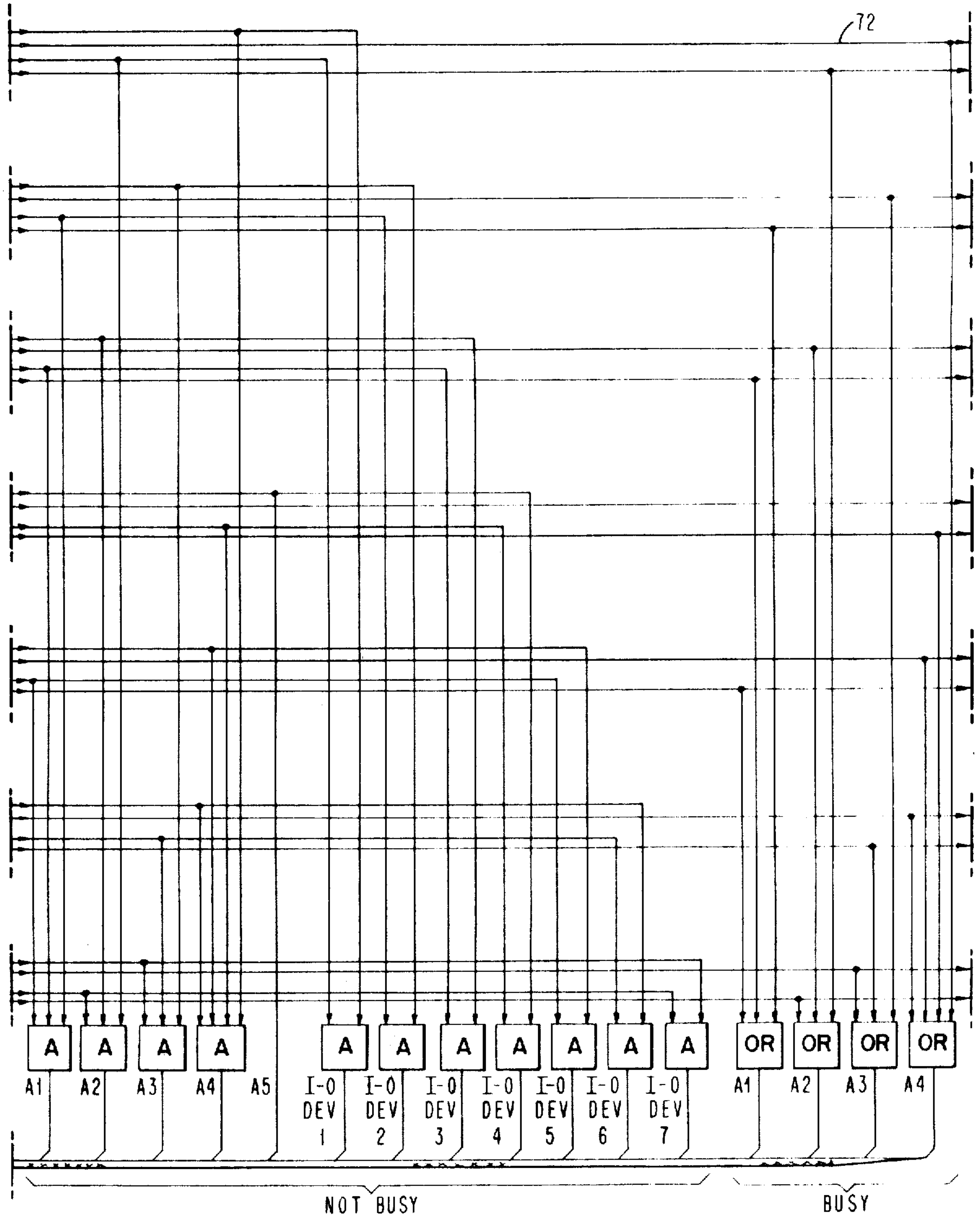
Figure 4F:
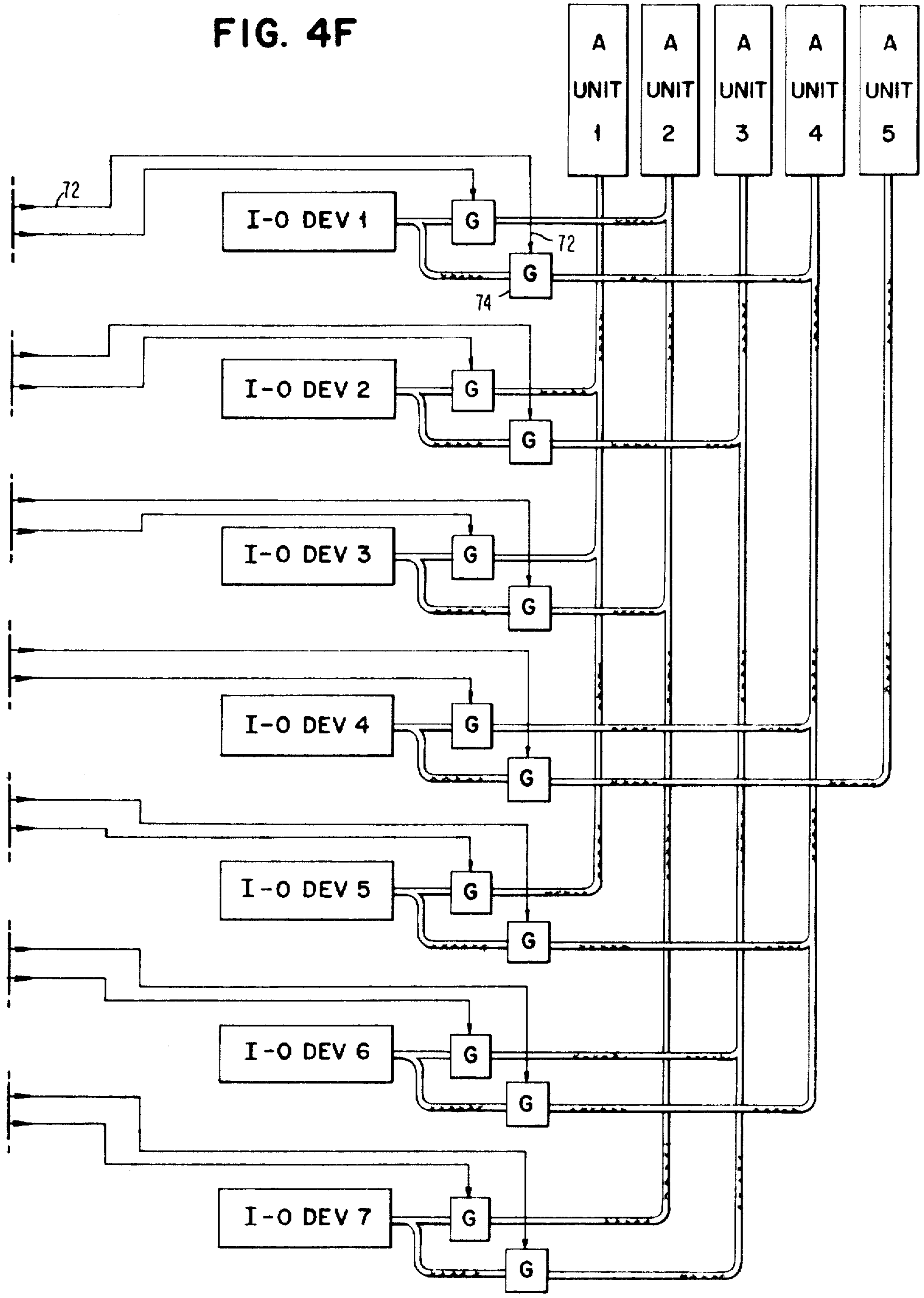
Figure 5:
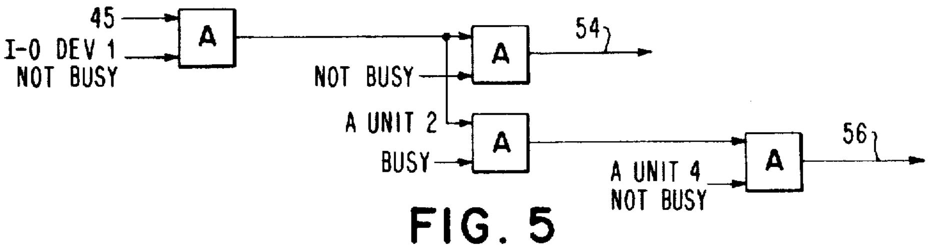
FIG. 5 is a block diagram of an arrangement suitable for use in determining the busy or nonbusy states of A units.

To understand how the various processing units cooperate with the "appropriate" A units, reference can be made to FIGS. 4A—4F taken together as in FIG. 4 and FIG. 5 which is a detailed depiction of the box designated K in FIG. 4C FIG. 4 illustrates the "Processor Seek" operation.

Referring to FIG. 4A, the flip-flops 31, 32, and 33 shown therein are initially set to "0" when the system is started. When a processor needs an input-output device, its "request I–O" line becomes active and the associated flip-flop 31, 32, or 33 is set to "1." The "Processor Seek" clock, designated by the legend PS1-7, et seq., continuously tests these flip-flops in ascending numerical order and, if any of these three flip-flops is at "1," it will effect the proper connection between the desired I–O device and the appropriate A unit provided that the I–O device is not busy and also provided that one of the appropriate A units is idle.

Figure 6:
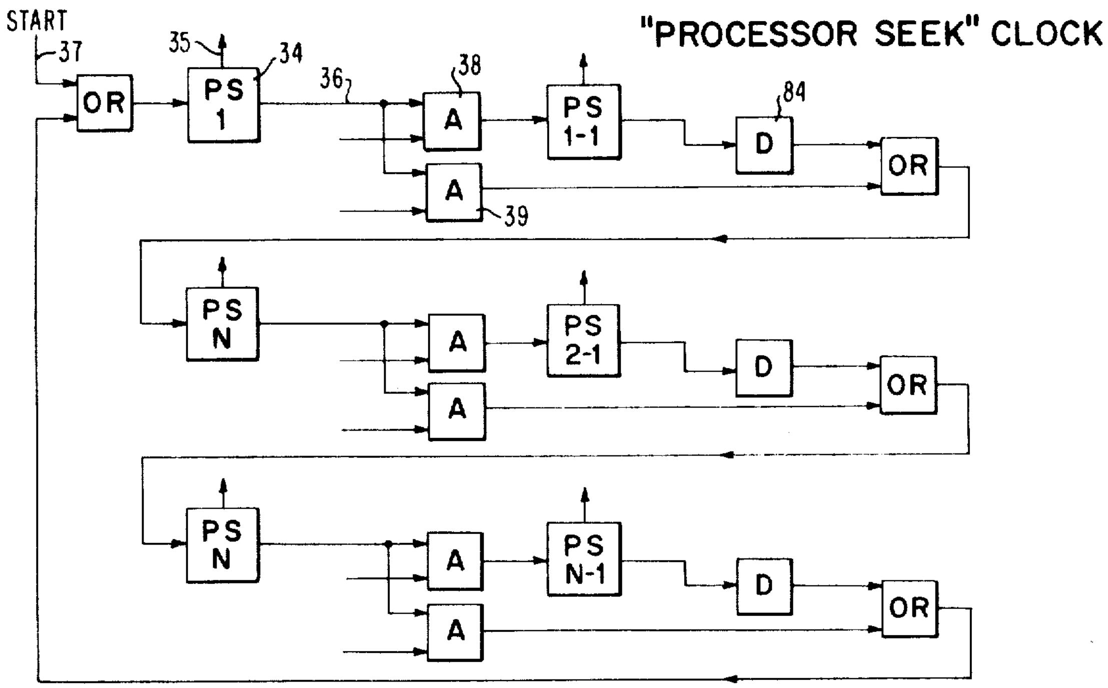
FIG. 6 is a block diagram of an arrangement suitable for use as the "processor seek" clock.

In FIG. 6 there is shown a suitable embodiment of a "-Processor Seek" clock. It is seen in FIG. 6 that such clock comprises several stages legended PS numeral, these stages suitably being monostable multivibrators. Thus, for example, when monostable multivibrator 34, i.e., designated PS1 is in its astable or "on" condition, it provides a pulse on line 35 and when it goes from its "on" to its "off," i.e., its stable condition, it delivers a momentary pulse on line 36. Initially, if it is assumed that all of the monostable multivibrators are in their off or stable states, to initiate the operation of the clock, a short pulse is applied to line 37 which switches stage 34 to its astable or "on" state. Thus, if processor 01, for example, as shown in FIG. 4A requests an input-output device, the "Processor Seek" clock will branch through an AND circuit 38 to stage PS1–1.

The output pulse from stage PS1–1, i.e., pulse PS1–1 would thereby connect the proper input-output device to an appropriate A unit provided that both the input-output device and the A unit are idle and the clock will proceed to stage PS2 through AND circuit 39.

Referring back to FIG. 4A, clock pulse PS1 is applied to an AND circuit 40. If processor 01 requests an input-output action, AND circuit 40 will pass clock pulse PS1 to AND circuit 41 which gates the input-output device number and the address of the first instruction which are on cable 42, to a register 43. Upon the reverting of monostable multivibrator PS1 to its stable state, its fall is at that time applied to a gate 44 and, in this situation, the clock will branch to PS1–1 (FIG. 6). Gate 44 in FIG. 4A may be considered the equivalent of the two AND circuits 38 and 39 in FIG. 6.

Clock pulse PS1–1 next gates the input-output device number from register 43 to the decoder as shown in FIG. 4C. In this decoder, upon the gating of the PS1–1 clock pulse, one of lines 45—51 become active. Thus, if it is assumed that line 45 becomes active the latter is applied to the circuit contained in the box legended K and which is depicted in some detail in FIG. 5.

Referring to FIG. 5, it is seen therein that if the input-output device is busy, the pulse on line 45 will be blocked. If the input-output device is not busy and both A units i.e., unit A2 and A4 are busy, the pulse on line 45 will also be blocked.

If the input-output device is not busy and if unit A2 is also not busy, the pulse on line 45 will exit to appear on line 54 (FIG. 5). If the input-output device is not busy and unit A2 is busy, but unit A4 is not busy, the pulse on line 45 will exit to appear on line 56.

It is to be noted that while the embodiment which has been shown indicates how a processor can find an idle input-output device and an idle A unit, other arrangements could suitably be utilized. For example, the request could come from a queue of input-output requests rather than from the processor directly and then information as to how the request had been handled could be sent back to the processor.

Referring to FIGS. 4A, 4B, and 4C, an output on line 54 is effected through a delay circuit 78 to set a flip-flop 62 to its "1" state. Similarly, an output on line 56 is effected through a delay circuit 82 to set a flip-flop 64 to its "1" state and it is also operative through an OR gate 68 and a line 76 to gate the address of the first instruction to the instruction address register (IAR) located in unit A4. Alternatively, the instruction address register could be a location in some centralized control memory. Line 56 is also operative through a delay circuit 80 to set the "a" flip-flop in the A4 unit, an embodiment of an A unit being described in further detail hereinbelow. The function of delay stages such as stages 78 and 82 is to delay the setting of the flip-flops such as flip-flop 62 and 64 until the pulse has disappeared from line 45. Such operation is necessary because the changing of the states of flip-flops 62 and 64 will cause a change in the state of the "busy" and "not busy" signals which are applied to the circuit of FIG. 5. The purpose of a delay stage such as delay 80 is to delay the setting of the "a" flip-flop until after the interconnections have been made between an input-output device and the A unit.

When monostable multivibrator PS1–1 reverts to its stable state (FIG. 6), the "processor seek" clock proceeds to multivibrator PS2 through a delay stage 84, delay 84 being provided to insure that sufficient time is provided for the "busy" and "not busy" signals to become established as a result of the setting of either flip-flop 62 or 64 to its "1" state.

Because the "a" flip-flop in the desired A unit is now set to "1," such A unit is a candidate for service by either its associated column B unit or its associated row B unit. Every B unit, when idle, continually searches sequentially for an A unit that requires service. An A unit's need for service is evidenced by the "on" condition of its "a" or "u" flip-flop or both.

Each B unit is provided with its own set of *a*, *u*, and *p* vectors in the form of three sets of flip-flops respectively, one set for each vector. Thus, if the B unit is a row B unit, the vectors are row vectors and if the B unit is a column B unit, the vectors are column vectors. Consequently, a component in an A unit can be reproduced in two places, i.e., once in the row B unit and again in the column B unit. The *a* vector is set from the "a" flip-flops at the discretion of the B unit. The *p* vector is a masking vector and a zero component in the *p* vector causes the corresponding "a" and "u" components to be treated as zeros regardless of their true values.

Figures 8, 8A:
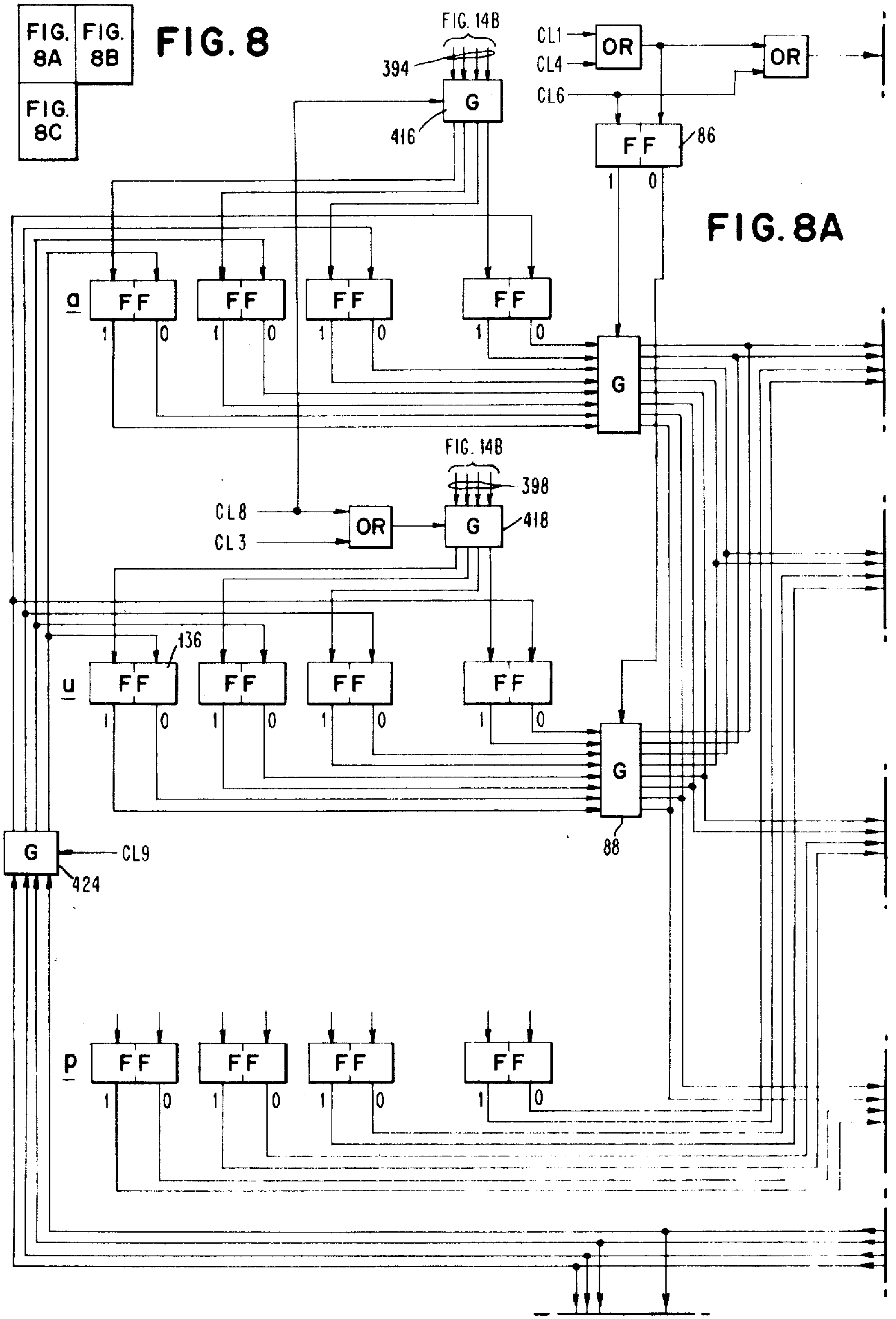
FIGS. 8A—8C, taken together as in FIG. 8, is a block diagram of an arrangement suitable for use in a B unit.
Figure 9:
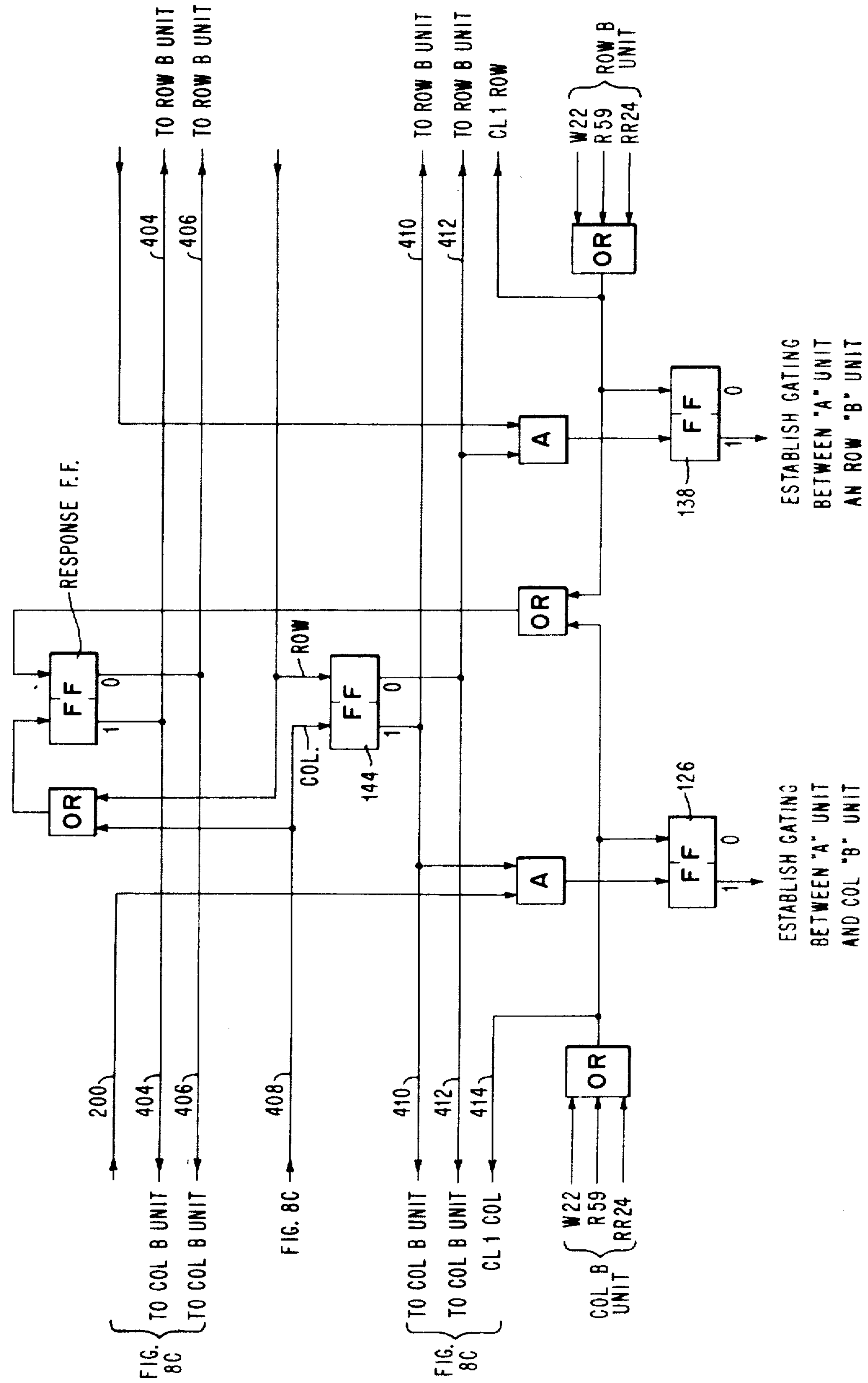
FIG. 9 is a block diagram of an arrangement suitable for use in an A unit.

The B units scan operation is described in conjunction with FIGS. 8, 9, 10, 11, and 14. FIG. 8 is a depiction of an embodiment of the circuitry contained in a B unit in order to enable it to accomplish a B unit's scan. The *a*, *u*, and *p* vectors are represented therein by the three horizontal rows of flip-flops legended *a*, *u*, and *p*. It is noted that no structures are shown for setting and resetting the "p" vector flip-flops as the latter are set arbitrarily and their function is only that of masking the *a* vector or *u* vector flip-flops. Since the circuitry shown in FIG. 9 represents a column B unit, it is conveniently examined together with FIG. 10 wherein there is depicted a flow chart for a column B unit scan.

Figure 7:
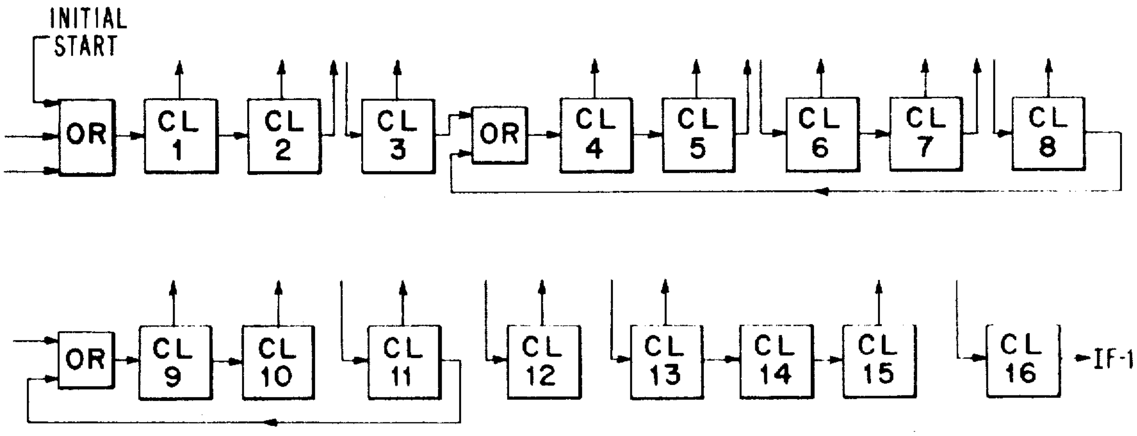
FIG. 7 is a diagram of an arrangement suitable for use as the "B unit scan" clock.

Each B unit is provided with its own clock for the B unit scan and such clock is shown in FIG. 7. The *a* flip-flops in FIG. 8 can be set to the "1" state by an enabling gate 416 which transfers the *a* vector from the A unit through the B unit. The *u* vector is transferred by enabling a gate 418.

Figure 8B:
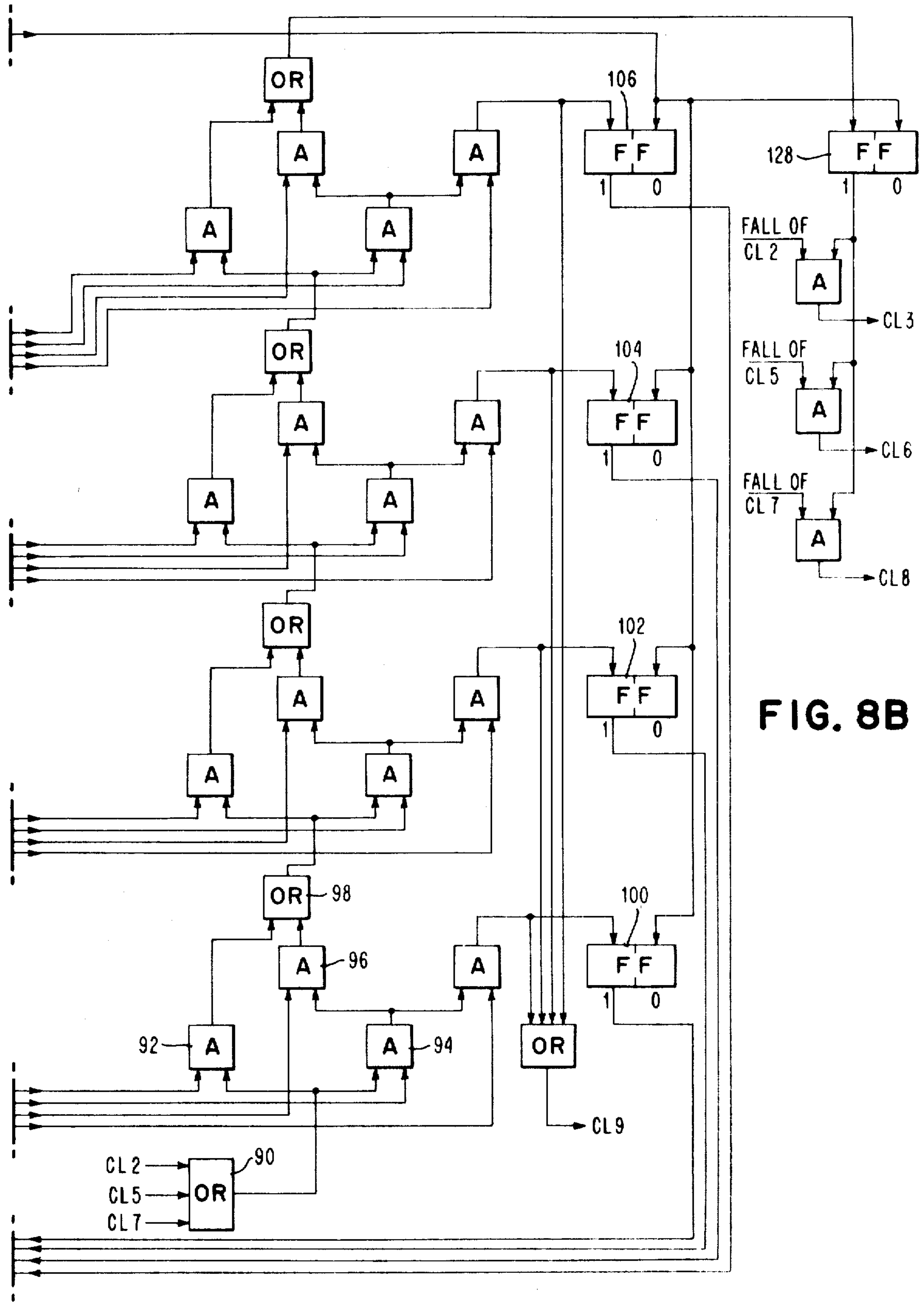

As seen in FIGS. 8A and 8B, the first B unit clock pulse, CL1 resets a flip-flop 86 to "0" and also sets flip-flops 100 to 106. A gate 88 is enabled to gate the *u* vector to a testing circuit whose initial stages are AND circuits 92 and 94. The clock pulse CL2 is next applied to an OR circuit 90 to ask the question "Is there anything in the *u* vector which is not masked out by the *p* vector?" If it is assumed that the leftmost *u* vector component, i.e., flip-flop 136 is in the "1" state and the corresponding *p* vector flip-flop is also in the "1" state, under these conditions, flip-flop 100 is set to a "1" and clock CL2 branches to clock CL9. It is to be noted that if there were no "1"'s in the *u* vector flip-flops, flip-flop 128 (FIG. 4B) would be set to a "1" and the clock would continue from CL2 to CL3. With the flip-flop 100 in the "1" state, a gate 420 is enabled. Gate 420 establishes the connection between the A unit which contains the *u* component represented by the flip-flop 136 which is in the "1" state and the column B unit. When clock pulse CL9 is applied to a gate 424, the active state of line 422 extends through gate 424 and is operative to reset flip-flop 136 and its corresponding *a* vector flip-flop to "0."

Figure 8C:
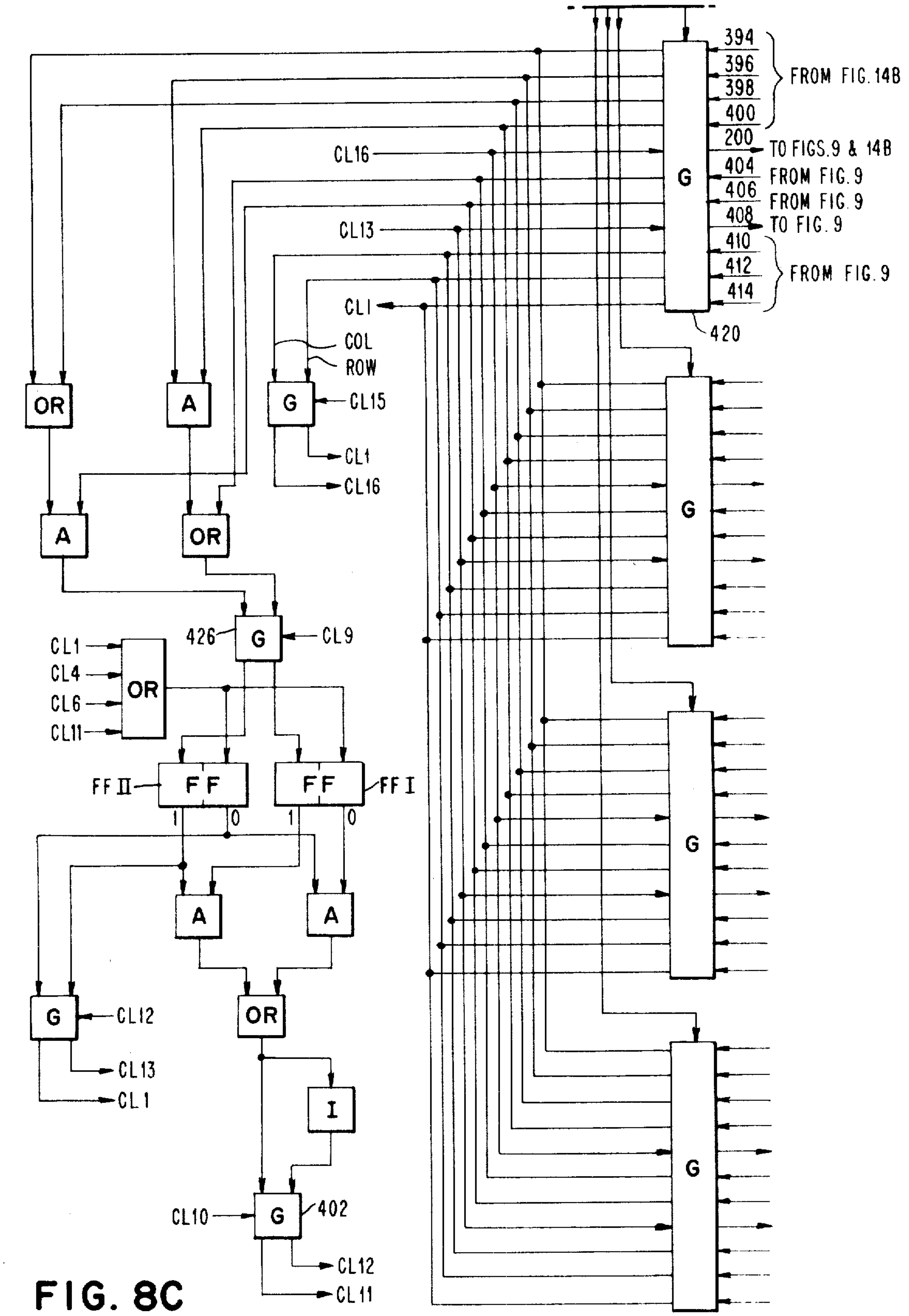
Figure 10:
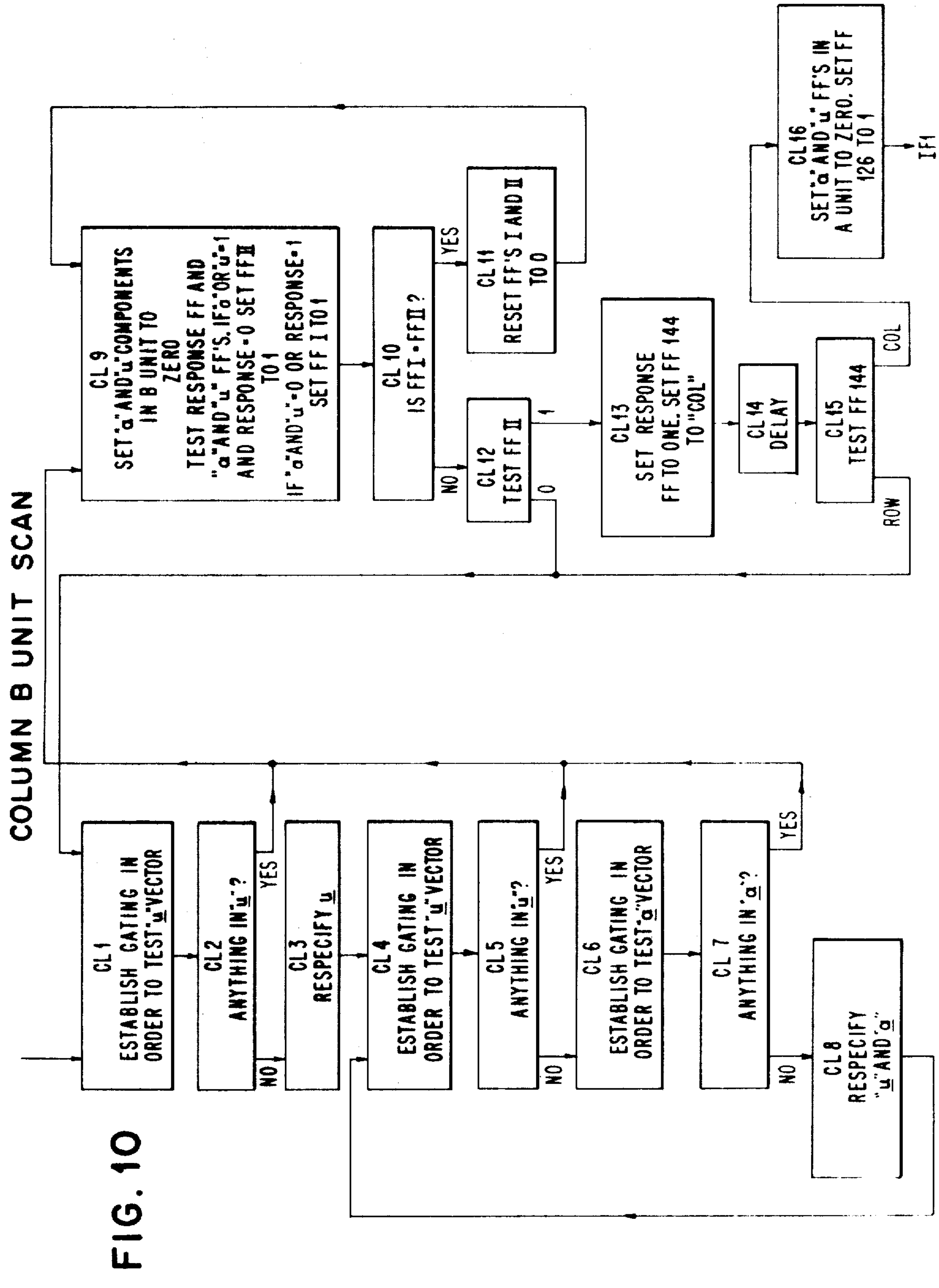
FIG. 10 is a flow chart which depicts a column B unit scan microprogram.
Figure 14:
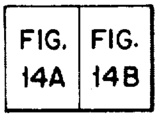
FIGS. 14A and 14B, taken together as in FIG. 14, is an arrangement suitable for use in carrying out chosen instructions relative to the A unit.

With such arrangement, the component is removed from both the *u* and *a* vectors. A second function of clock pulse CL9 is to test the status of the "*a*" and "*u*" flip-flops which exist in the A unit as shown in FIG. 10 and, also, to test the status of the "response" flip-flop which is shown in FIG. 9. The four lines to gate 420, viz, lines 394, 396, 398 and 400 come from the "*a*" and "*u*" flip-flops which exist in the A unit (FIG. 14). The two lines to gate 420, viz, lines 404 and 406 comes from the "response" flip-flop (FIG. 9). If the "response" flip-flop is in the "1" state, it indicates that the A unit is being serviced by a B unit. Accordingly, clock pulse CL9 is applied to a gate 426 (FIG. 8C). If either the "*a*" or "*u*" flip-flop is in the "1" state, and the "response" flip-flop is in the "0" state, flip-flop II is set to the "1" state. If both the "*a*" and "*u*" flip-flops are in the "0" state and the "response" flip-flop is in the "1" state, flip-flop I is set to the "1" state.

Flip-flops I and II are employed to break a possible tie which might occur if both the column B unit and row B unit were to attempt to service the same A unit simultaneously, i.e., if the "*a*" flip-flop, the "*u*" flip-flop or the response flip-flop are in the process of being switched in state at the time that the clock pulse CL9 occurs, both flip-flops I and II might be switched to their respective "1" states. Clock pulse CL10 tests for such condition and if flip-flop I is in the same state as flip-flop II, the clock branches back to CL9 and this situation continues until the tie is broken. If flip-flop I is not in the same state as flip-flop II, the clock proceeds to CL12 which tests flip-flop II. If flip-flop II is in the "0" state, this signifies that either both of the "*a*" and "*u*" flip-flops had been switched to their "0" states (an A unit has been serviced by the other B unit) or that the A unit is accepting service from the other B unit, the other B unit being the row B unit. If in fact, the A unit is receiving service from the other and row B unit, the B unit scan clock returns to clock CL1 and the *u* vector is again interrogated for a next component requiring service. If clock pulse CL12 ascertains that flip-flop II is in the "1" state, it means that up to this point, if a tie or a near tie is occurring, the column B unit is ahead of row B unit in their competition for giving service to the A unit.

Clock pulse CL13 is next applied to line 408 which as seen in FIG. 10 sets the response flip-flop to its "1" state and flip-flop 144 to "col." The clock then proceeds to clock CL14 which functions as a delay. The latter delay is chosen to be of long enough duration to resolve any final conflict between the row and column B units. For example, the column B unit might set the response flip-flop to "1" and flip-flop 144 to "-col." just slightly ahead of the time that the row B unit is setting the response flip-flop to "one" and flip-flop 144 to "row." In other words, flip-flop 144 might first be set to "col." and then to "row" if the clock pulse CL13 from the row B unit happens to have a slightly longer duration than the pulse from the column B unit. The conflict is resolved by the time that the CL15 clock pulse occurs. Clock pulse CL15 tests the lines 410 and 412 (FIG. 10). If flip-flop 144 is at "row," this signifies that the row B unit has won the race and the column B unit would then revert to clock CL1. If flip-flop 144 is at "col.," this signifies that the column B unit can go ahead and service the A unit. Clock pulse CL16 is applied to line 200 which resets the "*a*" and "*u*" flip-flops (FIG. 14B) to the "0" state and also to FIG. 9 wherein it is seen that it sets flip-flop 126 to the "1" state. Flip-flop 126 establishes the necessary gating between the A unit and the column B unit in order to enable the column B unit to service the A unit. The decay of clock pulse CL16 starts the IF clock (Information Fetch).

Referring back to clock CL2, if the interrogation of the *u* vector fails to produce any components in the "1" state, flip-flop 128 (FIG. 8B) is set to the "1" state whereby the decay of clock pulse CL2 is gated to clock CL3. Clock pulse CL3 is applied to gate 418 to respecify the *u* vector. The clock then proceeds to clock CL4 which in effect, is the same as clock CL1. Clock CL4 goes to clock CL5, clock pulse CL5 examining the *u* vector for "1" states and if a "1" state is found, the clock branches to CL9 as previously explained hereinabove. If there are no "1" states in the *u* vector, the clock proceeds to clock CL6 which enables gate 160 (FIG. 8A) and resets flip-flops 100 through 106 and flip-flop 128 (FIG. 8B) to their respective "0" states.

Clock pulse CL7 is next effective to test the *a* vector for the presence of "1" states. If there is a "1" state in the *a* vector, the clock branches to clock CL9 and proceeds as explained hereinabove. If there are only "0" states, in the *a* vector, the clock proceeds to clock CL8 to enable both of gates 416 and 418 (FIG. 8A) in order to respecify both the *a* and *u* vectors. The clock is chosen to be arranged such that only a single "1" state in the *a* vector is considered. If such "1" state is found, the B unit offers service to the A unit but the scan clock starts again at clock CL1 and the *u* vector is interrogated.

Instruction Fetch Clock (IF)

When a B unit has established a connection with an A unit in order to service it, at this point the B unit has to go to the memory to get the instruction which tells it what service it is to perform. It is recalled from the description of "Processor Seek" operation that the address of the first instruction is in the Instruction Address Register (IAR) of the A unit. In a computer system it is likely that there would probably be more than one instruction to execute and the addresses of the instructions in memory might exist in sequential order or they might be chained together. For convenience of description and purpose of clarity, let it be assumed that only one instruction at one time exists to be executed, i.e., after one instruction has been executed, the A unit is disconnected from the input-output device. It should be noted that the memory wherein the instruction is located could be of a special centralized control type which would be accessible to all of the B units.

There follows hereinbelow a description of three types of input-output instructions capable of being utilized in the embodiment according to the invention. A first of these instructions is a "Write-xxx Bytes." A second instruction is "Read-xxx Bytes," and the third instruction is "Read a Record."

It has been previously mentioned hereinabove that flip-flops 126 and 138 (FIG. 10) establish gates which accomplish the interconnection of the B unit to the A unit. Although such gates have not been shown in the drawing, it is to be understood that when a circuit extends from a B unit to an A unit and vice versa, it may go through a suitable gate.

Figure 12:
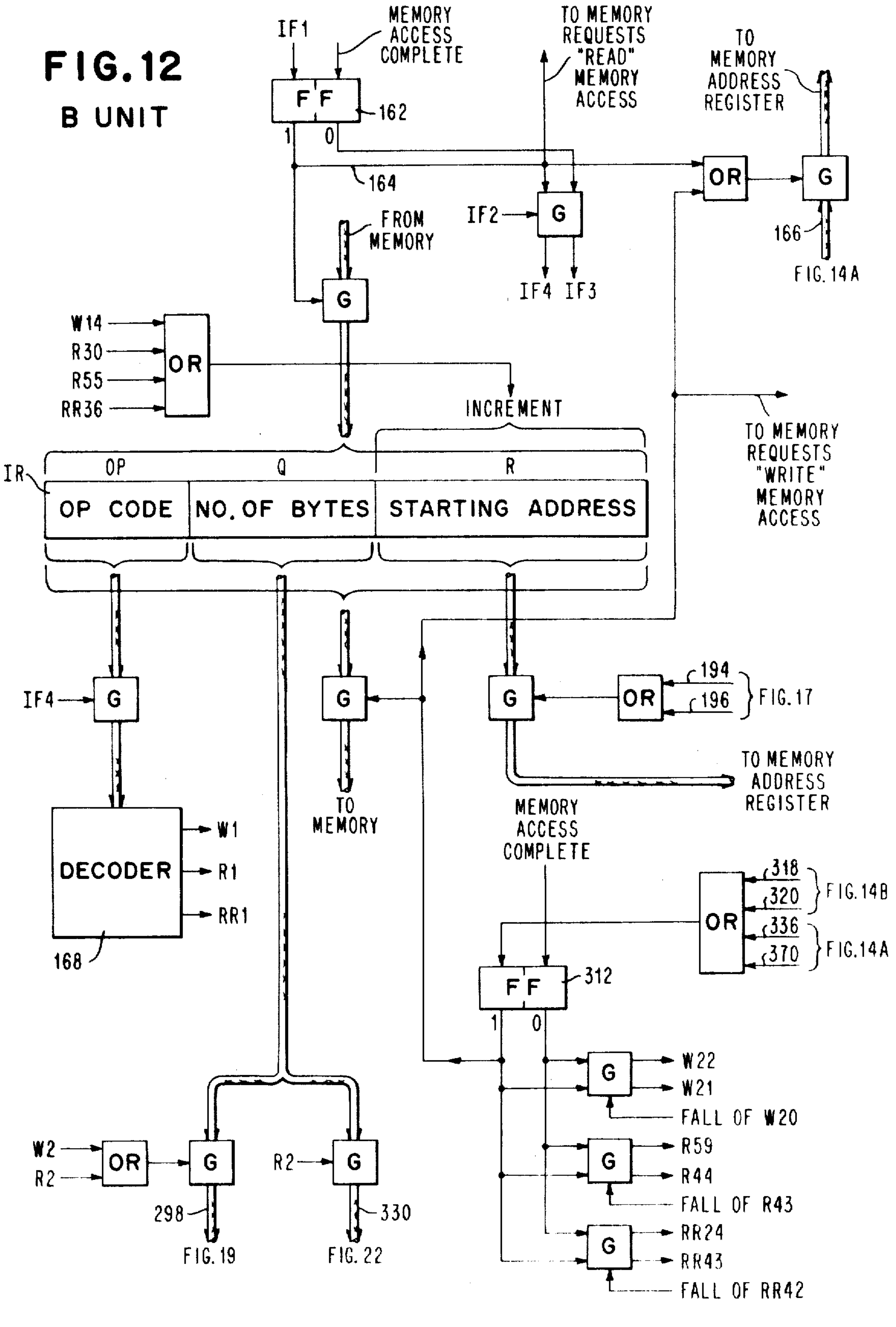
FIG. 12 is a block diagram of an arrangement suitable for use in carrying out chosen input-output instructions relative to the B unit.

Referring back to the "Instruction Fetch" (IF) clock, the clock pulse IF1 sets flip-flop 162 (FIG. 12) to its "1" state to activate line 164 which thereby gates the contents of the instruction address register (FIG. 14A) to the memory address register through cable 166 and also requests a memory access. When clock pulse IF1 decays, it turns on clock IF2 whereby clock pulse IF2 tests the condition of flip-flop 162. If flip-flop 162 is in the "1" state, it indicates that the memory access is not complete and the clock advances to clock IF3 which is used to provide a delay and only returns to clock pulse IF2. When the memory access is complete, flip-flop 162 is in the "0" state and the instruction will be in the instruction register (IR) (FIG. 12). The clock will then proceed to clock IF4 which gates the operation code to the decoder 168 (FIG. 12). As is seen in FIG. 12, decoder 168 has three outputs. With such arrangement, one of the three clocks viz, "Write," "Read" or " Record" is started.

Prior to describing the "Write" clock, at this point it is first necessary to describe some of the necessary structures that are included in this embodiment.

The A Unit Buffer

An embodiment suitable for use as an A unit buffer is shown in FIG. 15. The buffer itself is depicted therein as comprising a plurality of rows of flip-flops, each of these rows being capable of storing one byte of information. In the depicted embodiment, it is to be assumed that six bytes constitute a memory word. Although the embodiment shown in FIG. 15 is depicted as comprising flip-flops as the switching circuits therein, it is readily appreciated that the buffer could be constructed in other ways. For example, it could be a high-speed thin film memory.

The buffer comprises one input register 170 and two output registers 174 and 176. Registers 170 and 174 are for the use of the B unit and register 176 is for the use of the A unit.

Figures 16, 17, 17A:
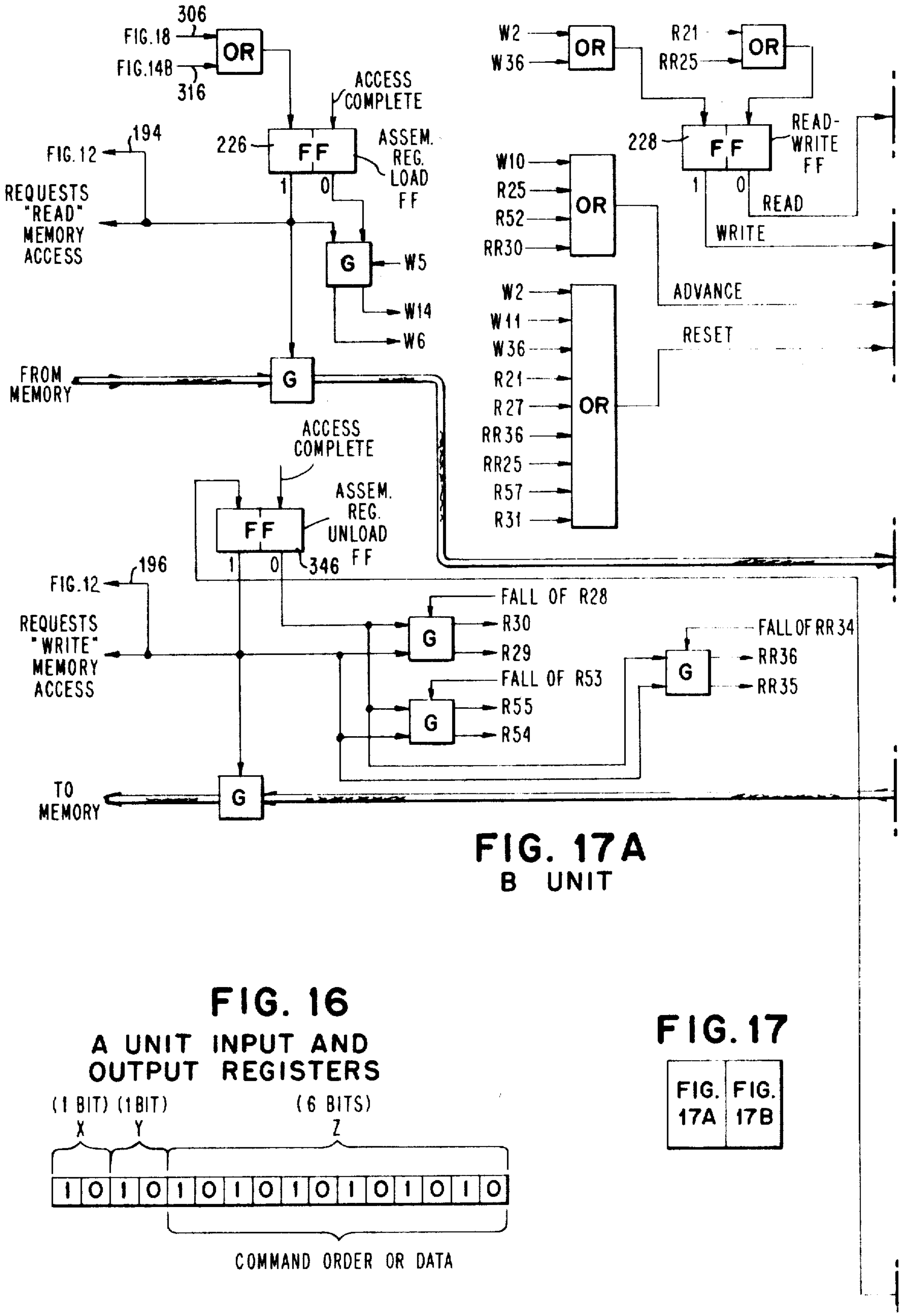
FIG. 16 is a depiction of an A unit input and output register.
FIGS. 17A and 17B, taken together as in FIG. 17, is an arrangement suitable for use in carrying out chosen input-output instructions and microprograms employing a B unit.

The format of the bytes in one position of the buffer is shown in FIG. 16. Two counters are employed in conjunction with the buffer. The size of the counter determines the size of the buffer or vice versa. For example, if there are 64 positions in the buffer, they would be numbered from 0 to 63 and a suitable counter would be a 6-bit binary counter which would count from 0 to 63 in binary notation. If the positions in the buffer were to be numbered in binary notation from top to bottom, then the top position would be 000000 and the bottom position would be 111111.

If circuit components other than flip-flops were used for the implementation of the buffer, and simultaneous loading and unloading were not possible in such implementation, then additional equipment, readily provided by and within the knowledge of the individual skilled in the art would be required to police the use of the buffer in order to enable simultaneous requests to produce sequential accesses.

Referring now to FIG. 15, it is to be noted therein that data is loaded into a position in the buffer through a cable such as cable 178. Data is removed from a position in the buffer by a cable such as cable 180. Thus, one position in the buffer can be loaded at the same time that another position is unloaded. A gate such as gate 182 can be included to permit the information on an input bus 384 to be placed in the position in the buffer. If, instead of gate 182, a gate 184 is enabled, the contents of register 170 instead of the contents of bus 384 can be loaded into the same position in the buffer. To unload the same position of the buffer, a gate 186 can be employed to cause the contents of the position in the buffer to appear in register 174. If a gate 188 is enabled instead of gate 186, then the contents of the position of the buffer appear in the register 176 instead of register 174.

Figure 13:
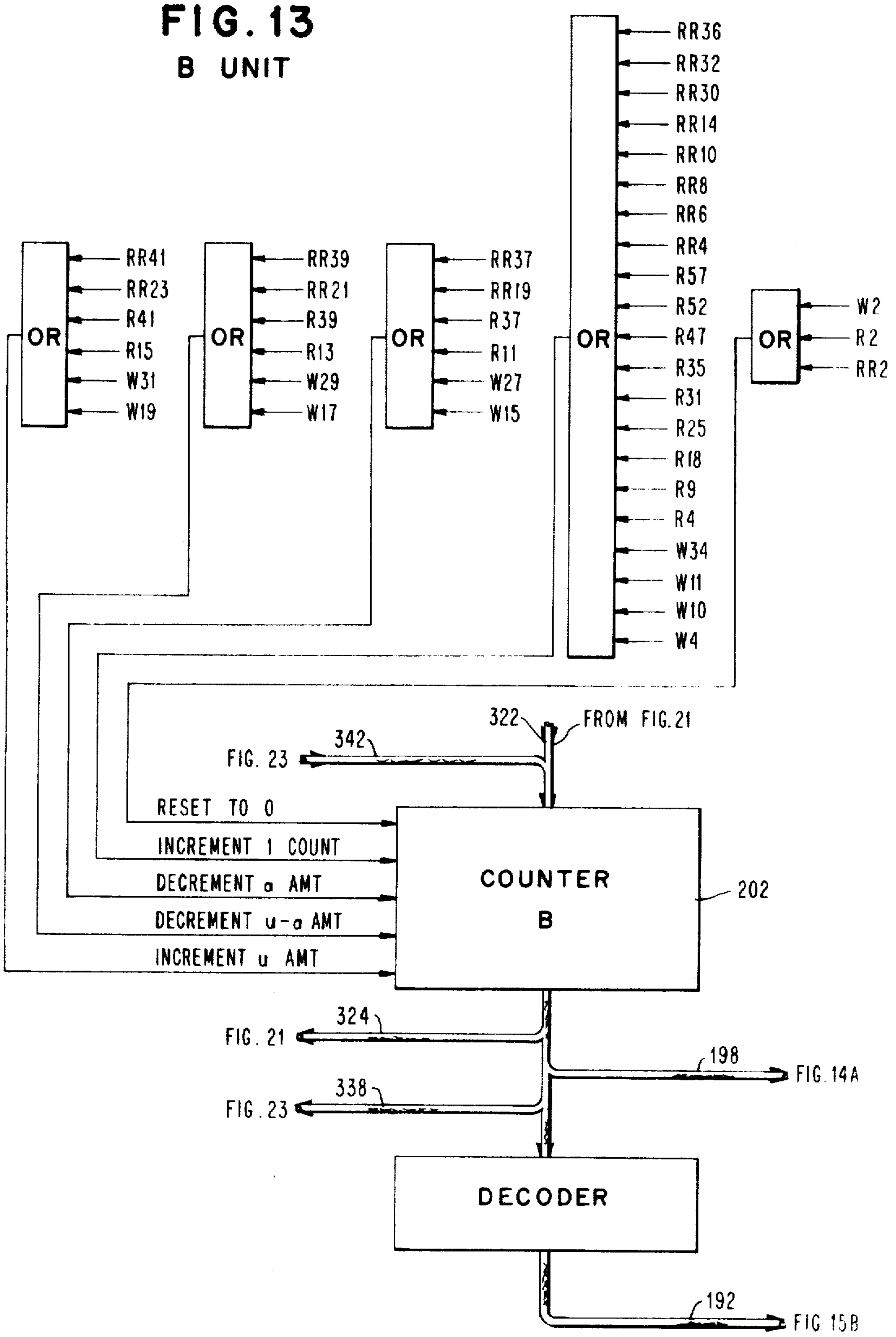
FIG. 13 is a block diagram of an arrangement similarly utilized as that shown in FIG. 12.

Gates such as gate 182 are controlled by leads contained in a cable 190. These same leads in cable 190 extend to gates such as gate 188. Only one of the leads in cable 190 can be active at any one time because these leads come from the decoder in the output of an A counter in the A unit. Therefore, the number in the A counter determines the position in the buffer that can be loaded from bus 384 or unloaded into register 176. The leads in a cable 192 come from the decoder in the output of a counter B in the B unit. The number in counter B determines the position of the buffer that can be loaded from register 170 or unloaded to register 174. As previously explained hereinabove, the detailed gating between an A unit and B unit has been omitted in the interests of clarity of explanation and exposition. However, in this connection, for a further understanding, the FIGS. that contain A unit circuitry can be placed to the right of the buffer shown in FIG. 15 and the FIGS. that contain B unit circuitry can be placed at the left of the buffer. For example, FIGS. 12 and 13 can be placed at the left of FIG. 15, and FIG. 14 can be placed at the right of FIG. 15. A B counter and its decoder are shown in FIGS. 12 and 13. An A counter and its decoder are shown in FIG. 14.

The A unit operates continuously, either unloading the buffer byte-by-byte in order to transmit the bytes to the input-output device in the case of a "write" instruction or loading the buffer byte-by-byte in the case of a "read" instruction. An A unit has to operate continuously and with no interruption until the execution of an instruction is completed. A B unit, however, operates at a rate substantially faster than that of an A unit and consequently means have to be provided to insure that a B unit does not override an A unit. The A unit "-pointer," i.e., the active line in cable 190 which is the output cable of A counter decoder, should always be ahead of or, in the worst case, equal to the B unit pointer. Clearly, should the B pointer become equal to the A pointer, the B unit must stop operating at that time and disconnect itself. In addition, there are times, as will be further explained hereinbelow in greater detail, when it is necessary to know if there are two more slots or positions remaining in the buffer, i.e., counter A minus counter B equals 2, or if there are six slots or positions remaining in the buffer.

The arrangement utilized to determine the immediately foregoing facts can be illustrated with a simple example such as with 10 slots in the buffer respectively designated 0 to 9 from top to bottom. Both the A and B counters would count up to 9 and go to the zero count on the tenth count. Thus, if it is assumed that both counters, i.e., A and B counters, are initially set to zero, under such conditions, their contents are equal to each other. Let it be assumed now that the B pointer has moved to "1" position and before the B unit utilizes the "1" slot, it asks the question as to how many slots remain in the buffer. The number in the B counter is subtracted from the number in the A counter with a proviso that the 10th column, i.e., 1 subtracted from 0 gives a remainder of 9. Such scheme is always operative provided that the B pointer never gets ahead of the A pointer which, in fact in the arrangement outlined, it never does. If the A pointer, for example, were to be on 4 and the B pointer were to be on 9, the subtraction would result in the number 5 which is the correct number since the empty slots are the 9, 0, 1, 2, and 3 slots respectively.

When the B unit has loaded the buffer as far as it can without overriding the A unit, it sets the values for $a$ and $u$. The $a$ and $u$ quantities determine how much buffer space remains when the B unit is called on for service. The $a$ quantity obtains in the situation of an ordinary call and the $u$ quantity in that of an urgent call. Preferably, the foregoing quantities are such that the B unit is called when the buffer is to be filled within a certain given period. To accomplish the latter end, the $a$ and $u$ quantities are related to the speed of the input-output device. It is readily appreciated that the $a$ and $u$ quantities could be determined before the input-output operation is begun and stored either in the A unit or with the instruction. The $a$ quantity is obtained by decrementing the B counter 202 (FIG. 13) the $a$ amount. The contents of the B counter are then transferred via cable 192 and a cable 204 (FIG. 14) to the register $a$ which is designated with the reference numeral 206. The $u$ value is obtained by again decrementing the B counter by the difference between the $a$ and $u$ quantities and then transferring the resulting contents of the B counter to a register $u$ designated with the numeral 208 as shown in FIG. 14. The B counter is then restored to its original value by incrementing it with the $u$ amount.

In the arrangement shown in FIG. 14, the answer to the question "Are the contents of the B counter equal to the contents of the A counter?" is provided by a compare unit 210. The answer to the question "Are six slots remaining in the buffer?" is provided by the output of a subtractor 212 and the answer to the question "Are there two slots left in the buffer?" is provided by the output of a subtractor 222 (FIG. 14).

The $a$ and $u$ component flip-flops are designated in FIG. 17 with the reference numerals 214 and 216 respectively. Flip-flops 214 and 216 are initially reset when the system is placed in operation and then are set by compare units 218 and 220, the outputs of which are clocked with one of the A unit clock pulses as will further be described hereinbelow. Flip-flops 214 and 216 are also reset during the operation of the "B unit scan" which has been described hereinabove. The settings in flip-flops 214 and 216 are transferred to the B units as previously mentioned above in connection with the "B unit scan" clock.

Figure 17B:
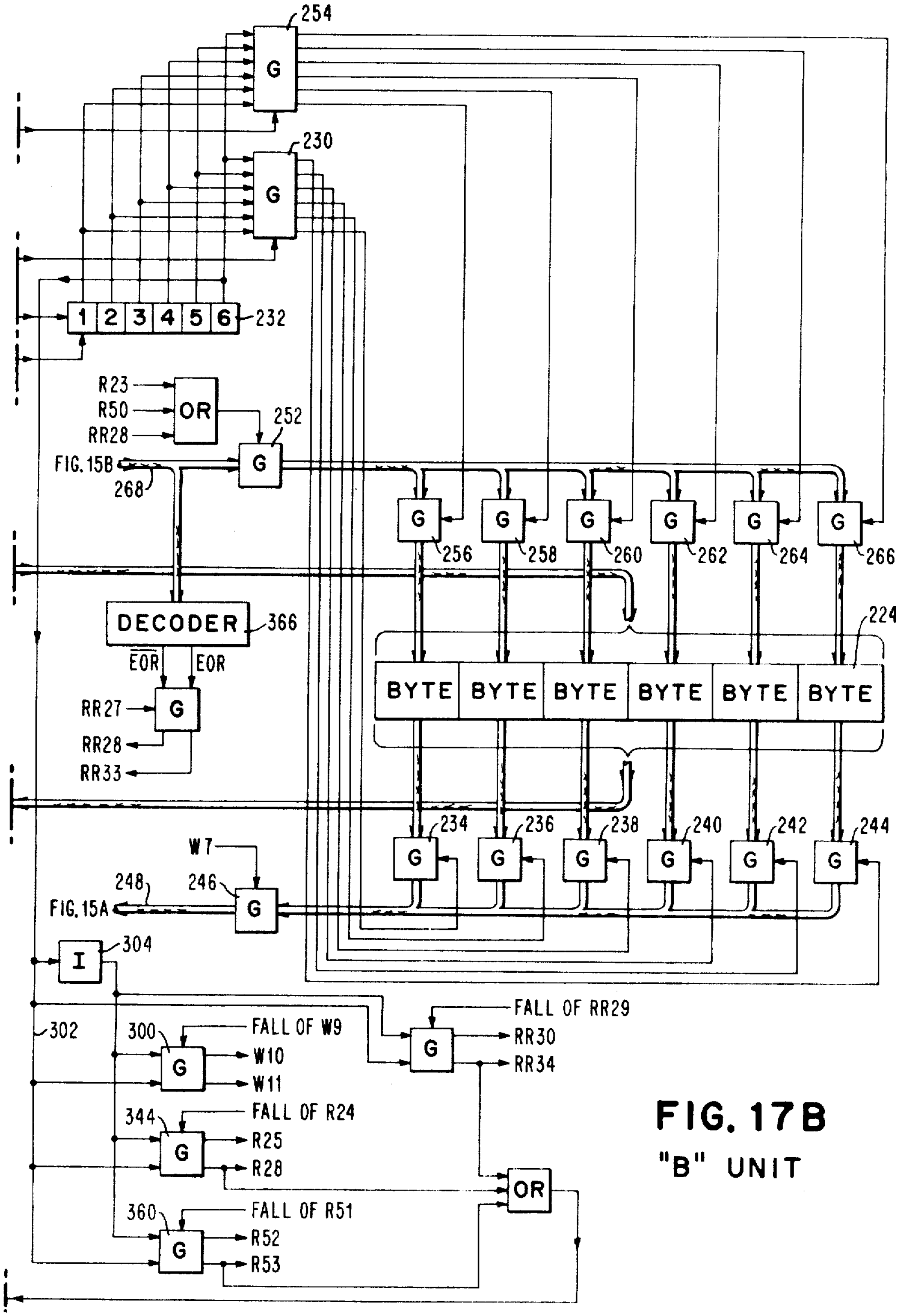
Figures 18, 19, 20:
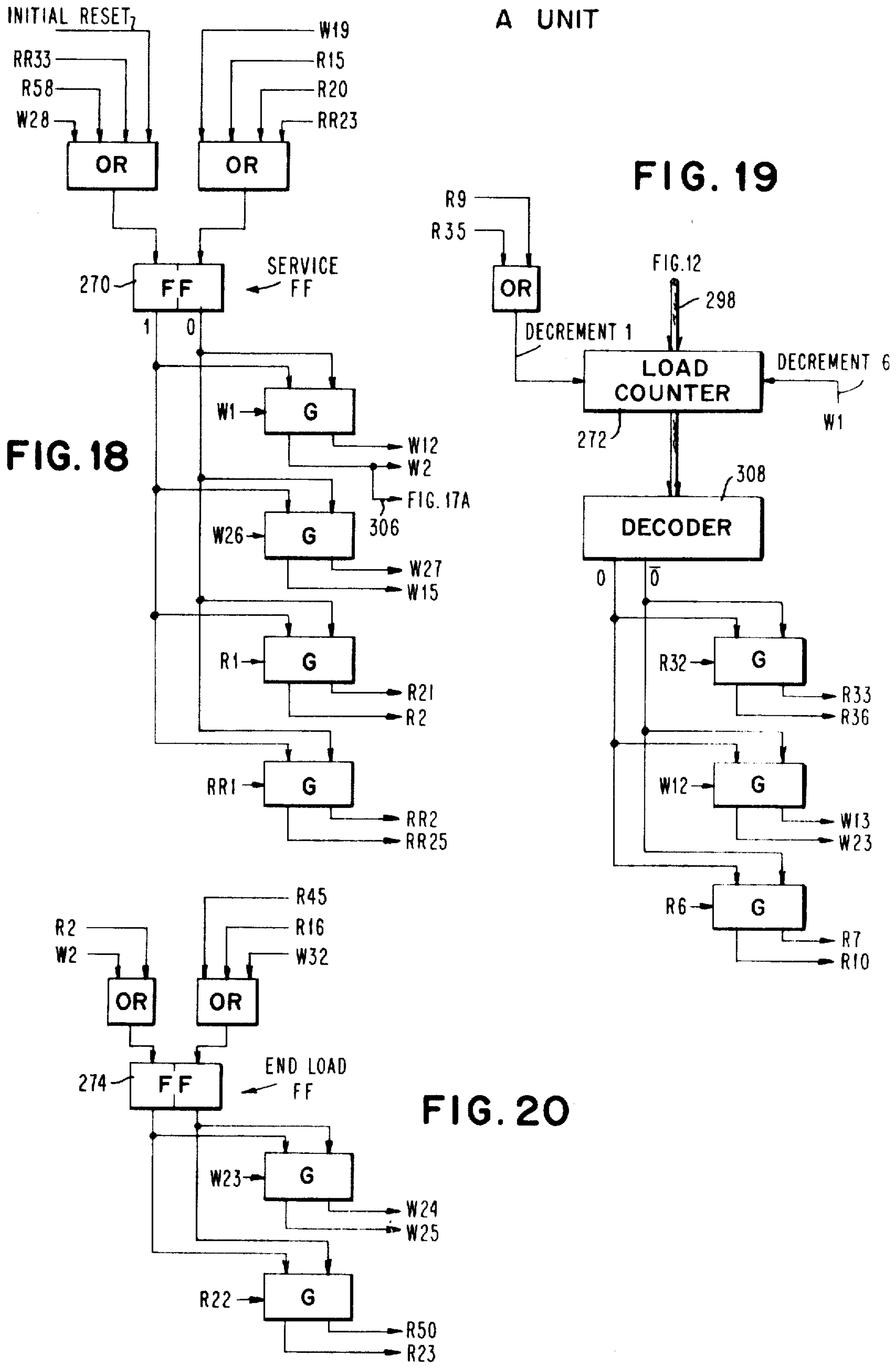
FIG. 18 is a block diagram of an arrangement employed in carrying out chosen instructions and microprograms and utilizing an A unit.
FIG. 19 is a block diagram of another arrangement utilized in conjunction with an A unit.
FIG. 20 is a block diagram of still another arrangement utilized in conjunction with an A unit.

In the case of a "write" or "read" instruction, the number of bytes to be written or read is in the Q field of IR register (FIG. 12). Such number of bytes is a multiple of the number of memory words. The address in memory where the first word is to be found in the case of a "write" instruction or where the first word is to be stored in the case of a "read" instruction is in the R field of the IR. To convert words to bytes and vice versa, an "Assembly Register" is required and such register is shown in FIG. 20 and designated with the reference numeral 224. As shown in FIG. 17B, register 224 is shown to have a capacity of six bytes, for example, which requires the assumption that six bytes make up a memory word. During a "write" operation, words are loaded into register 224, one at a time, under control of the assembly register flip-flop 226 for a "-write" operation. For a "write" operation, a flip-flop 228 (FIG. 17A) is set to its "1" state to enable a gate 230 (FIG. 17B) which when enabled permits the ring 232 to enable the gates 234—244. Thus, one byte at a time can be transmitted to a gate 246 and a cable 248 to the register 170 shown in FIG. 15A.

In the "read" operation, flip-flop 228 (FIG. 17A) is reset to its "0" state to thereby enable a gate 254 (FIG. 17B). The enabling of gate 254 permits ring 232 in turn to enable gates 256—266. Consequently, with such arrangement, a word can be assembled byte by byte through a gate 252 and a cable 268 which connects to register 174 (FIG. 17B).

A "service" flip-flop 270 is provided in the A unit and is shown in FIG. 18. It is necessary, in order to distinguish between the first time that a B unit services an A unit for one instruction and the succeeding time that a B unit services the A unit, in order to carry out and complete the execution of the same instruction. For implementing such distinguishing, flip-flop 270 is initially set to its "1" state at the juncture that the system is first placed into operation. Flip-flop 270 is then reset to the "0" at the first time that a B unit disconnects itself from an A unit and is then set to the "1" state when a B unit has completed an instruction.

A load counter 272 (FIG. 19) is employed to keep track of the number of bytes that have been loaded into the buffer by a B unit.

An "end load" flip-flop 274 (FIG. 20) is set to the "1" state at the start of an instruction and is reset to the "0" state when all of the bytes have been loaded by a B unit.

Figures 24, 25:
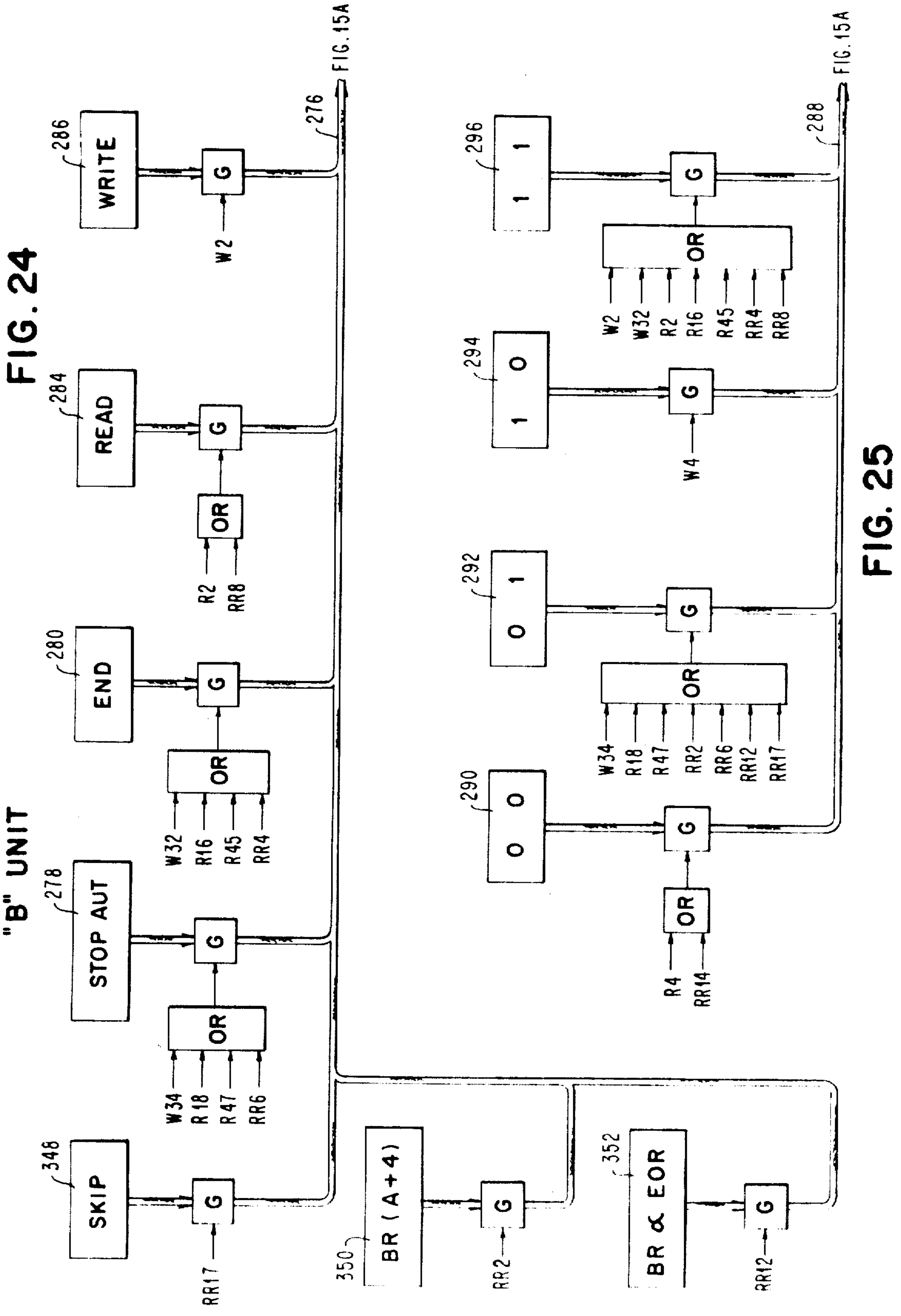
FIG. 24 is a block diagram of an arrangement utilized in conjunction with an A unit.
FIG. 25 is a block diagram of a further arrangement utilized in conjunction with an A unit.

Orders or commands may be loaded into the field of register 170 (FIG. 15A) through a cable 276 which connects to the structures shown in FIG. 24. In FIG. 24 the blocks 278, 280, 284, and 286 and legended "Stop Aut," "End," "Read," and "Write," respectively, can be "read only" registers, each of which contains a byte number of a given amount such as the six assumed hereinabove, the latter being recognized as a command or order if it is preceded by an "01" or a "11" in the X and Y fields (as shown in FIG. 16).

Figure 15A:
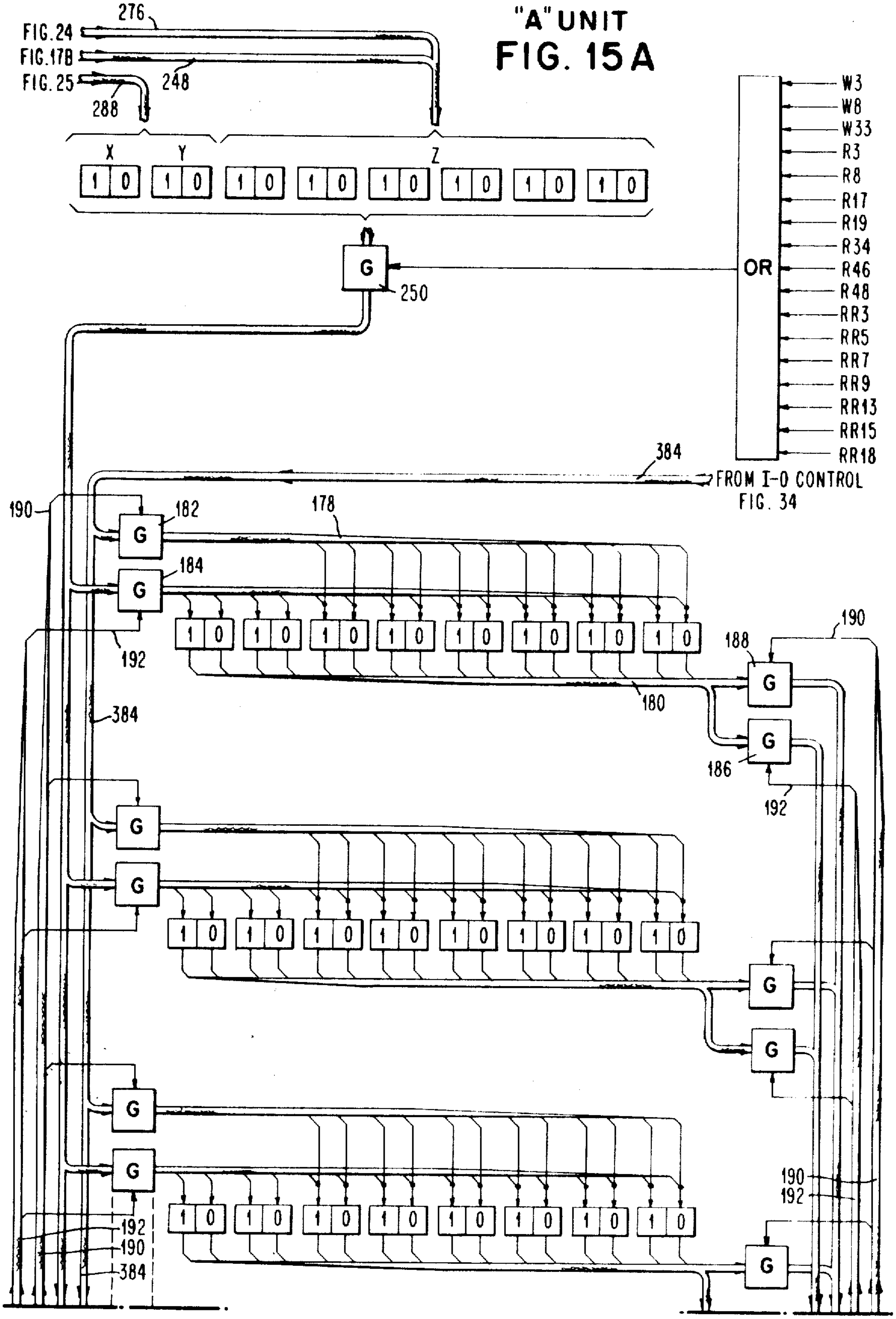

The X and Y fields of register 170 in FIG. 15A can be loaded through a cable 288 which connects to the structures shown in FIG. 25. In FIG. 25, the four registers respectively designated with the numerals 290, 292, 294 and 296 contain the four possible combination of bits that can be loaded into the X and Y fields of register 170, viz, combinations 00, 01, 10 and 11.

There follows immediately hereinbelow an explanation of the mechanism of the buffer loading in order to execute the three instructions, "read," "write" and "read a record."

Execution of the "Read" Instruction

Figure 36:
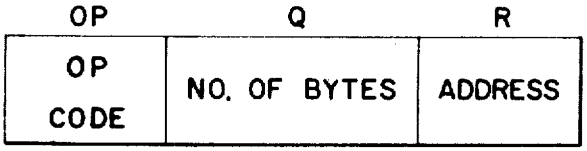
FIG. 36 shows the format of the "read" instruction.

The format of the instruction register is shown in FIG. 36.

The OP field in the format shown in FIG. 36 contains the coded instruction "read." The Q field contains the number of bytes that are to be read. As has been done hereinabove for the purpose of convenience of explanation, it may be assumed that one word comprises six bytes. The R field of the format contains the address in the memory where the first word which is read is to be stored.

The initial load operation of the "read" clock will place the A unit buffer in one of four possible conditions as shown in FIGS. 37—40 respectively.

Figure 37:
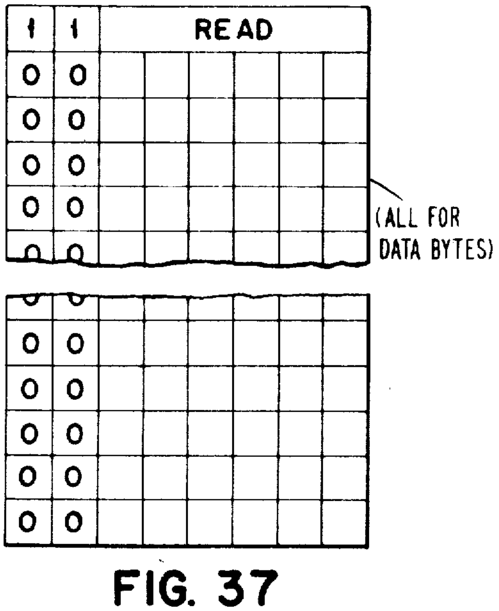
FIG. 37 shows a first possible condition of the A unit buffer upon the initial load operation of the "read" clock.

The example depicted in FIG. 37 is the condition where the number of bytes to be read is greater than the number of bytes that can be placed in the buffer at one time.

Figure 38:
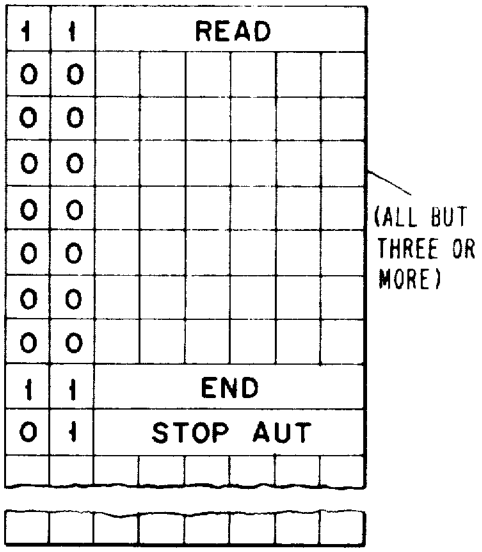
FIG. 38 shows a second possible condition of the A unit buffer upon the initial load operation of the "read" clock.

The example depicted in FIG. 38 is the condition in which the number of bytes to be read is less than the capacity of the buffer.

Figure 39:
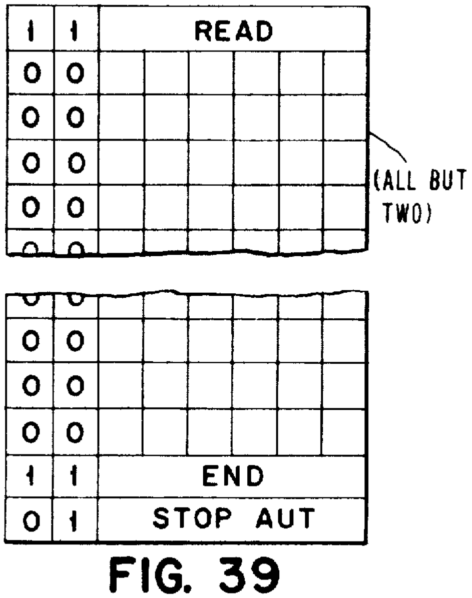
FIG. 39 shows a third possible condition of the A unit buffer upon the initial load operation of the "read" clock.

The example depicted in FIG. 39 may be relatively unusual since it is the situation where the buffer is exactly the right size and there is just the correct amount of space to place the two instructions at the bottom of the buffer, no slots or positions left over.

If the initial loading operation leaves the buffer in the condition as shown in FIG. 37, the "11 end" order and the "01 stop aut" command will be placed in two consecutive slots somewhere in the buffer during a later loading operation.

Figure 40:
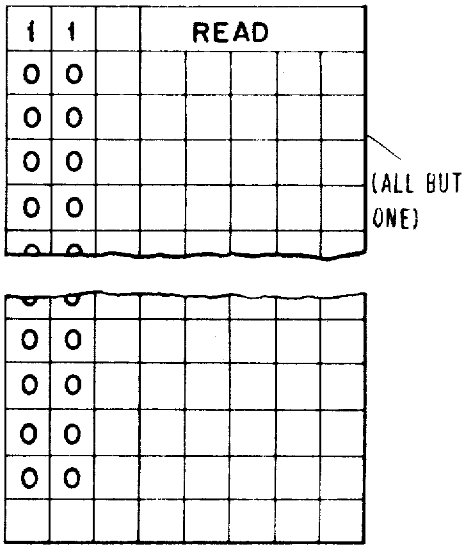
FIG. 40 shows a fourth possible condition of the A unit buffer upon the initial load operation of the "read" clock.

The example shown in FIG. 40 shows the situation where there is only one slot remaining in the buffer after all of the data bytes have been loaded thereinto.

Execution of a "Write" Instruction

Figure 41:
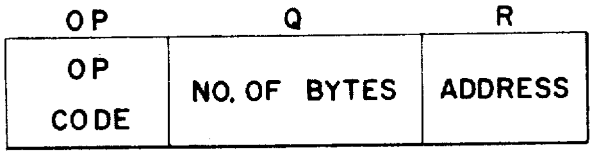
FIG. 41 shows the format of the "write" instruction.

The format of the instruction register for a "write" instruction is shown in FIG. 41.

In such format, the OP field contains the coded instruction "write." The Q field contains the number of bytes that are to be written, a suitable example again being six bytes per word. The R field in the format contains the address in memory where the first word is to be found.

Figure 42:
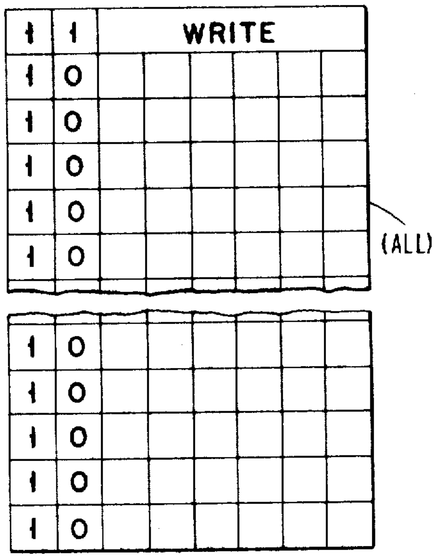
FIG. 42 shows a first possible condition of the A unit buffer upon the initial load operation of the "write" clock.
Figure 43:
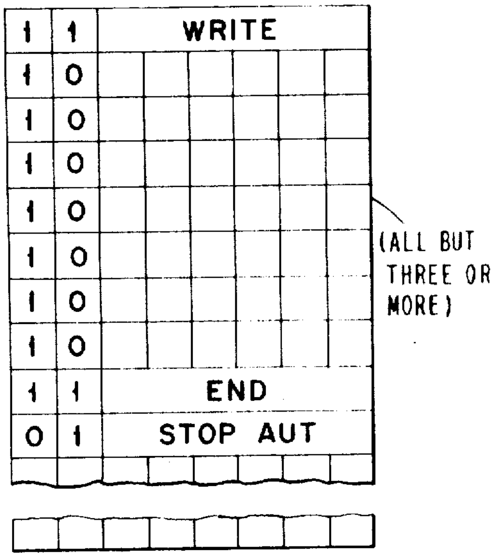
FIG. 43 shows a second possible condition of the A unit buffer upon the initial load operation of the "write" clock.
Figure 44:
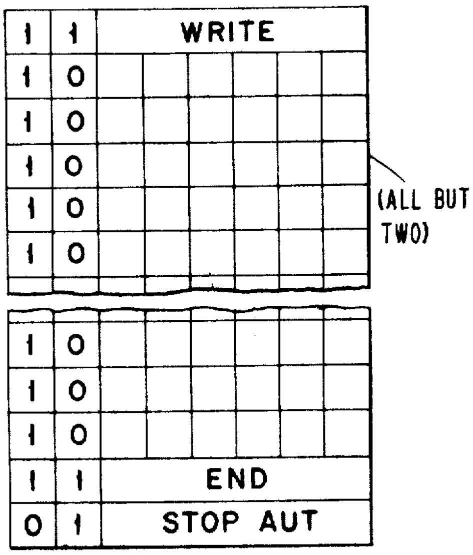
FIG. 44 shows a third possible condition of the A unit buffer upon the initial load operation of the "write" clock.
Figure 45:
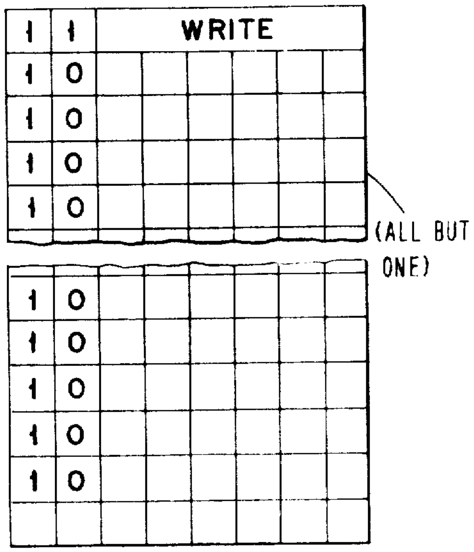
FIG. 45 shows a fourth possible condition of the A unit buffer upon the initial load operation of the "write" clock.

The initial load operation of the "write" clock will leave the A unit buffer in one of the four possible conditions as shown in FIGS. 42—45 respectively. As is seen in these FIGS., the condition exemplified in FIG. 42 shows all of the positions being filled in the buffer. The condition as depicted in FIG. 43 shows all but three or more positions being filled in the buffer. The situation diagrammed in FIG. 44 indicates the condition wherein all but two of the positions in the buffer are filled and the condition shown in FIG. 45 is that one in which all but one of the positions in the buffer are filled.

Execution of a "Read A Record" Instruction

The format of the instruction register in a "read a record" instruction is shown in FIG. 46. In this format, the OP field contains the coded instruction "read a record." The Q field is not employed. The R field contains the address in memory where the first word is to be stored.

In the execution of this instruction, when a B unit is first called upon, it performs one loading operation and the A unit buffer is left in one of the two possible conditions as shown in FIGS. 47 and 48 respectively.

In considering FIGS. 47 and 48, it is to be noted that during the single loading operation a B unit will first insert the command "01BR—(A+4)," which is a command to the A unit for it to skip the next three slots, i.e., to branch to a value of the A counter which is equal to its present amount plus four. The B unit then inserts the command "11 end" which is an order to the input-output device to halt its operations. Simultaneously, the B unit stores the count in the B counter in a register $\alpha$ which is in the A unit. The B unit then inserts the command "-stop aut" which is a command to the A unit ordering it to set the "$a$" flip-flop and permit the aut clock to halt. The B unit next inserts the order "11 read." The next command inserted by the B unit is "BR—$\alpha$—EOR" which is a command to the A unit to cause it to replace the contents of the A counter with the contents of register $\alpha$ with the symbol "EOR" appearing in the buffer. It is seen that this will cause the A counter to point to the order "11 end" which will be executed and the A counter will next advance to the command "01 stop aut."

After the command "BR—$\alpha$—EOR," a B unit inserts zeros into the X and Y fields of the next slot. The buffer is thereby filled up in this manner, slots containing "BR—$\alpha$—BOR" alternating with slots containing zeros and X and Y fields. Thus, if a single slot remains at the bottom of the buffer, the command "01 " is inserted as shown in FIG. 47. This signifies that the slot is to be skipped and does not refer to the skipping of bytes from the input-output device. It is to be realized that in an embodiment incorporating other input-output operations or incorporating sequences of instructions in one operation, it may be necessary to provide for the loading of several branch instructions and, therefore, to refer to several branch addresses. Such requirements are readily complied with by one skilled in the art, e.g., there may be provided several registers such as the α registers and having each branch instruction indicate one of these registers. Alternatively, the branch address can be inserted into the slot or slots immediately following the branch instruction and accordingly altering the A unit interpretation of the branch instruction. Similarly, allowance can be made for branching upon the receipt of specified bytes other than the EOR, and thus the A unit can be chosen to select and read only records beginning with prescribed identifier bytes or to read parts of such records. At the end of the loading operation, the A counter is set to the value which points at the "11 read" command.

The following chart sets forth the relationship of the operations under the control of the "processor seek clock" shown in FIG. 6.

| Mono Number | Set conditions | Functions performed when set | Functions when timing out |
|---|---|---|---|
| PS1 | An initial short pulse on line 37 FIG. 6. The timing out of PSN or PSN-1. | If processor 1-1 requests service (FIG. 4A), the input-output device designation and the address of the first instruction is gated to register 43 (FIG. 4A). | If processor 1 requests service, it sets PS1-1. If there is no request, it sets PS2. |

| Mono Number | Set conditions | Functions performed when set | Functions when timing out |
|---|---|---|---|
| PS1-1 | The timing out of PS1 | It gates the input-output device designation to the decoder (FIG. 4C) and, if the input-output device is idle and one of the appropriate A units is idle, it gates the address of the first instruction to the IAR (instruction address register) of the A unit. Through delay circuits it connects the input-output device to the A unit and sets the "a" flip-flop for the A unit. | Through a delay, it sets PS2 |
| PS2 | The timing out of PS1 or PS1-1. | If processor 2 requests service, it gates the input-output device designation and the address of the first instruction is gated to register 43 (FIG. 4A). | If processor 2 requests service, it sets PS2-1. If there is no request, it sets PS3. |
| PS2-1 | The timing out of PS2 | It gates the input-output device designation to the decoder (FIG. 4C) and, if the input-output device is idle and one of the appropriate A units is idle, it gates the address of the first instruction to the IAR (instruction address register) of the A unit. Through delay circuits, it connects the input-output device to the A unit and sets the "a" flip-flop for the A unit. | Through a delay, it sets PS3. |
| PSN | The timing out of PS(N-1) or PS(N-1)-1. | If processor N requests service, it gates the input-output device designation and the address of the first instruction is gated to register 43 (FIG. 4A). | If processor N requests service, it sets PSN-1. If there is no request, it sets PS1. |
| PSN-1 | The timing out of PSN | It gates the input-output device designation to the decoder (FIG. 4C) and, if the input-output device is idle and one of the appropriate A units is idle, it gates the address of the first instruction to the IAR (instruction address register) of the A unit. Through delay circuits, it connects the input-output device to the A unit and sets the "a" flip-flop for the A unit. | Through a delay, it sets PS1. |

The "instruction fetch clock" (IF) is a clock similar to the "processor seek" clock and comprises four stages, IF1 to IF4, each of these stages suitably being monostable multivibrators whose set state is utilized to perform a given function in the instruction fetch operation. The termination or timing out of a set state of a clock monostable multivibrator sets the next succeeding monostable multivibrator in the clock. Since the arrangement of a microprogram clock is shown in FIG. 6, in the case of the "processor seek" clock, no further depiction of the instruction fetch clock is deemed necessary.

The following chart sets forth the relationship of the operations under the control of the "instruction fetch" clock.

| Mono Number | Set conditions | Functions performed when set | Functions when timing out |
|---|---|---|---|
| IF1 | The timing out of CL16 | It sets flip-flop 162 (FIG. 12) | Sets IF2. |
| IF2 | The timing out of IF1. The timing out of IF3. | It tests flip-flop 162 | If flip-flop 162 is at "0", it sets IF3. If flip-flop 162 is at "1", it sets IF4. |
| IF3 | The timing out of IF2 | It provides a delay | Sets IF2. |
| IF4 | The timing out of IF2 | It gates the OP code to decoder 168 (FIG. 12). It branches according to the OP code. | |

"Read" Microprogram

This program employs the "read" clock R which is a clock of monostable multivibrator stages similar to the "processor seek" and "instruction fetch" clocks in which the timing out of the set state of a multivibrator turns on a different multivibrator in the clock.

The following chart sets forth the relationship of the operations under the control of the "read" clock. This chart, together with the flow charts depicted in FIGS. 27—31, provide an explanation of the "read" operation.

Figure 22:
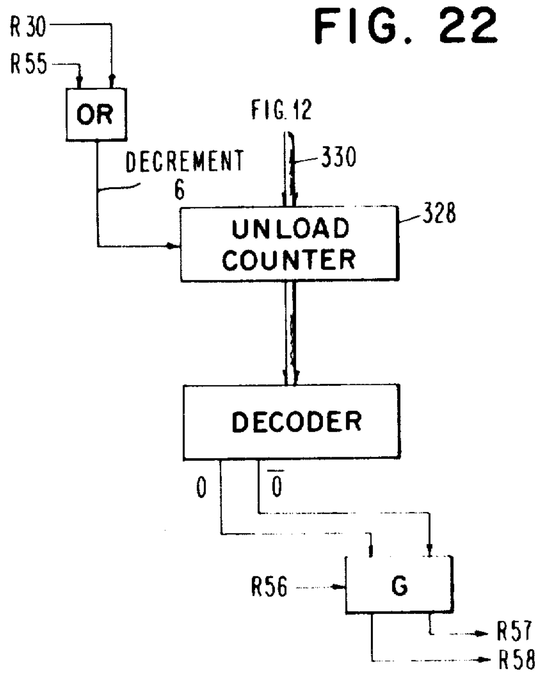
FIG. 22 is a block diagram of a still further arrangement utilized in conjunction with an A unit.

| Mono Number | Set conditions | Functions performed when set | Functions when timing out |
|---|---|---|---|
| R1 | The R1 setting output of decoder 168 (FIG. 12). | It tests service flip-flop 270, (FIG. 18) | If service flip-flop 270 is at "1," is sets R2. If service flip-flop 270 is at "0", it sets R21. |
| R2 | The timing out of R1 | It resets counter A (FIG. 14) to "0." It resets counter B (FIG. 13) to "0." It gates "Read" (register 284, FIG. 24) to the Z field of register 170 (FIG. 15A). It gates the "11" combination from register 296 (FIG. 25) to the X and Y fields of register 170 (FIG. 15A). It gates the Q field of the IR register (FIG. 12) to load counter 272 (FIG. 19) and to unload counter 328 (FIG. 22). It sets "end load" flip-flop 274 (FIG. 20) to "1." | It sets R3. |
| R3 | The timing out of R2 | It gates the contents of register 170 (Fig. 15A) to the buffer | It sets R4. |
| R4 | The timing out of R3 | It increments counter B (FIG. 13). It gates the "00" binary combination from stage 290 (FIG. 25) to the X and Y fields of register 170 (FIG. 15A). | It sets R5. |
| R5 | The timing out of R4 | It gates the contents of counter B (FIG. 13) to the "start unload" register 340 (FIG. 23). | It sets R6. |
| R6 | The timing out of R5. The timing out of R9. | It asks the question as to whether the "load" counter 272 (FIG. 19) is on zero by testing decoder 308. | If "load" counter 272 is at zero, it sets R10. If "load" counter 272 is not at zero, it sets R7. |
| R7 | The timing out of R5 | It asks the question as to whether the contents of counter B (FIG. 13) are equal to that of counter A (FIG. 14A) by testing compare unit 210 (FIG. 14A) | If the contents of counters A and B are equal, it sets R11. If they are not |

Table – Continued

Figure 14A:
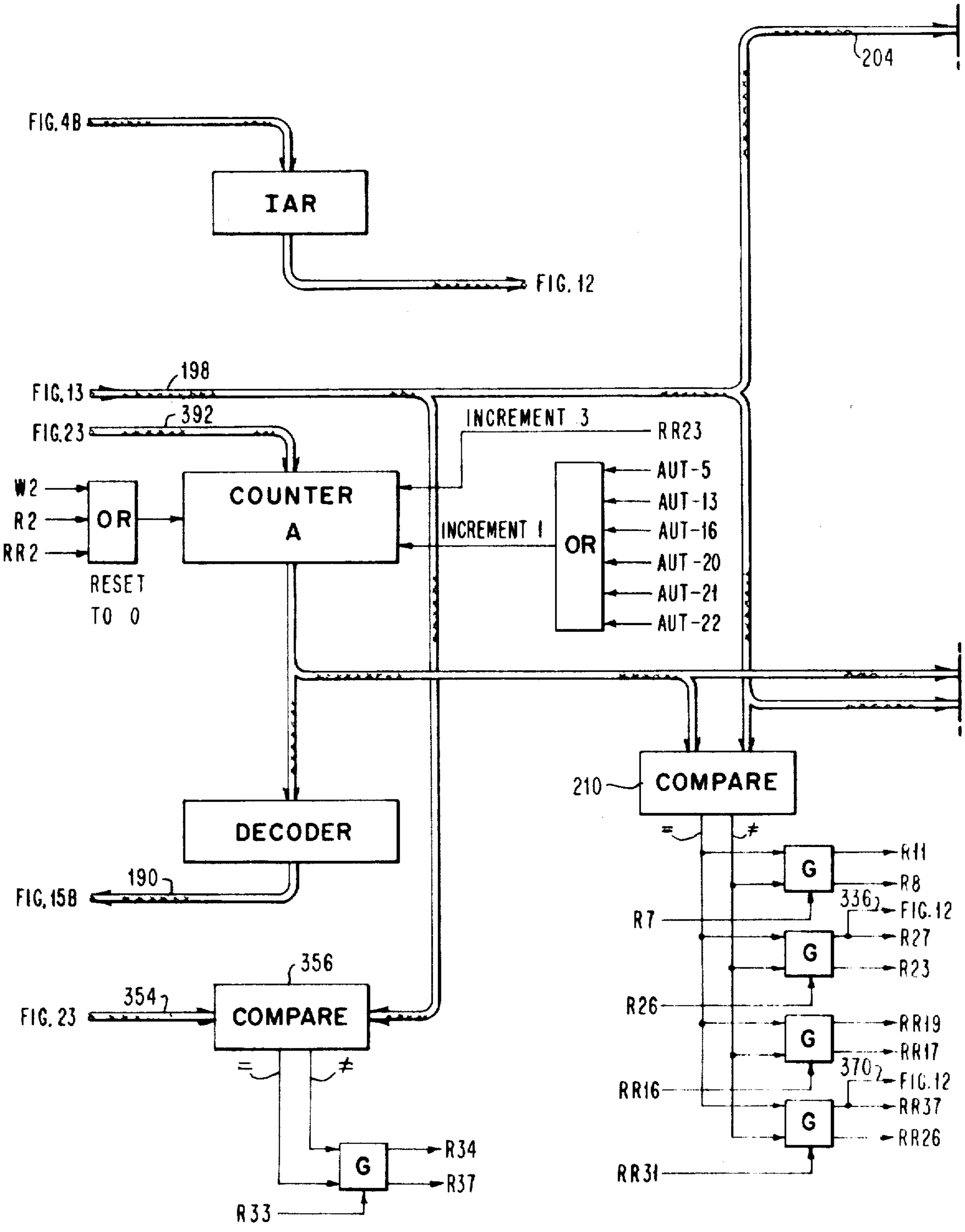
Figure 14B:
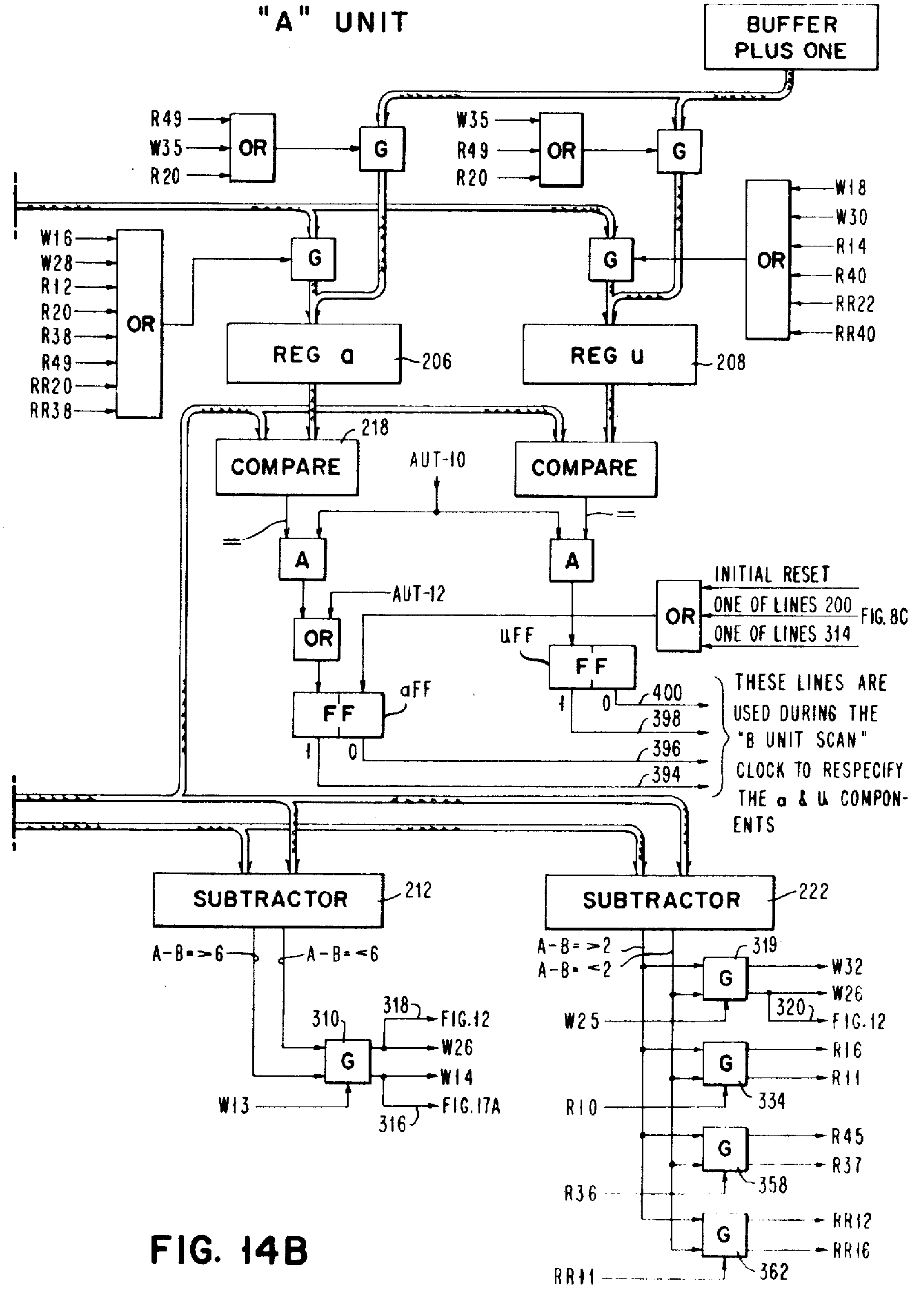
Figure 21:
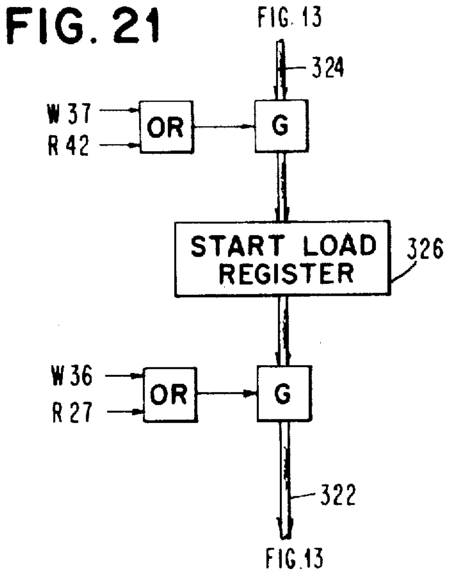
FIG. 21 is a block diagram of a further arrangement utilized in conjunction with an A unit.
Figure 23:
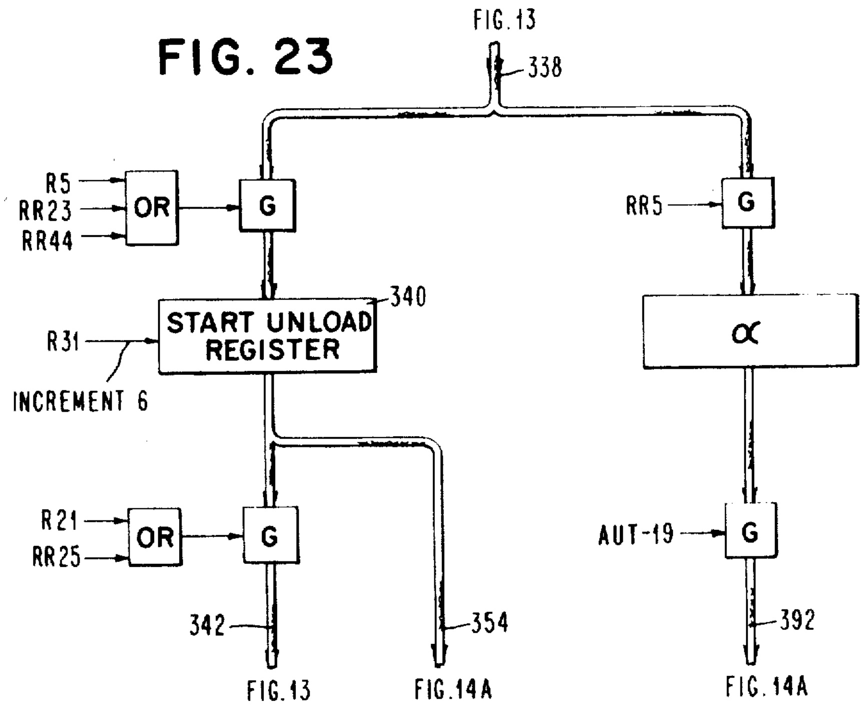
FIG. 23 is a block diagram of yet another arrangement utilized in conjunction with an A unit.

| Mono Number | Set conditions | Functions performed when set | Functions when timing out |
|---|---|---|---|
| R8 | The timing out of R7 | It gates the contents of register 170 (FIG. 15A) to the buffer (FIGS. 15A and 15B). | It sets R9. |
| R9 | The timing out of R8 | It increments counter B (FIG. 13). It decrements load counter 272 (FIG. 19). | It sets R6. |
| R10 | The timing out of R6 | It gates the contents of counter B (FIG. 13) to the "start load" register. It asks the question as to whether there are two more slots in the buffer by testing gate 334 (FIG. 14B). | If there are at least two more slots in the buffer, it sets R16. If there are less than two, it sets R11. |
| R11 | The timing out of R10. The timing out of R7. | It decrements the B counter an "a" amount (FIG. 13) | It sets R12. |
| R12 | The timing out of R11 | It gates the contents of the B counter (FIG. 13) to register *a* (FIG. 14B) | It sets R13. |
| R13 | The timing out of R12 | It decrements the B counter (FIG. 13) a $(u-a)$ amount | It sets R14. |
| R14 | The timing out of R13 | It gates the contents of the B counter (FIG. 13) to register *u* (FIG. 14B) | It sets R15. |
| R15 | The timing out of R14 | It resets service flip-flop 270 (FIG. 18) to "0" | It sets R59. It sets Aut-1. |
| R16 | The timing out of R10 | It sets end loan flip-flop 274 (FIG. 20) to "0". It gates the contents of register 280 (FIG. 24) to the Z field of register 170 (FIG. 15A). It gates the contents of register 296 (FIG. 25) to the X and Y fields of register 170 (FIG. 15A). | It sets R17. |
| R17 | The timing out of R16 | It gates the contents of register 170 to the buffer (FIG. 15) | It sets R18. |
| R18 | The timing out of R17 | It gates the contents of register 278 (FIG. 24) to the Z field of register 170 (FIG. 15A). It gates the contents of register 292 (FIG. 25) to the X and Y fields of register 170 (FIG. 15A). It increments the B counter (FIG. 13). | It sets R19. |
| R19 | The timing out of R18 | It gates the contents of register 170 (FIG. 15A) to the buffer (FIG. 15) | It sets R20. |
| R20 | The timing out of R19 | It gates the contents of the "buffer plus one" register to registers *a* and *u* (FIG. 14B). It resets service flip-flop (FIG. 18) to "0." | It sets R59. It sets Aut-1. |
| R21 | The timing out of R1 | It gates the contents of start unload register 340 (FIG. 23) to the B counter (FIG. 13). It resets the read-write flip-flop 270 (FIG. 17A) to "0." It sets assembly ring 232 (FIG. 17B) to "1." | It sets R22. |
| R22 | The timing out of R21 | It asks the question as to whether end load flip-flop 274 is at "0" by testing it (FIG. 20). | If end load flip-flop 274 is at "0," it sets R50. If end load flip-flop 274 is at "1," it sets R23. |
| R23 | The timing out of R22. The timing out of R26. | It gates the contents of the Z field of register 174 (FIG. 15B) to assembly register 224 (FIG. 17B). | It sets R24. |
| R24 | The timing out of R23 | It asks the question as to whether assembly ring 232 (FIG. 17) is on "6" by using the decay of R24 to test gate 344 (FIG. 17). | If line 304 (FIG. 17B) is active, it sets R25. If line 302 (FIG. 17B) is active, it sets R28 and sets assembly register unload flip-flop 346 (FIG. 17A) to "1." |
| R25 | The timing out of R24 | It advances assembly ring 232 (FIG. 17B). It increments the B counter 202 (FIG. 13). | It sets R26. |
| R26 | The timing out of R25. The timing out of R31. | It gates the contents of counter B to start unload register 340 (FIG. 23). It asks the question as to whether the contents of the B counter (FIG. 13) are equal to the contents of the A counter (FIG. 14) by testing compare unit 210 (FIG. 14A). | If the contents of the A and B counter are equal, it sets R27 and flip-flop 312 (FIG. 12). If the contents of the B counter and the A counter are not equal, it sets R23. |
| R27 | The timing out of R26 | It gates the contents of start load register 326 (FIG. 4) to the B counter (FIG. 13). It resets assembly ring 232 (FIG. 17B). | It sets R32. |
| R28 | The timing out of R24. The timing out of R29. | It asks the question as to whether memory access is complete by using the decay of R28 to test flip-flop 346 (FIG. 17A). | If flip-flop 346 is at "1," it sets R29. If flip-flop 346 is at "0," it sets R30. |
| R29 | The timing out of R28 | It is used for delay only | It sets R28. |
| R30 | The timing out of R28 | It increments the A field of the instruction register (IR) (FIG. 12). It subtracts six from unload counter 328 (FIG. 22). | It sets R31. |
| R31 | The timing out of R30 | It resets assembly ring 232 (FIG. 17B). It adds 6 to the start unload register 340 (FIG. 23). It increments the B counter (FIG. 13). | It sets R26. |
| R32 | The timing out of R27. The timing out of R35. | It asks the question as to whether load counter 272 (FIG. 19) is at "0" by testing decoder 308 (FIG. 19). | If load counter 272 is at "0," it sets R36. If load counter 272 is not at "0," it sets R33. |
| R33 | The timing out of R32 | It asks the question as to whether the contents of the B counter (FIG. 13) are equal to that of start unload register (FIG. 23) by testing the compare unit 356 (FIG. 14A). | If the contents are equal, it sets R37. If the contents are not equal, it sets R34. |
| R34 | The timing out of R33 | It gates the contents of register 170 (FIG. 15A) to the buffer (FIG. 15) | It sets R35. |
| R35 | The timing out of R34 | It increments the B counter (FIG. 13). It decrements the load counter (FIG. 19). | It sets R32. |
| R36 | The timing out of R32 | It asks the question as to whether there are two more slots in the buffer (FIG. 15) by testing gate 358 (FIG. 14B). | If there are at least two more slots in the buffer, it sets R45. If there are less than two, it sets R37. |
| R37 | The timing out of R36. The timing out of R33. | It decrements the B counter an "a" amount | It sets R3[illegible] |
| R38 | The timing out of R37 | It gates the contents of the B counter (FIG. 13) to register *a* (FIG. 14B) | It sets R39. |
| R39 | The timing out of R38 | It decrements the contents of the B counter (FIG. 13) a $(u-a)$ amount | It sets R40. |
| R40 | The timing out of R39 | It gates the contents of the B counter (FIG. 13) to register *u* (FIG. 14B) | It sets R41. |
| R41 | The timing out of R40 | It increments the B counter (FIG. 13) a *u* amount | It sets R42. |
| R42 | The timing out of R41 | It gates the contents of the B counter (FIG. 13) to start load register 326 (FIG. 21). | It sets R43. |
| R43 | The timing out of R42. The timing out of R44. The timing out of R49. | It asks the question as to whether "store instruction" memory access is complete by testing flip-flop 312 (FIG. 12) utilizing the decay of R43. | If flip-flop 312 is at "1," it sets R44. If flip-flop 312 is at "0," it sets R59. |
| R44 | The timing out of R43 | It is used for delay only | It sets R43. |
| R45 | The timing out of R36 | It resets end load flip-flop 274 (FIG. 20) to "0." It gates the contents of register 280 (FIG. 24) to the Z field of register 170 (FIG. 15A). It gates the contents of register 296 (FIG. 25) to thd X and Y fields of register 170 (FIG. 15A). | It sets R46. |
| R46 | The timing out of R45 | It gates the contents of register 170 (FIG. 15A) to the buffer (FIG. 15) | It sets R47. |
| R47 | The timing out of R46 | It gates the contents of register 278 (FIG. 24) to the Z field of register 170 (FIG. 15A). It gates the contents of register 292 (FIG. 25) to the X and Y fields of register 170 (FIG. 15A). It increments the B counter (FIG. 13). | It sets R48. |
| R48 | The timing out of R47 | It gates the contents of register 170 (FIG. 15A) to the buffer (FIG. 15) | It sets R49. |
| R49 | The timing out of R48 | It gates the contents of the buffer plus one register to registers *a* and *u* (FIG. 14). (Alternatively, register *u* could be set to "buffer plus one" throughout the read operation for any input-output device which rarely urgently needs service, i.e., any device for which loss of data by overrun is not possible. Similarly, the *a* and *u* amounts could depend upon the latter device's speed.) | It sets R43. |
| R50 | The timing out of R22. The timing out of R52. The timing out of R57. | It gates the Z field of register 174 (FIG. 15) to assembly register 224 (FIG. 17B) | It sets R51. |
| R51 | The timing out of R50 | It asks the question as to whether assembly ring 232 (FIG. 17B) is on "6" by using the decay of R51 to test gate 360 (FIG. 17B). | If line 304 (FIG. 17B) is active, it sets R52. If line 302 is active, it sets R53 and sets assembly unload flip-flop 346 (FIG. 17A) to "1." |

Table—Continued

| Mono Number | Set conditions | Functions performed when set | Functions when timing out |
|---|---|---|---|
| R52 | The timing out of R51 | It advances assembly ring 232 (FIG. 17B). Increments the B counter (FIG. 13) | It sets R50. |
| R53 | The timing out of R51. The timing out of R54. | It asks the question as to whether memory access is complete by using the fall of R53 to test flip-flop 346 (FIG. 17A). | If flip-flop 346 is at "1", it sets R54. If flip-flop 346 is at "0", it sets R55. |
| R54 | The timing out of R53 | It is used for delay only | It sets R53. |
| R55 | The timing out of R53 | It increments the R field of the instruction register (IR) (FIG. 12). It subtracts six from unload counter 328 (FIG. 22). | It sets R56. |
| R56 | The timing out of R55 | It asks the question as to whether unload counter 328 (FIG. 22) is at "0" by testing the decoder in the output of the unload counter. | If the unload counter is at "0," it sets R58. If it is not at "0," it sets R57. |
| R57 | The timing out of R56 | It resets assembly ring 232 (FIG. 17B). It increments the B counter (FIG 13). | It sets R50 |
| R58 | The timing out of R56 | It sets service flip-flop 270 (FIG. 18) to "1," It disconnects the A unit. (A pulse is applied to one of leads 314 (FIG. 4D) depending upon which A unit is connected to the B unit.) | It sets R59. |
| R59 | The timing out of R58. The timing out of R15. The timing out of R20. The timing out of R43. | It disconnects the B unit by setting flip-flops 126 and 138 (FIG. 9) to "0." | |

"Write" Microprogram

This program employs the "write" clock R which is a clock of monostable multivibrator stages similar to the "processor seek" "instruction fetch" and "read" clocks in which the timing out of a multivibrator sets a different multivibrator in the clock.

Figures 26, 26A:
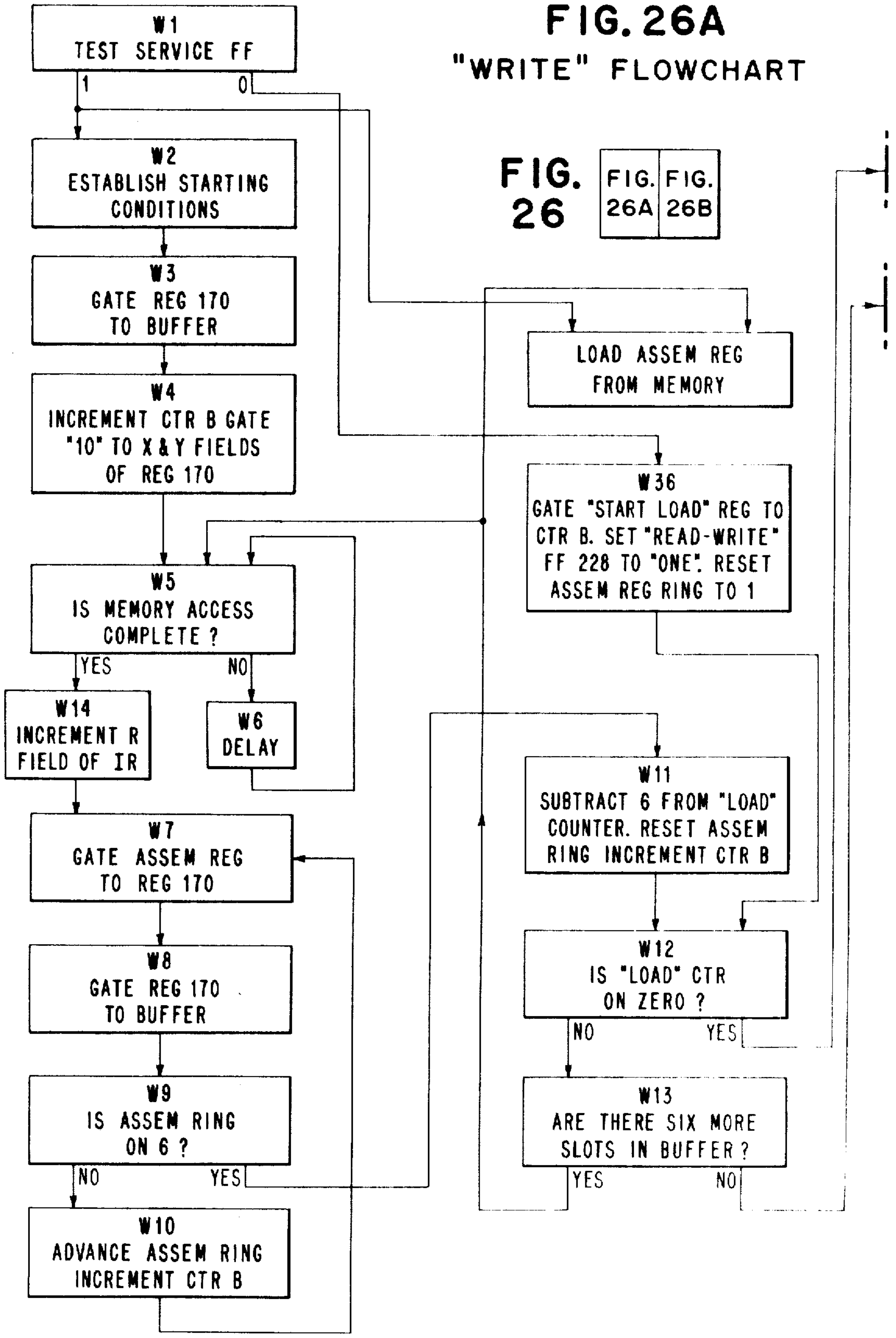
FIGS. 26A and 26B, taken together as in FIG. 26, is a flow chart of a "write" microprogram carried out according to the invention.
Figure 26B:
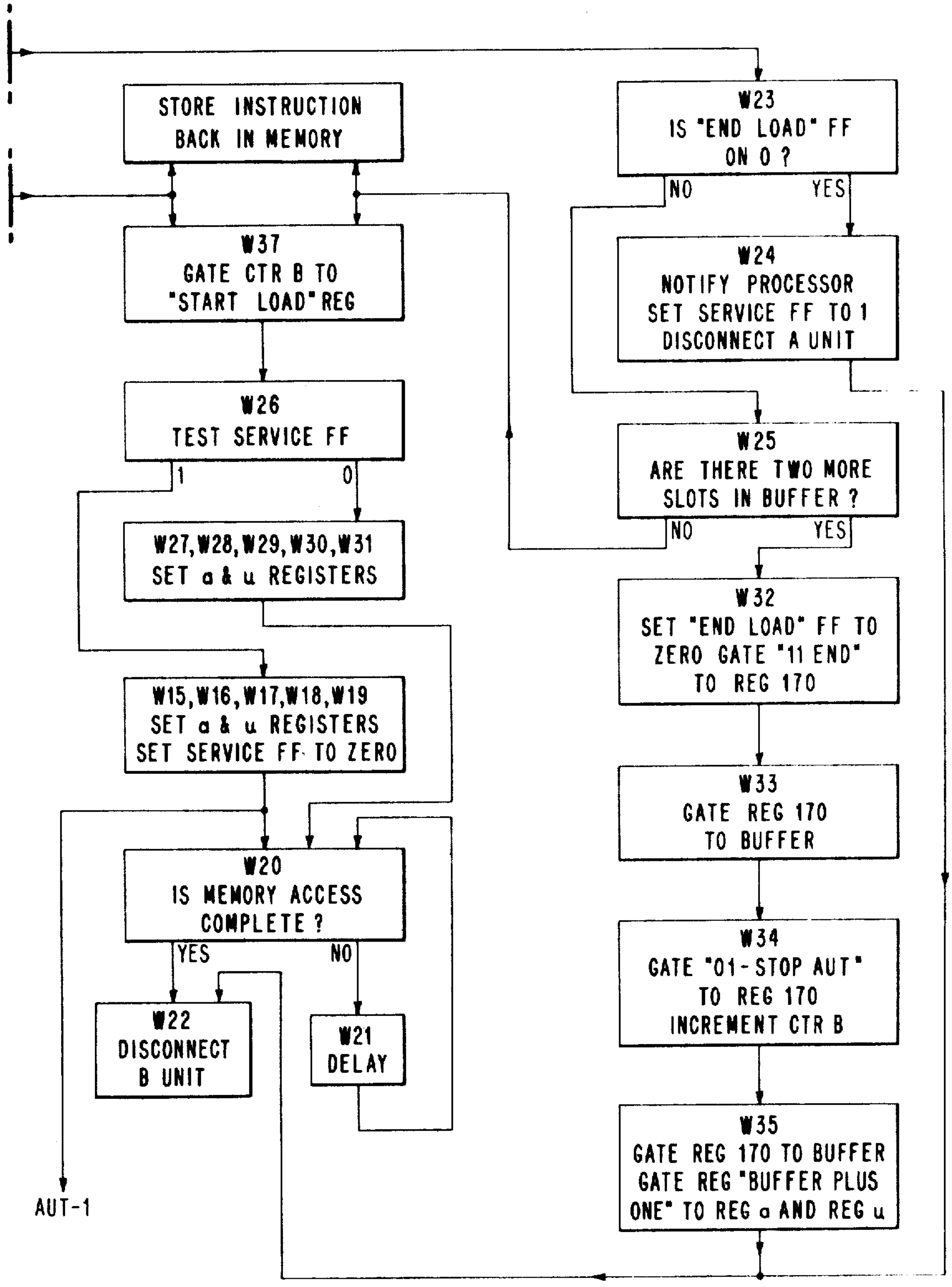
Figure 27:
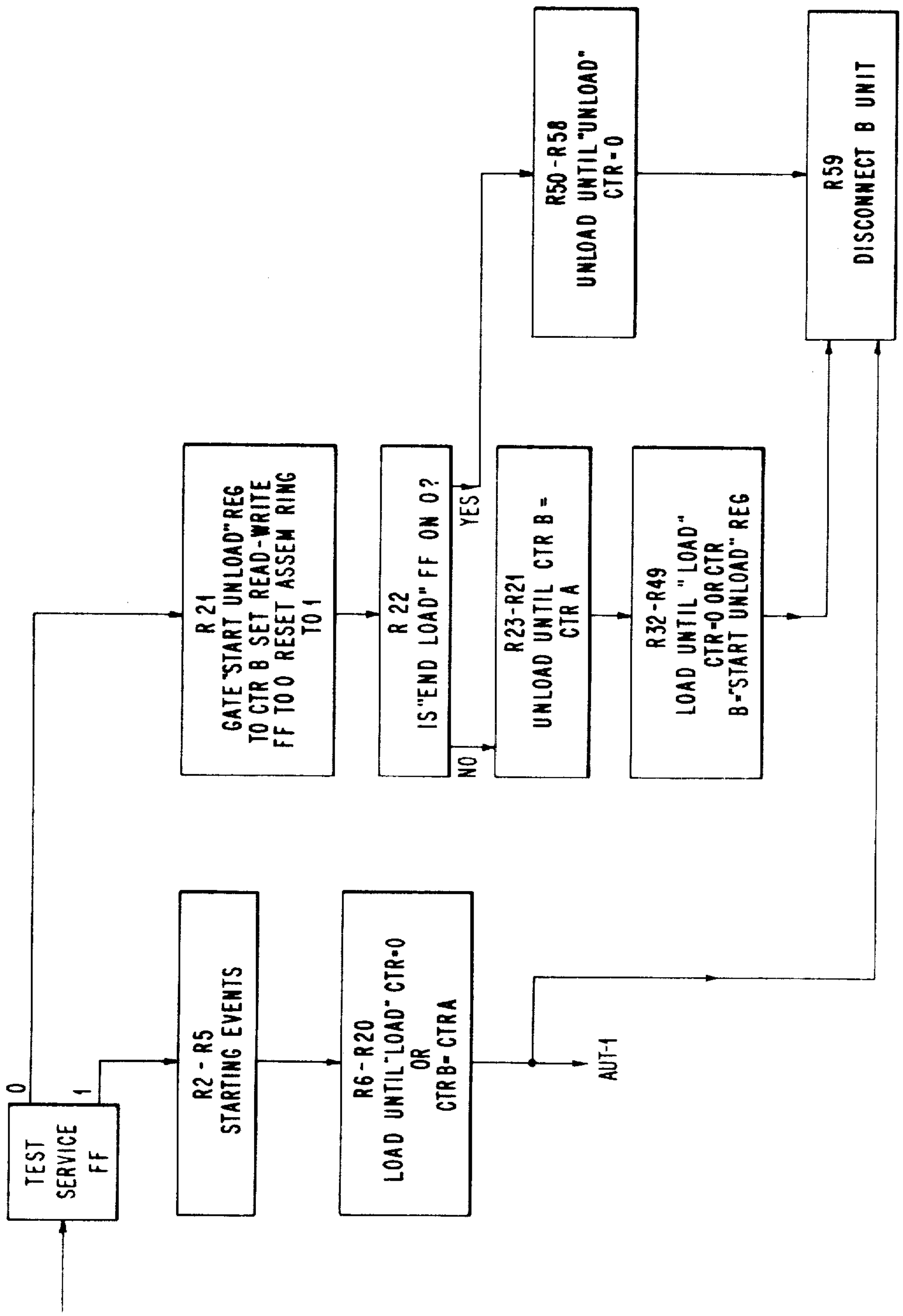
FIG. 27 is a portion of a flow chart of a "read" microprogram carried out according to the invention.
Figure 28:
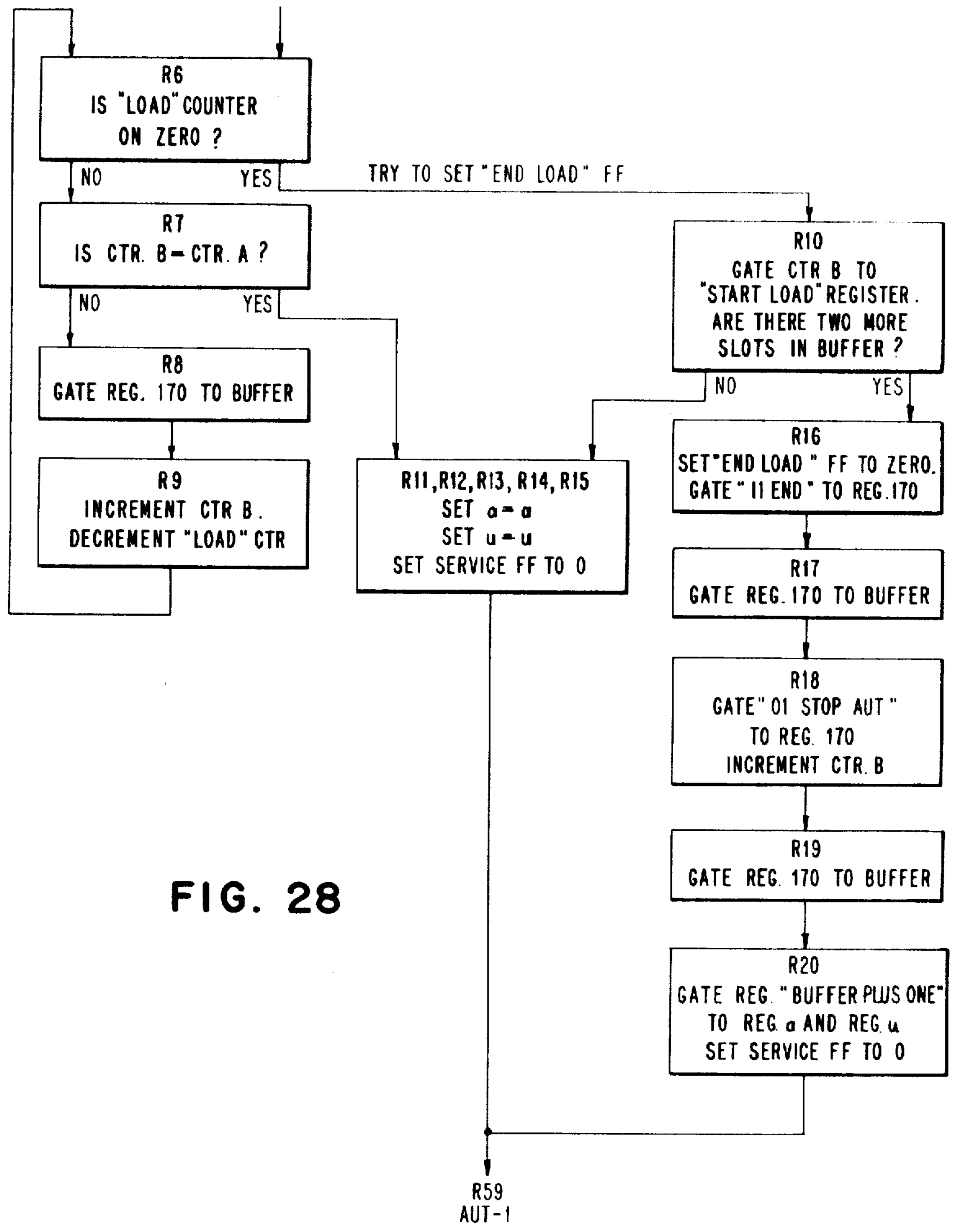
FIG. 28 is another portion of the flow chart of the "read" microprogram.
Figure 29:
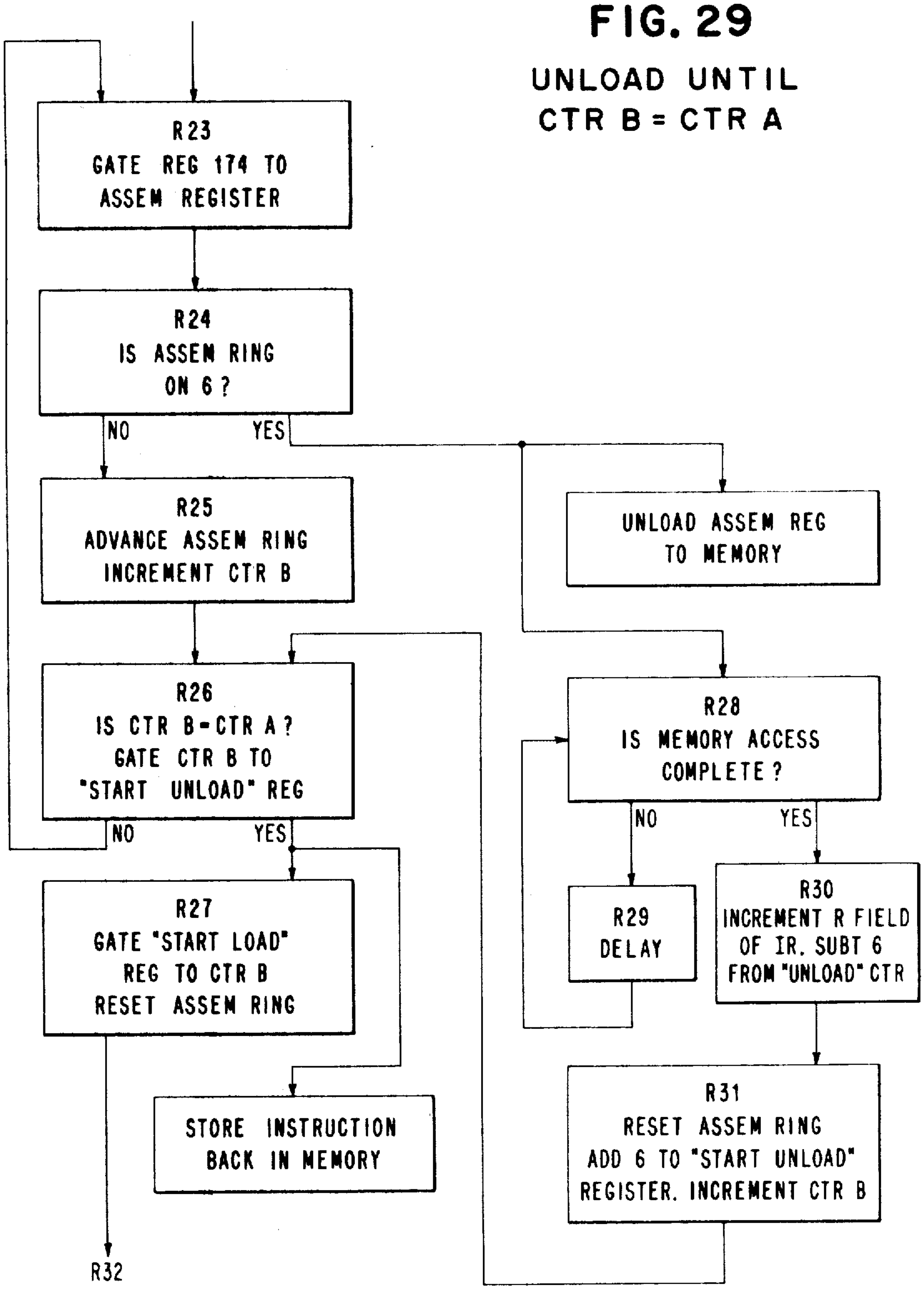
FIG. 29 is a further portion of the flow chart of the "read" microprogram.
Figure 30:
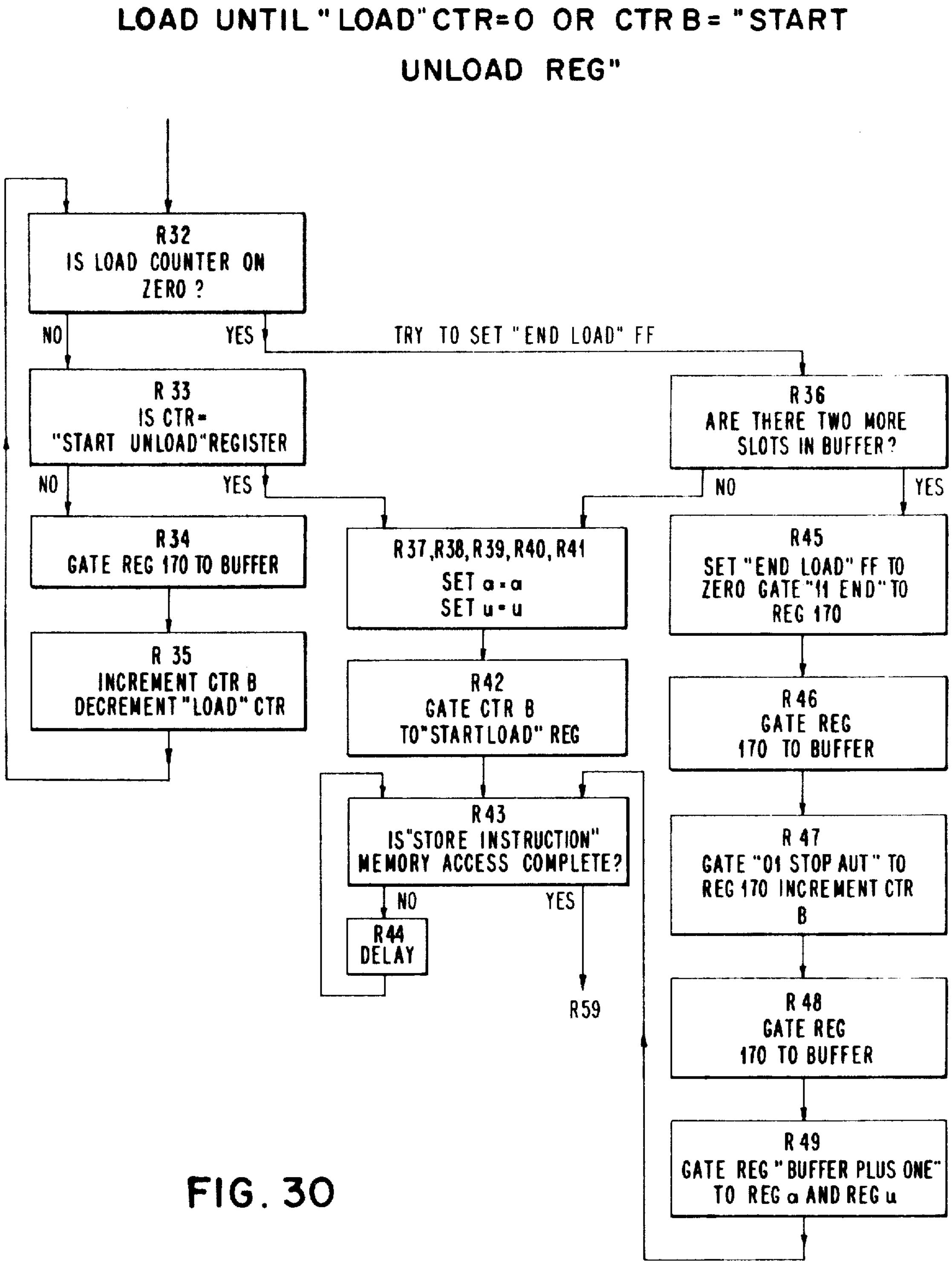
FIG. 30 is a still further portion of the flow chart of the "read" microprogram.
Figure 31:
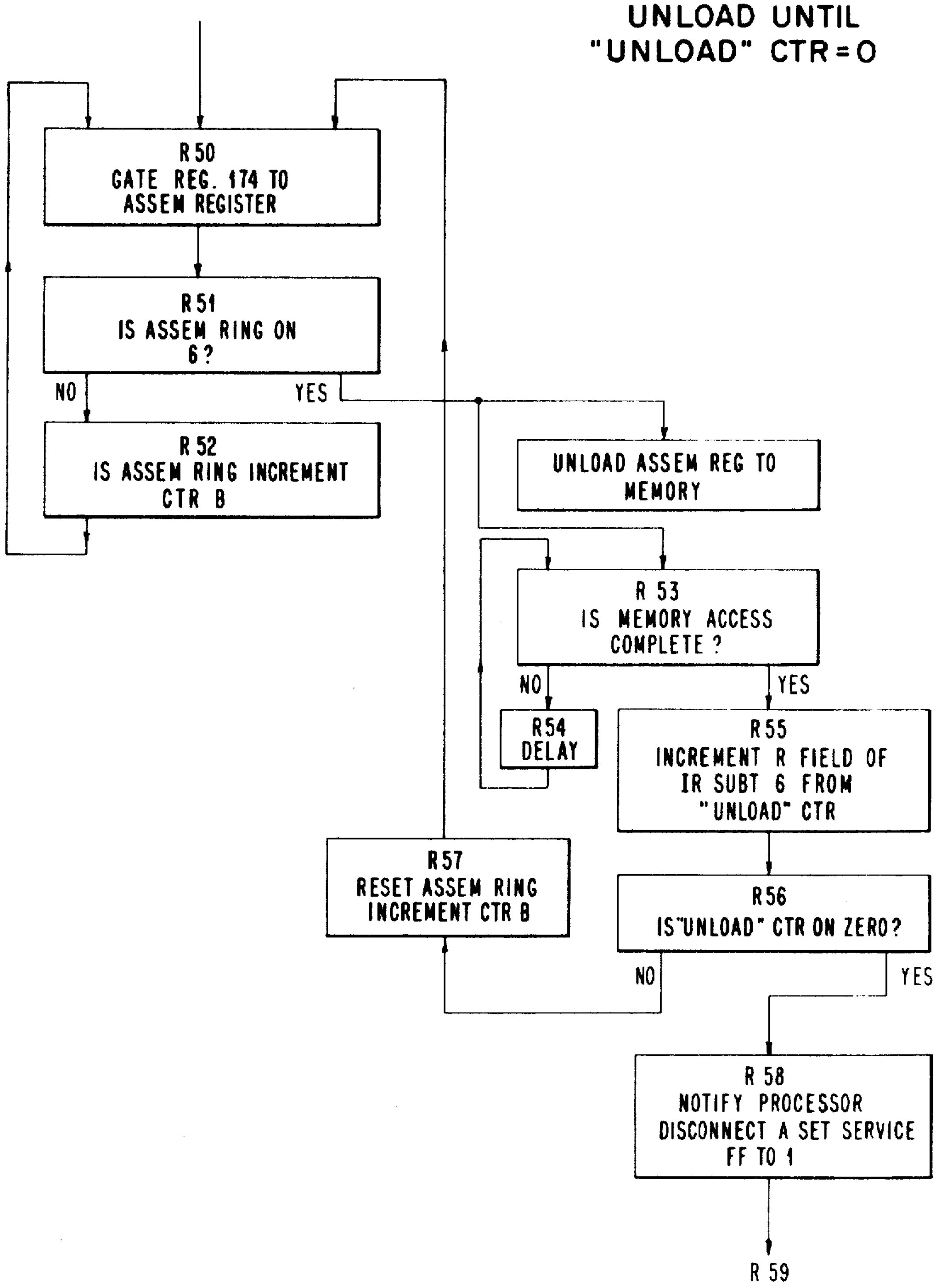
FIG. 31 is still another portion of the flow chart of the "read" microprogram.

The following table sets forth the relationship of the operations under the control of the write clock. This chart together with the flow chart depicted in FIG. 26 provides an explanation of the "write" operation.

| Mono Number | Set conditions | Functions performed when set | Functions when timing out |
|---|---|---|---|
| W1 | The W-1 output of decoder 168 (FIG. 12). | It tests service flip-flop 270 (FIG. 18) | If flip-flop 270 is at "1," it sets W2 and flip-flop 226 (FIG. 17A). If flip-flop 270 is at "0," it sets W36. |
| W2 | The timing out of W1 | It resets the A counter to "0" (FIG. 14A). It resets the B counter to "0" (FIG. 13). It gates "write" (register 286, FIG. 24) to the Z field of register 170 (FIG. 15A). It gates "11" (register 296, FIG. 25) to X and Y field of register 170 (FIG. 15A). It gates the Q field of the instruction register (IR) (FIG. 12) (FIG. 12) to load counter 272 (FIG. 19). It sets the read-write flip-flop 228 (FIG. 17A) to "1." It resets assembly register ring 232 (FIG. 17B) to "1." It sets end load flip-flop 274 (FIG. 20) to "1." | It sets W3. It sets assembly register load flip-flop 226 (FIG. 17) to "1." |
| W3 | The timing out of W2 | It gates the contents of register 170 (FIG. 15A) to the buffer (FIG. 15) | It sets W4 |
| W4 | The timing out of W3 | It increments the B counter (FIG. 13). It gates 10 (stage 294, FIG. 25) to the X and Y fields of register 170 (FIG. 15A). | It sets W5. |
| W5 | The timing out of W4. The timing out of W6. | It asks the question as to whether memory access is complete by testing flip-flop 226 (FIG. 17A). | If flip-flop 226 is at "1," it sets W6. If flip-flop 226 is at "0," it sets W14. |
| W6 | The timing out of W5 | It serves as a delay only | It sets W5. |
| W7 | The timing out of W14. The timing out of W10. | It gates one byte of assembly register 224 (FIG. 17B) to register 170 (FIG. 15A) | It sets W8. |
| W8 | The timing out of W7 | It gates the contents of register 170 (FIG. 15A) to the buffer (FIG. 15) | It sets W9. |
| W9 | The timing out of W8 | It asks the question as to whether assembly ring 232 (FIG. 17B) is at "6" | If line 302 (FIG. 17B) is active, it sets W11. If line 304 is active, it sets W10. |
| W10 | The timing out of W9 | It advances assembly ring 232 (FIG. 17B). It increments the B counter (FIG. 13). | It sets W7. |
| W11 | The timing out of W9 | It subtracts six from load counter 272 (FIG. 19). It resets assembly ring 232 (FIG. 17B). It increments the B counter (FIG. 13). | It sets W12. |
| W12 | The timing out of W11. The timing out of W36. | It asks the question as to whether load counter 272 (FIG. 19) is at "0" by testing decoder 308 (FIG. 18). | If counter 272 is at "0," it sets W23. If counter 272 is not at "0," it sets W13. |
| W13 | The timing out of W12 | It asks the question as to whether there [illegible] six more slots in the buffer (FIG. 15) by testing gate 310 (FIG. 14B). | If there are six or more slots in the buffer, it sets W14 and sets flip-flop 226 (FIG. 17A). If there are less than six, it sets W37 and flip-flop 312 (FIG. 12). |
| W14 | The timing out of W13. The timing out of W5. | It increments the R field of the instruction register (IR) (FIG. 12) | It sets W7. |
| W15 | The timing out of W26 | It decrements the B counter (FIG. 13) an "$a$" amount | It sets W16. |
| W16 | The timing out of W15 | It gates the contents of the B counter (FIG. 13) to register $a$ (FIG. 14B) | It sets W17. |
| W17 | The timing out of W16 | It decrements the B counter (FIG. 13) an $(a-u)$ amount | It sets W18. |
| W18 | The timing out of W17 | It gates the contents of the B counter (FIG. 13) to register $u$ (FIG. 14B) | It sets W19. |
| W19 | The timing out of W18 | It increments the B counter (FIG. 13) a $u$ amount. It resets service flip-flop 270 (FIG. 18) to "0". | It sets W21. It sets Aut-1. |
| W20 | The timing out of W19. The timing out of W21. The timing out of W31. | It asks the question as to whether memory access is complete by testing flip-flop 312 (FIG. 12). | If flip-flop 312 is at "1," it sets W21. If flip-flop 312 is at "0," it sets W22. |
| W21 | The timing out of W20 | It is used for delay only | It sets W20. |
| W22 | The timing out of W20. The timing out of W24. The timing out of W35. | It disconnects the B unit by resetting flip-flops 126 and 138 (FIG. 9) to "0" | |
| W23 | The timing out of W12 | It asks the question as to whether end load flip-flop 274 is at "0" by testing flip-flop 274 (FIG. 20). | If flip-flop 274 is at "0," it sets W24. If flip-flop 274 is at "1," it sets W25. |
| W24 | The timing out of W23 | It notifies the processor by setting service flip-flop 220 (FIG. 18) to "1" and disconnecting the A unit by applying a pulse to an appropriate one of leads 314 (FIG. 4D) depending upon which A unit is connected to the B unit. | It sets W22. |
| W25 | The timing out of W23 | It asks the question as to whether there are two more slots in the buffer (FIG. 15). | If there are at least two more slots in the buffer, it sets W32. If there are less than two, it sets W37. It sets flip-flop 312 (FIG. 12). |
| W26 | The timing out of W37 | It tests service flip-flop 270 (FIG. 18) | If flip-flop 270 is at "0," it sets W27. If flip-flop 270 is at "1," it sets W15. |
| W27 | The timing out of W26 | It decrements the B counter (FIG. 13) an "$a$" amount | It sets W28. |
| W28 | The timing out of W27 | It gates the contents of the B counter (FIG. 13) to register $a$ (FIG. 14B) | It sets W29. |
| W29 | The timing out of W28 | It decrements the B counter (FIG. 13) an $(a-u)$ amount | It sets W30. |
| W30 | The timing out of W29 | It gates the contents of the B counter (FIG. 13) to register $u$ (FIG. 14B) | It sets W31. |
| W31 | The timing out of W30 | It increments the B counter $a$ ($u$) amount | It sets W20. |
| W32 | The timing out of W25 | It resets the end load flip-flop 274 (FIG. 20) to "0." It gates the contents of register 280 (FIG. 20) to the Z field of register 170 (FIG. 15A). It gates the contents of register 296 (FIG. 25) to the X and Y fields of register 170 (FIG. 15A). | It sets W33. |

Table—Continued

| Mono Number | Set conditions | Functions performed when set | Functions when timing out |
| --- | --- | --- | --- |
| W33 | The timing out of W32 | It gates the contents of register 170 (FIG. 15A) to the buffer (FIG. 15) | It sets W34. |
| W34 | The timing out of W33 | It gates the contents of register 278 (FIG. 24) to the Z field of register 170 (FIG. 15A). It gates the contents of register 292 (FIG. 25) to the X and Y fields of register 170 (FIG. 15A). It increments the B counter (FIG. 13). | It sets W35. |
| W35 | The timing out of W34 | It gates the contents of register 170 (FIG. 15A) to the buffer (FIG. 15). It gates the contents of the "buffer plus one" register (FIG. 14B) to registers *a* and *u* (FIG. 14B). (In an alternative implementation, register *u* could be set to the "buffer plus one" setting throughout the write operation for any input output device which rarely urgently needs service, i.e., any device for which loss of data by an overrun is not possible. Similarly, the *a* and *u* amounts could depend on the speed of the device.) | It sets W22. |
| W36 | The timing out of W1 | It gates the contents of the start load register 326 (FIG. 21) to the B counter (FIG. 13). It sets read-write flip-flop 228 (FIG. 17) to "1." It sets assembly ring 232 (FIG. 17) to "1." | It sets W12. |
| W37 | The timing out of W13. The timing out of W25. | It gates the contents of the B counter (FIG. 13) to start load register 326 (FIG. 21). | It sets W26. |

"Read A Record" Microprogram

This program employs the "read a record" clock RR which is a clock of monostable multivibrator stages similar to the "-processor seek," the "instruction fetch," the "read," and the "write" clocks in which the timing out of the set state of a multivibrator turns on a different multivibrator in the clock.

Figure 32A:
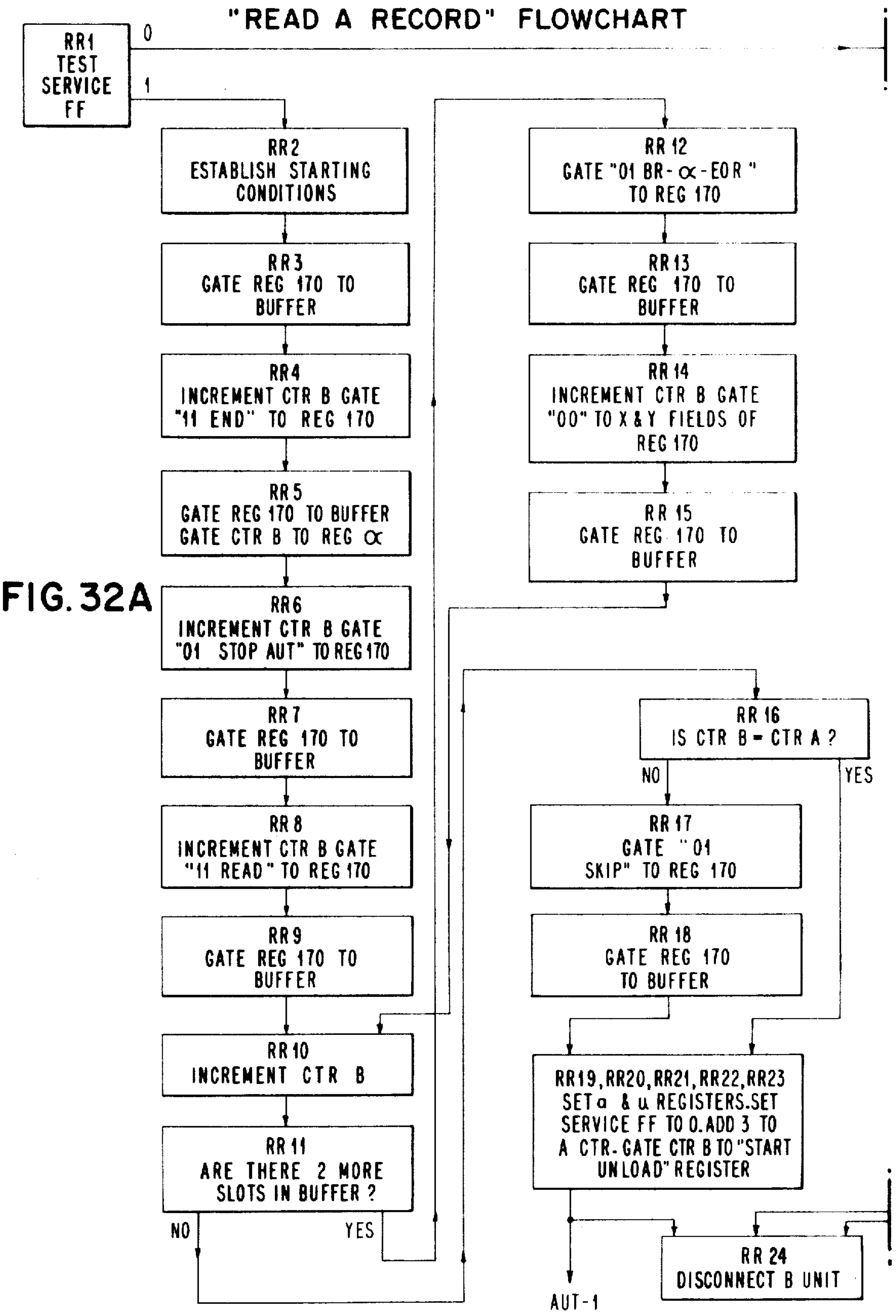
FIGS. 32A and 32B, taken together as in FIG. 32, is a flow chart of a "read a record" flow chart carried out according to the invention.
Figures 32, 32B:
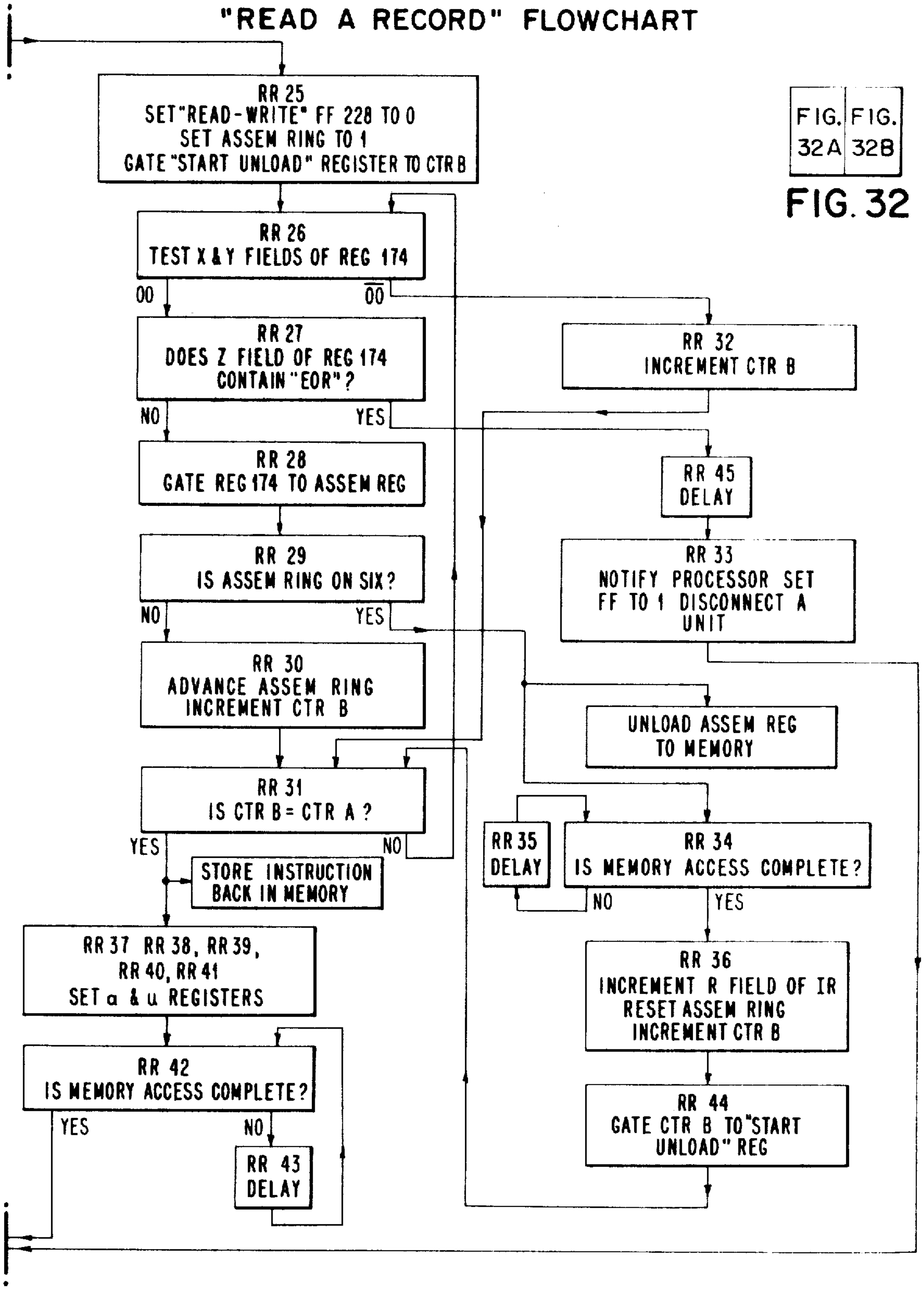

The following table sets forth the relationship of the operations under the control of the "read a record" clock RR. This table together with the flow chart shown in FIG. 32 provides an explanation of the "read a record" operation.

| Mono Number | Set conditions | Functions performed when set | Functions when timing out |
| --- | --- | --- | --- |
| RR1 | The RR1 output of decoder 168 (FIG. 12). | It tests service flip-flop 270 (FIG. 18) | If flip-flop 270 is at "1," it sets RR2. If flip-flop 270 is at "0," it sets RR25. |
| RR2 | The timing out of RR1 | It resets the A counter (FIG. 14) to zero. It resets the B counter (FIG. 13) to zero. It gates "BR-(A+4)" (the output of register 350, FIG. 24) to Z field of register 170 (FIG. 15A). It gates "01" (the output of register 292, FIG. 25) to the X and Y fields of register 170 (FIG. 15A). | It sets RR3. |
| RR3 | The timing out of RR2 | It gates the contents of register 170 (FIG. 15A) to the buffer (FIG. 15) | It sets RR4. |
| RR4 | The timing out of RR3 | It increments the B counter (FIG. 13). It gates "END" (the output of register 280, FIG. 24) to the Z field of register 170 (FIG. 15A). It gates "11" (the output of register 296, FIG. 25) to the X and Y fields of register 170 (FIG. 15A). | It sets RR5. |
| RR5 | The timing out of RR4 | It gates the contents of register 170 (FIG. 15A) to the buffer (FIG. 15). It gates the contents of the B counter (FIG. 13) to register α (FIG. 23). | It sets RR6. |
| RR6 | The timing out of RR5 | It increments the B counter (FIG. 13). It gates "Stop Aut" (the contents of register 278, FIG. 24) to the Z field of register 170 (FIG. 15A). It gates "01" (the contents of register 292, FIG. 25) to the X and Y fields of register 170 (FIG. 15A). | It sets RR7. |
| RR7 | The timing out of RR6 | It gates the contents of register 170 (FIG. 15A) to the buffer (FIG. 15) | It sets RR8. |
| RR8 | The timing out of RR7 | It increments the B counter (FIG. 13). It gates "read" (the contents of register 284, FIG. 24) to the Z field of register 170 (FIG. 15A). It gates "11" (the contents of register 296, FIG. 25) to the X and Y fields of register 170 (FIG. 15A). | It sets RR9. |
| RR9 | The timing out of RR8 | It gates the contents of register 170 (FIG. 15A) to the buffer (FIG. 15) | It sets RR10. |
| RR10 | The timing out of RR9 | It increments the B counter (FIG. 13) | It sets RR11. |
| RR11 | The timing out of RR10 | It asks the question as to whether there are two more slots in the buffer (FIG. 15) by testing gate 362 (FIG. 14B). | If there are at least two slots in the buffer, it sets RR12. If there are less than two slots in the buffer, it sets RR16. |
| RR12 | The timing out of RR11 | It gates "BR-α-EOR" (the contents of register 352, FIG. 24) to the Z field of register 170 (FIG. 15A). It gates "01" (the contents of register 292, FIG 25) to the X and Y fields of register 170 (FIG. 15A). | It sets RR13. |
| RR13 | The timing out of RR12 | It gates the contents of register 170 (FIG. 15A) to the buffer | It sets RR14. |
| RR14 | The timing out of RR13 | It increments the B counter (FIG. 15A). It gates "00" (the contents of register 290, FIG. 25) to the X and Y fields of register 170 (FIG. 15A). | It sets RR15. |
| RR15 | The timing out of RR15 | It gates the contents of register 170 (FIG. 15A) to the buffer (FIG. 15) | It sets RR16. |
| RR16 | The timing out of RR15. The timing out of RR11. | It asks the question as to whether the contents of the B counter are equal to the contents of the A counter by testing compare unit 210 (FIG. 14A). | If the respective contents are equal, it sets RR19. If the contents are not equal, it sets RR17. |
| RR17 | The timing out of RR16 | It gates "skip" (the contents of register 348, FIG. 24) to the Z field of register 170 (FIG. 15A). It gates "01" (the contents of register 292, FIG. 25) to the X and Y fields of register 170 (FIG. 15A). | It sets RR18. |
| RR18 | The timing out of RR17 | It gates the contents of register 170 (FIG. 15A) to the buffer (FIG. 15) | It sets RR19. |
| RR19 | The timing out of RR18. The timing out of RR16. | It decrements the B counter (FIG. 13) an "*a*" amount | It sets RR20. |
| RR20 | The timing out of RR19 | It gates the contents of the B counter (FIG. 13) to register *a* (FIG. 14B) | It sets RR21. |
| RR21 | The timing out of RR20 | It decrements the B counter (FIG. 13) an $(a-u)$ amount | It sets RR22. |
| RR22 | The timing out of RR21 | It gates the contents of the B counter (FIG. 13) to register *u* (FIG. 14B) | It sets RR23. |
| RR23 | The timing out of RR22 | It increments the B counter (FIG. 13) a "*u*" amount. It resets service flip-flop 270 (FIG. 18) to "0." It adds three to the A counter (FIG. 14A). It gates the contents of the B counter to start unload register 340 (FIG. 23). | It sets RR24. It sets Aut-1. |
| RR24 | The timing out of RR23. The timing out of RR42. | It disconnects the B unit, i.e., it resets flip-flops 126 and 138 (FIG. 9) to "0." | |
| RR25 | The timing out of RR1 | It resets read-write flip-flop 228 (FIG. 17A) to "0." It sets assembly ring 232 (FIG. 17B) to "1". It gates the contents of start unload register 340 (FIG. 23) to the B counter (FIG. 13). | It sets RR26. |
| RR26 | The timing out of RR25. The timing out of RR31. | It tests decoder 364 (FIG. 15B) | If decoder 364 is at 00, it sets RR27. If decoder 364 is at $\overline{00}$, it sets RR32. |
| RR27 | The timing out of RR25 | It tests decoder 366 (FIG. 12) | If the decoder 366 output is EOR, it sets RR45. If its output is EOR, it sets R28. |
| RR28 | The timing out of RR27 | It gates the Z field of register 174 (FIG. 15B) to assembly register 224 (FIG. 17B). | It sets RR29. |
| RR29 | The timing out of RR28 | It asks the question as to whether assembly ring 232 (FIG. 17B) is at six by using the fall of RR29 to test gate 368 (FIG. 17B). | If line 304 (FIG. 17B) is active, it sets RR30. If line 302 is active, it sets RR34 and also sets assembly register unload flip-flop 346 (FIG. 17A) to "1." |
| RR30 | The timing out of RR29 | It advances assembly ring 232 (FIG. 17B). It increments the B counter (FIG. 13). | It sets RR31. |

Table – Continued

| Mono Number | Set conditions | Functions performed when set | Functions when timing out |
|---|---|---|---|
| RR31 | The timing out of RR30. The timing out of RR32. The timing out of RR44. | It asks the question as to whether the contents of the A counter are equal to that of the B counter by testing compare unit 210 (FIG. 14). | If the respective contents are equal, it sets RR37 and also sets flip-flop 312 (FIG. 12). If the contents are not equal, it sets RR26. |
| RR32 | The timing out of RR26 | It increments the B counter (FIG. 13) | It sets RR31. |
| RR33 | The timing out of RR45 | It notifies processor, i.e., it sets service flip-flop 270 (FIG. 18). It disconnects the A unit (A pulse is applied to one of the leads 314 (FIG. 4D) depending upon which A unit is connected to the B unit). | |
| RR34 | The timing out of RR29. The timing out of RR35. | It asks the question as to whether memory access is complete by using the fall of R28 to test flip-flop 346 (FIG. 17A). | If flip-flop 346 is at "1," it sets RR35. If flip-flop 346 is at "0," it sets RR36. |
| RR35 | The timing out of RR34 | It is used for delay only | It sets RR34. |
| RR36 | The timing out of RR34 | It increments the R field of the instruction register (IR) (FIG. 12). It resets assembly ring 232 (FIG. 17B). It increments the B counter (FIG. 13). | It sets RR44. |
| RR37 | The timing out of RR31 | It decrements the B counter (FIG. 13) | It sets RR38. |
| RR38 | The timing out of RR37 | It gates the contents of the B counter (FIG. 13) to register *a* (FIG. 14B) | It sets RR39. |
| RR39 | The timing out of RR38 | It decrements the B counter (FIG. 13) | It sets RR40. |
| RR40 | The timing out of RR39 | It gates the contents of the B counter (FIG. 13) to register *u* (FIG. 14B) | It sets RR41. |
| RR41 | The timing out of RR40 | It increments the B counter (FIG. 13) a *u* amount | It sets RR42. |
| RR42 | The timing out of RR41. The timing out of RR43. | It asks the question as to whether memory access is complete by testing flip-flop 312 (FIG. 12) using the fall of RR42. | If flip-flop 312 is at "1," it sets RR43. If flip-flop 312 is at "0," it sets RR24. |
| RR43 | The timing out of RR42 | It is used for delay only | It sets RR42. |
| RR44 | The timing out of RR36 | It gates the contents of the B counter (FIG. 13) to start unload register 340 (FIG. 23). | It sets RR31. |
| RR45 | The timing out of RR31 | It is used for delay only. This mono is used to take care of the condition that might arise when the A counter had branched to α upon finding the EOR. If the B counter arrived at the EOR state just after the A counter branched to α, it would, if it were not for the delay provided by RR45, proceed to disconnect the A unit before the A unit had time to process the last two bytes, viz. "11 end" and "01 stop aut." It is to be noted that, when the "01 stop aut" command is executed, the a flip-flop is set to "1." The α flip-flop, however, is reset to "0" by RR33 at the time that the A unit is disconnected. | It sets RR33. |

"A Unit Test" (AUT) Microprogram

This program employs the "A unit test" clock (Aut) which is a clock comprised of monostable multivibrator stages similar to the "processor seek," the "instruction fetch," the "read," the "write," and the "read a record" clocks in which the timing out of the set state of a multivibrator turns on a different multivibrator in the clock.

Figure 35A:
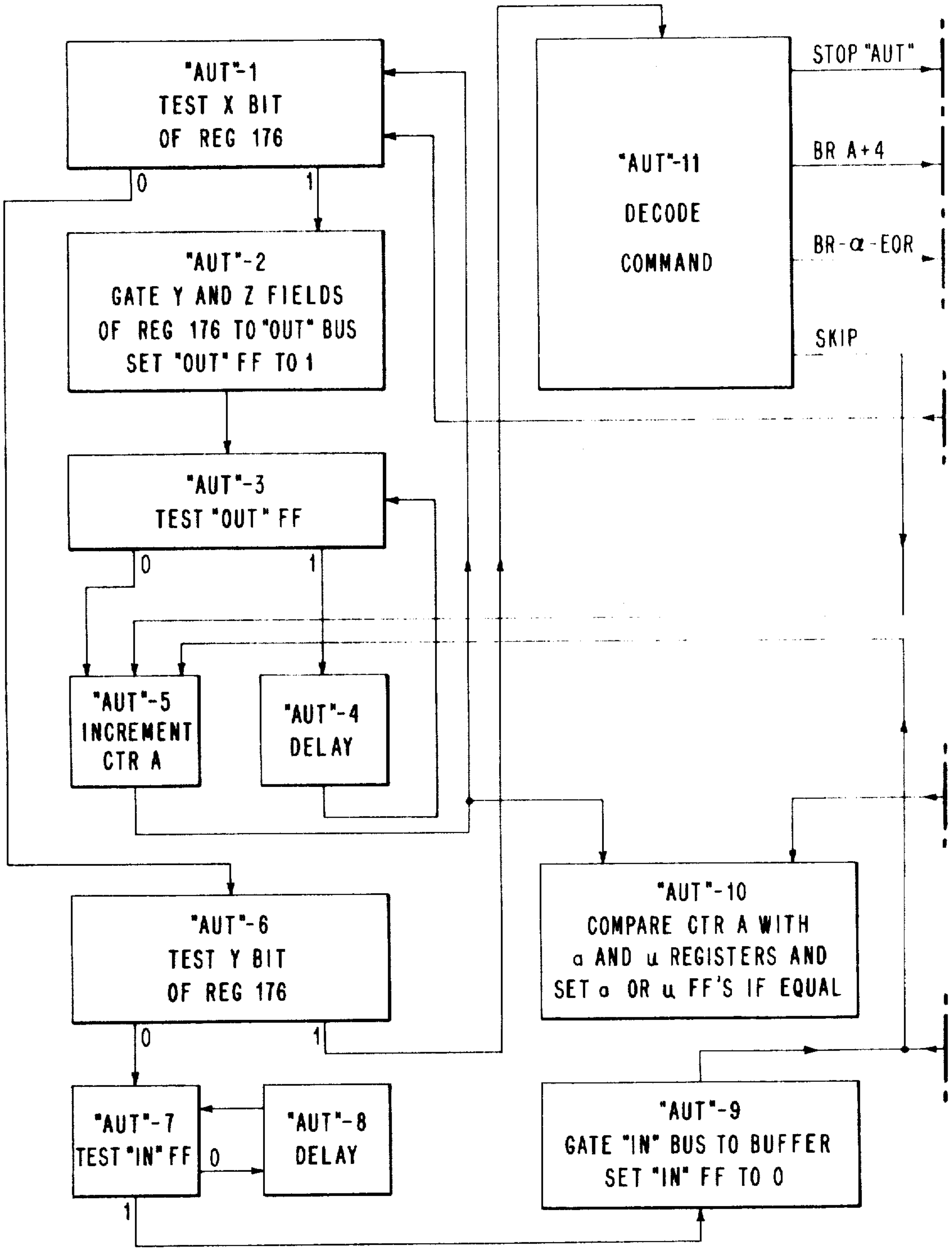
FIGS. 35A and 35B, taken together as in FIG. 35, is a flow chart of an "A unit test" microprogram carried out according to the invention.
Figure 35:
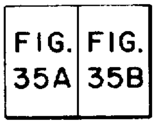
Figure 35B:
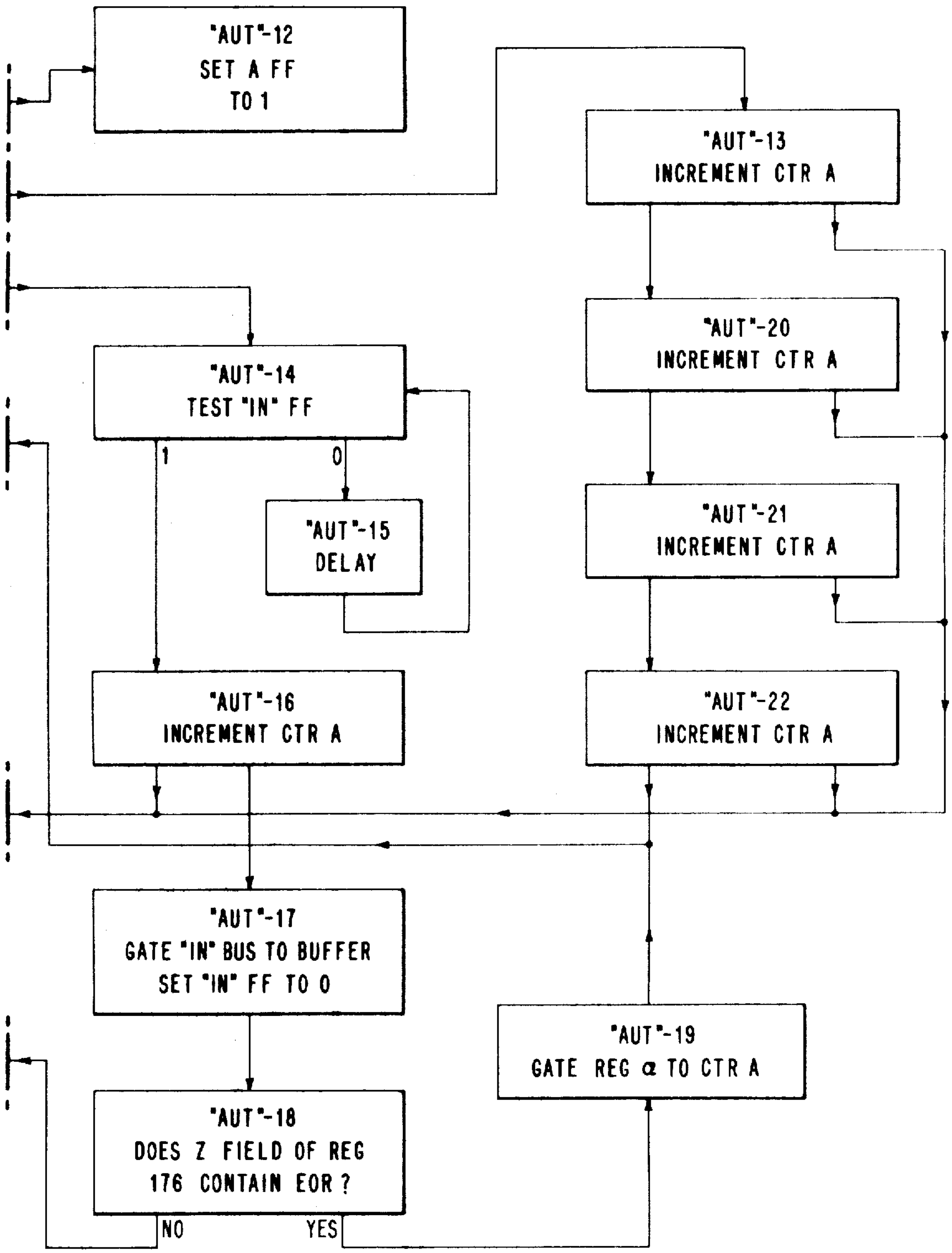

The following table sets forth the relationship of the operations under the control of clock Aut. This table together with the flow chart depicted in FIG. 35 provides an explanation of the "A unit test" operation.

Figure 33A:
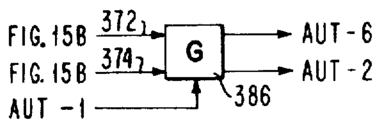
FIG. 33A is a diagram of a gating arrangement used in the "A unit test" microprogram.
Figure 33B:
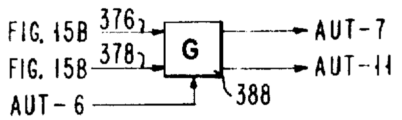
FIG. 33B is a diagram of another gating arrangement employed in the "A unit test" microprogram.
Figure 33C:
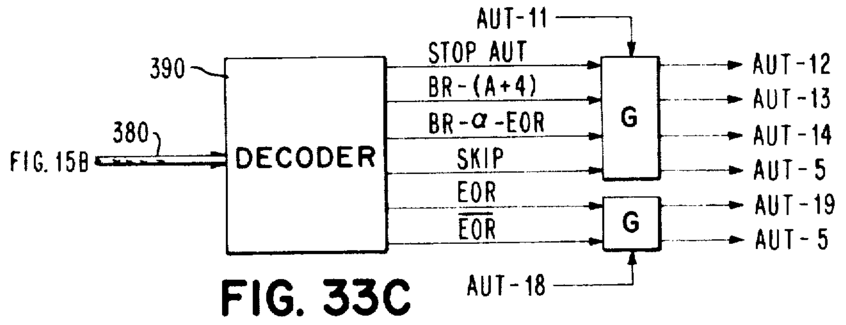
FIG. 33C is a diagram of a decoding and gating arrangement employed in the "A unit test" microprogram.
Figure 34:
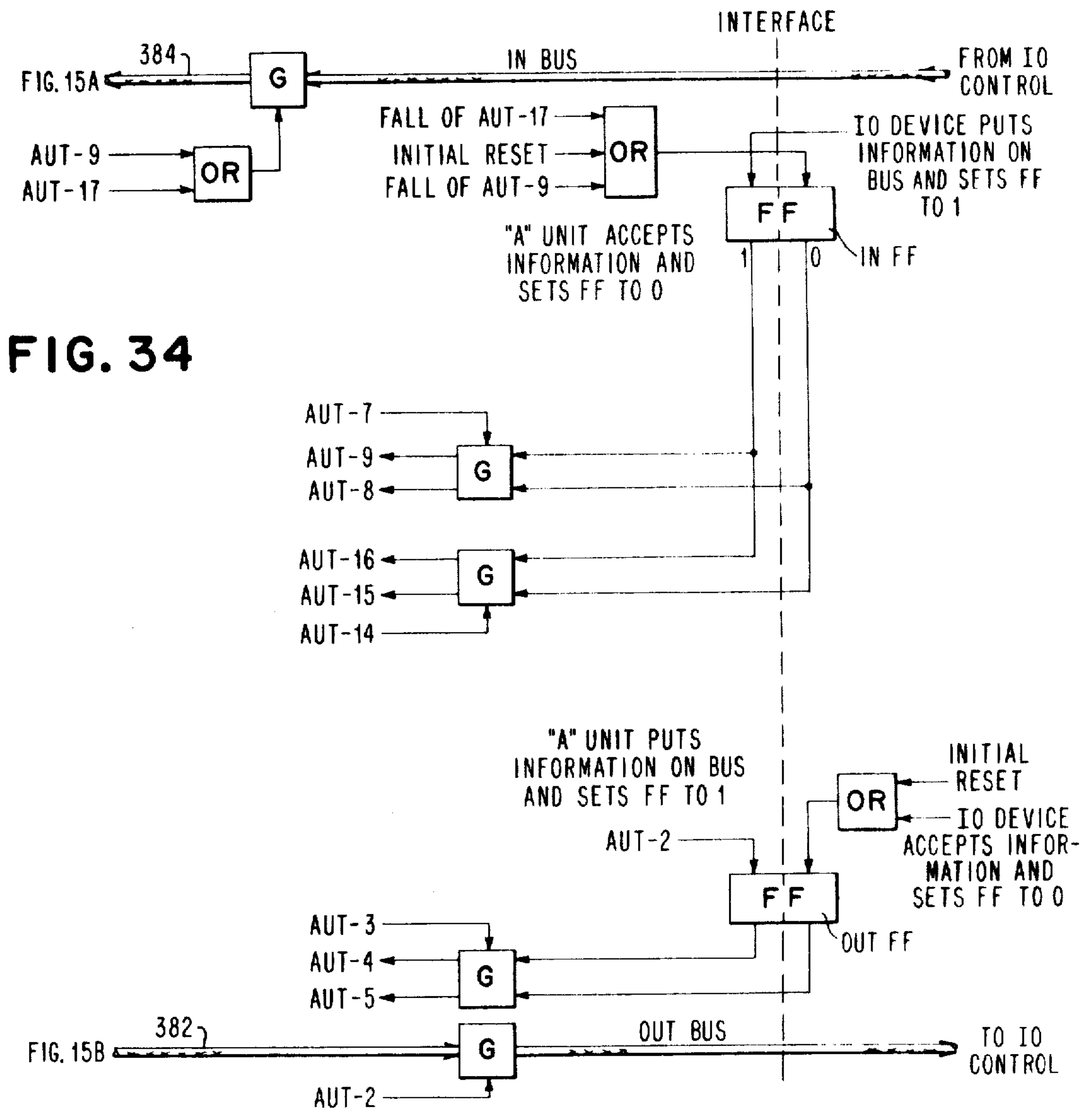
FIG. 34 is a diagram of a logic arrangement used in the "A unit test" microprogram.

| Mono Number | Set conditions | Functions performed when set | Functions when timing out |
|---|---|---|---|
| Aut-1 | The timing out of R15. The timing out of R20. The timing out of W19. The timing out of RR23. The timing out of Aut-19. The timing out of Aut-22. | It tests the X bit of register 176 (FIG. 15B) by testing gate 386 (FIG. 33a) | If line 374 is active, it sets Aut-6. If line 372 is active, it sets Aut-2. |
| Aut-2 | The timing out of Aut-1 | It gates the Y and Z fields of register 176 (FIG. 15B) to the "out" bus (FIG. 34). It sets the "out" flip-flop (FIG. 34) to 1. | It sets Aut -3. |
| Aut-3 | The timing out of Aut-2. The timing out of Aut-3. | It tests the "out" flip-flop (FIG 34) | If the "out" flip-flop is at "1," it sets Aut-4. If the "out" flip-flop is at "0," it sets Aut-5. |
| Aut-4 | The timing out of Aut-3 | It is used for delay only | It sets Aut-3. |
| Aut-5 | The timing out of Aut-3. The timing out of Aut-9. The timing out of Aut-11. The timing out of Aut-18. | It increments the A counter (FIG. 14) | It sets Aut-6. |
| Aut-6 | The timing out of Aut-5. The timing out of Aut-6. | It tests the Y bit of register 176 (FIG. 15B) by testing gate 388 (FIG. 33b) | If line 376 is active, it sets Aut-7. If line 378 is active, it sets Aut-1. |
| Aut-7 | The timing out of Aut-6 | It tests the "in" flip-flop (FIG. 34) | If the "in" flip-flop is at "0," it sets Aut-8. If the "in" flip-flop is at "1," it sets Aut-9. |
| Aut-8 | The timing out of Aut-7 | It is used for delay only | It sets Aut-9. |
| Aut-9 | The timing out of Aut-7. The timing out of Aut-8. | It gates the "in" bus (FIG. 34) to the buffer (FIG. 15). It resets the "in" flip-flop (FIG. 34) to "0" using the fall of Aut-9. | It sets Aut-5. |
| Aut-10 | The timing out of Aut-13. The timing out of Aut-16. The timing out of Aut-20. The timing out of Aut-21. The timing out of Aut-22. | It tests the output of compare units 218 and 220 (FIG. 14B) | If compare unit 218 has an output, it sets the "*a*" flip-flop (FIG. 14B) to "1." If compare unit 220 has an output, it sets the "*u*" flip-flop to "1." |
| Aut-11 | The timing out of Aut-6 | It tests the output of decoder 390 (FIG. 33C) | If the output of decoder 390 is "stop aut," it sets Aut-12. If the output is "Br-(*A*+4)," it sets Aut-13. If the output is Br-α-EOR, it sets Aut-14. If the output is "skip," it sets Aut-5. |
| Aut-12 | The timing out of Aut-11 | It sets the "*a*" flip-flop (FIG. 14B) to "1" | |
| Aut-13 | The timing out of Aut-11 | It increments the A counter (FIG. 14A) | It sets Aut-20. It sets Aut-10. |
| Aut-14 | The timing out of Aut-11. The timing out of Aut-15. | It tests the "in" flip-flop (FIG. 34) | If the "in" flip-flop is at "1," it sets Aut-16. If the "in" flip-flop is at "0," it sets Aut-15. |
| Aut-15 | The timing out of Aut-14 | It is used for delay only | It sets Aut-14. |
| Aut-16 | The timing out of Aut-14 | It increments the A counter (FIG. 14A) | It sets Aut-17. It sets Aut-10. |
| Aut-17 | The timing out of Aut-16 | It gates the "in" bus (FIG. 34) to the buffer (FIG. 15). It resets the "in" flip-flop (FIG. 34) to "0" using the fall of Aut-17. | It sets Aut-18. |
| Aut-18 | The timing out of Aut-17 | It asks the question as to whether the Z field of register 176 (FIG. 15B) contains "EOR" by testing decoder 390 (FIG. 33C). | If the Z field contains EOR, it sets Aut-19. If it does not, it sets Aut-5. |
| Aut-19 | The timing out of Aut-18 | It gates the contents of register α (FIG. 23) to the A counter (FIG. 14A) | It sets Aut-7. |
| Aut-20 | The timing out of Aut-13 | It increments the A counter (FIG. 14A) | It sets Aut-21. It sets Aut-10. |

Table – Continued

| Mono Number | Set conditions | Functions performed when set | Functions when timing out |
|---|---|---|---|
| Aut-21 | The timing out of Aut-20 | It increments the A counter (FIG. 14A) | It sets Aut-22. It sets Aut-10. |
| Aut-22 | The timing out of Aut-21 | It increments the A counter (FIG. 14A) | It sets Aut-10. It sets Aut-7. |

B Unit Scan (Column) Microprogram

This program employs the B unit scan clock CL which is a clock comprised of monostable multivibrator stages, similar to the "processor seek," the "instruction fetch," the "read," the "write," the "read a record" and the "A unit test" clocks in which the timing out of the set state of a multivibrator turns on a different multivibrator in the clock.

The following table sets forth the relationship of the operations under the control of clock CL. This table together with the flow chart depicted in FIG. 10 provides an explanation of the column B unit scan operation.

| Mono Number | Set conditions | Functions performed when set | Functions when timing out |
|---|---|---|---|
| CL1 | An initial pulse. The timing out of CL12. The timing out of CL15. | It resets flip-flop 86 (FIG. 8A) to "0" to thereby enable gate 88 which gates the u vector to the "leftmost one" circuit. It resets flip-flops 100–106 (FIG. 8B) to "0." It resets flip-flops I and II (FIG. 8C). | It sets CL2. |
| CL2 | The timing out of CL1 | It tests the "leftmost one" circuit. If a "1" exists in the u vector, it sets the corresponding one of flip-flops 100–106 (FIG. 8B). | If a "1" exists in the u vector, it sets CL9. If a "1" does not so exist, it sets CL3. |
| CL3 | The timing out of CL2 | It respecifies the u vector. (In this connection, note the "a" and "u" flip-flops, FIG. 14B.) | It sets CL4. |
| CL4 | The timing out of CL3. The timing out of CL8. | It resets flip-flop 86 (FIG. 8A) to "0" to thereby enable gate 88 which gates the u vector to the "leftmost one" circuit. It resets flip-flops 100–106 to "0." It resets flip-flops I and II (FIG. 8C) to "0." | It sets CL5. |
| CL5 | The timing out of CL4 | It tests the "leftmost one" circuit. If a "1" exists in the u vector, it sets the corresponding one of flip-flops 100–106. | If a "1" exists in the u vector it sets CL9. If a 1" does not exist, it sets CL6. |
| CL6 | The timing out of CL5 | It sets flip-flop 86 (FIG. 8A) to "1" to thereby enable gate 160 which gates the a vector to the "leftmost one" circuit. It resets flip-flops 100–106 to "0." It resets flip-flops I and II (FIG. 8C) to "0" | It sets CL7. |
| CL7 | The timing out of CL6 | It tests the "leftmost one" circuit. If a "1" exists in the a vector, it sets the corresponding one of flip-flops 100–106. | If a "1" exists in the a vector, it sets CL9. If a "1" does not exist, it sets CL8. |
| CL8 | The timing out of CL7 | It respecifies the u and a vectors. In this connection, note the *a* and *u* flip-flop- (FIG. 14B). | It sets CL4. |
| CL9 | The timing out of CL2. The timing out of CL5. The timing out of CL7. The timing out of CL11. | It sets the *u* and *a* components in the B unit to zero It tests the response flip-flop and 394-400 from flip-flops *a* and *u* (FIG. 11B). If flip-flop *a* or flip-flop *u* are at "1" and the response flip-flop is at "0," then it sets flip-flop II (FIG. 8B). If flip-flops *a* and *u* are at "0" and the response flip-flop is at "1," then it sets flip-flop I (FIG. 8B). | It sets CL10. |
| CL10 | The timing out of CL9 | It asks the question as to whether flip-flops I and II are in the same state by testing gate 402 (FIG. 8B). | If flip-flops I and II are in the same state, it sets CL11. If they are in different states, it sets CL12. |
| CL11 | The timing out of CL10 | It resets flip-flops I and II to "0" | It sets CL9. |
| CL12 | The timing out of CL10 | It tests flip-flop II | If flip-flop II is at "1," it sets CL13. If flip-flop I is at "0," it sets CL1. |
| CL13 | The timing out of CL12 | It sets the response flip-flop (FIG. 9) to "1." It sets flip-flop 144 (FIG. 9) to "col." | It sets CL14. |
| CL14 | The timing out of CL13 | It is used for delay only | It sets CL15. |
| CL15 | The timing out of CL14 | It tests flip-flop 144 (FIG. 9) | If flip-flop 144 is at "1," it sets CL1. If flip-flop 144 is at "0," it sets CL16. |
| CL16 | The timing out of CL15 | It sets the *a* and *u* flip-flops in the A unit to "0" | It sets IFI. |

B Unit Scan (Row) Microprogram

Figure 11:
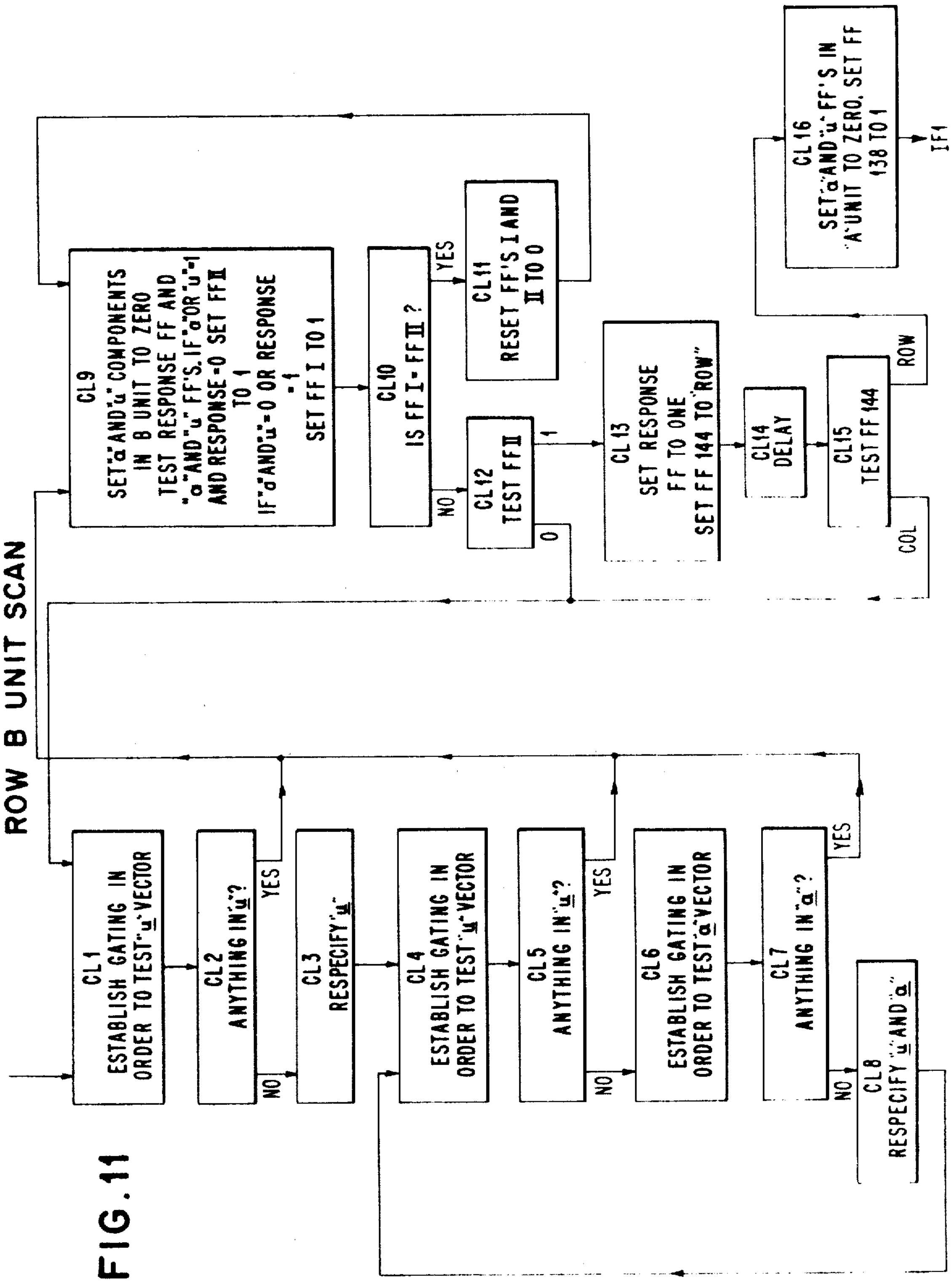
FIG. 11 is a flow chart which depicts a row B unit scan microprogram.

This program also employs the B unit scan clock CL. The following table sets forth the relationship of the operations under the control of clock CL. This table together with the flow chart depicted in FIG. 11 provides an explanation of the row B unit scan operation.

| Mono Number | Set conditions | Functions performed when set | Functions when timing out |
|---|---|---|---|
| CL1 | An initial pulse. The timing out of CL12. The timing out of CL15. | It resets flop-flop 86 (FIG. 8A) to "0" to enable gate 88 which gates the u vector to the "leftmost one" circuit. It resets flip-flops 100–106 (FIG. 8B) to "0." It resets flip-flop 128 (FIG. 8B) to "0." It resets flip-flops I and II (FIG. 8C) to "0." | It sets CL2. |
| CL2 | The timing out of CL1 | It tests the "leftmost one" circuit. If a "1" exists in the u vector, it sets the corresponding one of flip-flops 100–106. | If a "1" exists in the u vector, it sets CL9. If a "1" does not so exist, it sets CL3. |
| CL3 | The timing out of CL2 | It respecifies the u vector. In this connection, note flip-flops *a* and *u* (FIG. 14B). | It sets CL4. |
| CL4 | The timing out of CL3. The timing out of CL8. | It resets flip-flop 86 (FIG. 8A) to "0" to enable gate 88 which gates the u vector to the "leftmost one" circuit. It resets flip-flops 100–106 (FIG. 8B) to "0." It resets flip-flop 128 (FIG. 8B) to "0." It resets flip-flops I and II (FIG. 8C) to "0." | It sets CL5. |
| CL5 | The timing out of CL4 | It tests the "leftmost one" circuit. If a "1" exists in the u vector, it sets the corresponding one of flip-flops 100–106. | If a "1" exists in the u vector, it sets CL9. If a "1" does not so exist, it sets CL3. |
| CL6 | The timing out of CL5 | It sets flip-flop 86 (FIG. 8A) to "1" to enable gate 160 (FIG. 8A) which gates the a vector to the "leftmost one" circuit. It resets flip-flops 100–106 to "0." It resets flip-flop 128 (FIG. 8B) to "0." It resets flip-flops I and II (FIG. 8C) to "0." | It sets CL7. |
| CL7 | The timing out of CL6 | It tests the "leftmost one" circuit. If a "1" exists in the a vector, it sets the corresponding one of the flip-flops 100–106. | If a "1" exists in the a vector, it sets CL9. If a "1" does not so exist, it sets CL8. |

Table—Continued

| Mono Number | Set conditions | Functions performed when set | Functions when timing out |
|---|---|---|---|
| CL8 | The timing out of CL7 | It respecifies the u and a vectors. In this connection, note the "a" and "u" flip-flops (FIG. 14B) | It sets CL4. |
| CL9 | The timing out of CL2. The timing out of CL6. The timing out of CL7. The timing out of CL11. | It resets the "u" and "a" components in the B unit to "0," i.e., it enables gate 392. It tests the response flip-flop (FIG. 9) and line 394-400 which extend from flip-flop "a" and "u" (FIG. 14B). If either the "a" or "u" flip-flop is at "1" and the response flip-flop is at "0," it sets flip-flop II (FIG. 8C). If both the "a" and "u" flip-flops are at "0," or the response flip-flop is at "1," it sets flip-flop I. | It sets CL10. |
| CL10 | The timing out of CL9 | It asks the question as to whether flip-flops I and II are in the same states by testing gate 402 (FIG. 8C). | If flip-flops I and II are in the same states, it sets CL11. If they are not, it sets CL12. |
| CL11 | The timing out of CL10 | It resets flip-flops I and II to "0" | It sets CL9. |
| CL12 | The timing out of CL10 | It tests flip-flop II | If flip-flop II is at "1," it sets CL13. If it is at "0," it sets CL1. |
| CL13 | The timing out of CL12 | It sets the response flip-flop to "1," It sets flip-flop 144 (FIG. 9) to row | It sets CL14. |
| CL14 | The timing out of CL13 | It is used for delay only | It sets CL15. |
| CL15 | The timing out of CL14 | It tests flip-flop 144 (FIG. 9) | If flip-flop 144 is on "col.," it sets CL1. If flip-flop 144 is on row, it sets CL16. |
| CL16 | The timing out of CL15 | It sets the a and u flip-flops in the A unit to "0." It sets flip-flop 138 (FIG. 9) to "1." | It sets IF1. |

While the invention has been particularly shown and described with reference to a preferred embodiment thereof, it will be understood by those skilled in the art that the foregoing and other changes in form and details may be made therein without departing from the spirit and scope of the invention.

What we claim is:

1. An input-output control apparatus for a data processing system wherein said system includes a central processor, central processor storage, bulk storage, and a plurality of input-output devices comprising:

- a plurality of first units for controlling transmission of data between said central processor and said input-output devices, said first units being provided in an array to constitute respective pluralities of rows and columns of first units;
- a plurality of second units for controlling each of said rows and columns of said first units respectively, said second units including;
- means for initiating first unit sequences, said sequences being for input-output device selection, command, data transmission, and ending,
- means for storing data in said processor storage and bulk storage,
- means for fetching data from said processor storage and said bulk storage,
- means for controlling record search operations including means for updating addresses, means for updating counts, means for generating parity checks, means for generating redundancy checks, means for verifying parity checks, and means for verifying redundancy checks; and scanning means for causing said second units to continually scan said first units respectively controlled by them to ascertain those of said first units which require service.

2. An input-output control system as defined in claim 1 wherein there is further included means to control said scanning means, said last-named control means comprising:

- an $a$ control component for determining whether a particular first unit requires service;
- a $u$ control component for determining whether said particular first unit urgently requires service; and
- a $p$ control component for determining whether the second units controlling said particular first unit are permitted to service said particular first unit.

3. An input-output control system as defined in claim 2 and further including tie-breaking means responsive to the attempt of more than one second unit to concurrently control a first unit, to thereby prevent the controlling of a first unit by more than one second unit.

4. An input-output control system as defined in claim 2 wherein there is further included means associated with said $p$ control component to limit the scan of a second unit to those first units controlled by said second unit.